US009486803B2

(12) United States Patent
Motadel et al.

(10) Patent No.: US 9,486,803 B2

(45) **Date of Patent: *Nov. 8, 2016**

(54) PIPETTE TIPS

(75) Inventors: Arta Motadel, San Diego, CA (US); Peter Paul Blaszcak, San Diego, CA (US); Phillip Chad Hairfield, San Diego, CA (US); Sean Michael Callahan, San Diego, CA (US)

(73) Assignee: BIOTIX, INC., San Diego, CA (US)

( * ) Notice: Subject to any disclaimer, the term of this patent is extended or adjusted under 35 U.S.C. 154(b) by 299 days.

This patent is subject to a terminal disclaimer.

(21) Appl. No.: 13/011,747

(22) Filed: Jan. 21, 2011

(65) Prior Publication Data

US 2011/0183433 A1 Jul. 28, 2011

Related U.S. Application Data

(60) Provisional application No. 61/297,658, filed on Jan. 22, 2010, provisional application No. 61/411,859, filed on Nov. 9, 2010.

(51) Int. Cl.
*G01N 1/28* (2006.01)
*B01L 3/02* (2006.01)

(52) U.S. Cl.
CPC ............ *B01L 3/0275* (2013.01); *B01L 3/0279* (2013.01); *Y10T 436/2575* (2015.01)

(58) Field of Classification Search
CPC ............... B01L 3/0275; B01L 3/0279; Y10T 436/2575
USPC ....... 422/524, 525, 526, 501, 509, 511, 512, 422/513, 514, 515, 516, 518, 519, 521, 422/68.1; 73/1.74, 863.32, 864.01, 864.13, 73/864.14, 864.15, 864.16
See application file for complete search history.

(56) References Cited

U.S. PATENT DOCUMENTS

| | | | |
|---|---|---|---|
| 4,072,330 | A | 2/1978 | Brysch |
| D255,601 | S | 6/1980 | De Vaughn |
| D256,052 | S | 7/1980 | De Vaughn |
| 4,212,204 | A | 7/1980 | St. Amand |
| 4,232,669 | A | 11/1980 | Nitshke |
| 4,349,109 | A | 9/1982 | Scordato et al. |
| 4,461,328 | A | 7/1984 | Kenny |
| 4,537,231 | A | 8/1985 | Hasskamp |
| 4,565,100 | A | 1/1986 | Malinoff et al. |

(Continued)

FOREIGN PATENT DOCUMENTS

| | | |
|---|---|---|
| EP | 0 266 155 | 5/1988 |
| EP | 0743095 | 11/1996 |

(Continued)

OTHER PUBLICATIONS

International Search Report and Written Opinion mailed on: Aug. 25, 2010 in International Application No. PCT/US2010/020666 filed on Jan. 11, 2010 and published as: WO 10/081107 on: Jul. 15, 2010.

(Continued)

*Primary Examiner* — Christopher A Hixson
(74) *Attorney, Agent, or Firm* — Grant IP, Inc.

(57) ABSTRACT

Disclosed here are pipette tips useful for acquiring or dispelling liquids, and include one or more design that may increase fluid delivery precision and/or accuracy, and may reduce certain repetitive motions.

14 Claims, 33 Drawing Sheets

(56) References Cited

U.S. PATENT DOCUMENTS

| | | | | |
|---|---|---|---|---|
| 4,647,419 | A | 3/1987 | Helfer et al. | |
| 4,707,337 | A | 11/1987 | Jeffs et al. | |
| 4,721,680 | A | 1/1988 | Jeffs et al. | |
| 4,748,859 | A | 6/1988 | Magnussen, Jr. | |
| 4,763,695 | A | 8/1988 | Dooley | |
| D300,561 | S | 4/1989 | Asa et al. | |
| 4,961,350 | A | 10/1990 | Tennstedt | |
| 5,000,921 | A | 3/1991 | Hanaway et al. | |
| 5,032,343 | A | 7/1991 | Jeffs et al. | |
| 5,156,811 | A | 10/1992 | White | |
| 5,223,225 | A | 6/1993 | Gautsch | |
| 5,232,669 | A * | 8/1993 | Pardinas | 422/526 |
| 5,343,909 | A | 9/1994 | Goodman | |
| 5,348,606 | A | 9/1994 | Hanaway et al. | |
| 5,487,997 | A | 1/1996 | Stolp | |
| 5,614,153 | A | 3/1997 | Homberg | |
| 5,660,797 | A | 8/1997 | Jarvimaki | |
| D384,418 | S | 9/1997 | Torti et al. | |
| 5,700,959 | A | 12/1997 | Homberg | |
| 5,827,745 | A | 10/1998 | Astle | |
| 5,849,248 | A | 12/1998 | Homberg | |
| 6,019,225 | A | 2/2000 | Kalmakis et al. | |
| 6,103,198 | A | 8/2000 | Brophy et al. | |
| D439,986 | S | 4/2001 | Petrek | |
| 6,247,891 | B1 | 6/2001 | Lind | |
| 6,258,324 | B1 | 7/2001 | Yiu | |
| D461,904 | S | 8/2002 | Petrek | |
| D465,844 | S | 11/2002 | Anderson et al. | |
| 6,482,362 | B1 | 11/2002 | Smith | |
| 6,566,145 | B2 | 5/2003 | Brewer | |
| 6,596,240 | B2 | 7/2003 | Taggart et al. | |
| D487,539 | S | 3/2004 | Moroney | |
| D487,593 | S | 3/2004 | Sarna | |
| 7,335,337 | B1 | 2/2008 | Smith | |
| 7,794,664 | B2 | 9/2010 | Pelletier et al. | |
| 8,105,555 | B2 | 1/2012 | Lahti | |
| D663,042 | S | 7/2012 | Motadel et al. | |
| 8,307,721 | B2 | 11/2012 | Motadel | |
| 8,323,585 | B2 | 12/2012 | Heavner | |
| D679,828 | S * | 4/2013 | Motadel et al. | D24/222 |
| D680,226 | S * | 4/2013 | Motadel et al. | D24/222 |
| D687,562 | S * | 8/2013 | Motadel et al. | D24/222 |
| D691,282 | S | 10/2013 | Motadel | |
| 9,101,923 | B2 | 8/2015 | Motadel | |
| 2003/0152494 | A1 | 8/2003 | Moritz et al. | |
| 2003/0156994 | A1 | 8/2003 | Mahler et al. | |
| 2005/0255005 | A1 | 11/2005 | Motadel | |
| 2006/0171851 | A1 | 8/2006 | Motadel | |
| 2006/0177352 | A1 | 8/2006 | Ziegmann et al. | |
| 2007/0017870 | A1 | 1/2007 | Belov | |
| 2007/0231215 | A1 | 10/2007 | Mototsu et al. | |
| 2009/0007702 | A1 | 1/2009 | Yiu | |
| 2009/0202392 | A1 | 8/2009 | Urano et al. | |
| 2010/0196210 | A1 | 8/2010 | Jungheim et al. | |
| 2010/0218622 | A1 | 9/2010 | Motatel | |
| 2010/0221151 | A1 | 9/2010 | Motadel et al. | |
| 2010/0258578 | A1 | 10/2010 | Motadel | |
| 2011/0136180 | A1 * | 6/2011 | Bengtsson et al. | 435/91.2 |
| 2011/0183433 | A1 | 7/2011 | Motadel | |
| 2011/0259443 | A1 | 10/2011 | Preschutti et al. | |
| 2011/0300620 | A1 | 12/2011 | Belz et al. | |
| 2013/0164194 | A1 | 6/2013 | Motadel et al. | |
| 2014/0314637 | A1 | 10/2014 | Motadel et al. | |
| 2015/0266017 | A1 | 9/2015 | Motadel et al. | |
| 2016/0167041 | A1 | 6/2016 | Curry et al. | |

FOREIGN PATENT DOCUMENTS

| | | |
|---|---|---|
| EP | 1 236 030 | 5/2001 |
| EP | 1 110 613 | 6/2001 |
| EP | 1 884 286 | 2/2008 |
| EP | 2140941 | 1/2010 |
| JP | 08-266913 | 10/1996 |
| JP | 2007-253118 | 10/2007 |
| RU | 2144158 | 1/2000 |
| WO | WO 93/08913 | 5/1993 |
| WO | WO 01/36933 | 5/2001 |
| WO | WO 2006/093925 | 9/2006 |
| WO | WO 2010/081107 | 7/2010 |
| WO | WO 2011/091308 | 7/2011 |
| WO | WO 2016/094553 | 6/2016 |

OTHER PUBLICATIONS

International Preliminary Report on Patentability mailed on: Jul. 21, 2011 in International Application No. PCT/US2010/020666 filed on Jan. 11, 2010 and published as: WO 10/081107 on: Jul. 15, 2010.

International Search Report and Written Opinion mailed on: Oct. 28, 2011 in International Application No. PCT/US2011/022129 filed on Jan. 21, 2011 and published as: WO 2011/091308 on: Jul. 28, 2011.

Corning Deck Works Piptet Tips, Product Brochure 2010.

Sorenson BioScience, Inc. Liquid Handling Products, VWR 2008 Catalog.

Sorenson low binding aerosol barrier tips, MicroReach Guard, capacity 10ul. Catalog No. Z719390, Sigma-Aldrich Co. 2010 Catalog, Printed from the internet on Sep. 9, 2010.

Office Action mailed on: Jan. 10, 2012 in U.S. Appl. No. 12/685,590, filed Jan. 11, 2010.

Office Action mailed on: Jul. 11, 2012 in U.S. Appl. No. 12/685,590, filed Jan. 11, 2010.

Office Action mailed on: May 23, 2012 in Design U.S. Appl. No. 29/354,398, filed Jan. 22, 2010.

Office Action mailed on: Feb. 6, 2012 in Design U.S. Appl. No. 29/354,398, filed Jan. 22, 2010.

Office Action mailed on: Jun. 21, 2011 in Design U.S. Appl. No. 29/354,398, filed Jan. 22, 2010.

Office Action mailed on: Jan. 12, 2011 in Design U.S. Appl. No. 29/354,398, filed Jan. 22, 2010.

Office Action mailed on: Jan. 31, 2011 in Design U.S. Appl. No. 29/354,398, filed Jan. 22, 2010.

Office Action mailed on: Sep. 14, 2010 in Design U.S. Appl. No. 29/354,398, filed Jan. 22, 2010.

Office Action mailed on: Dec. 3, 2012 in Design U.S. Appl. No. 29/413,135, filed Feb. 10, 2012.

Office Action mailed on: Dec. 3, 2012 in Design U.S. Appl. No. 29/413,368, filed Feb. 14, 2012.

Office Action mailed on: Feb. 6, 2013 in Design U.S. Appl. No. 29/416,179, filed Mar. 19, 2012.

Office Action mailed on: Mar. 26, 2013 in Design U.S. Appl. No. 29/416,179, filed Mar. 19, 2012.

Office Action mailed on : Jun. 14, 2013 in Design U.S. Appl. No. 29/447,034, filed Feb. 28, 2013.

Office Action mailed on: May 3, 2013 in U.S. Appl. No. 13/773,553, filed Feb. 21, 2013 and published as: US 2013-0164194 on: Jun. 27, 2013.

Office Action mailed on Apr. 5, 2013 in U.S. Appl. No. 13/484,220, filed May 30, 2012.

Apricot Designs Pipette Tips Catelog for EZ-Load Tips, ESP Tips and High Volume Apricot Tips, printed from the internet on Oct. 19, 2011 from http:/www.apricotdesigns.com/pipette_tips.htp.

Fluid X, Product page for EZ load pipetting heads printed from the internet on Oct. 19, 2011 from http://www.fluidx.co.uk/html/ez_load_head.html.

Office Action mailed on Dec. 19, 2013 in U.S. Appl. No. 13/484,220, filed May 30, 2012 and published as US 2013-0323140 on Dec. 5, 2013.

Office Action mailed on Jan. 14, 2014 in U.S. Appl. No. 13/773,553, filed Feb. 21, 2013 and published as US 2013-0164194 on Jun. 27, 2013.

International Search Report and Written Opinion mailed on Sep. 4, 2013 in International Application No. PCT/US2013/042915, filed on May 28, 2013.

(56) References Cited

OTHER PUBLICATIONS

Office Action mailed on Mar. 27, 2014 in U.S. Appl. No. 13/484,220, filed May 30, 2012 and published as US 2013-0323140 on Dec. 5, 2013.
Office Action mailed on Aug. 4, 2014 in U.S. Appl. No. 13/773,553, filed Feb. 21, 2013 and published as US 2013-0164194 on Jun. 27, 2013.
Office Action mailed on Sep. 11, 2014 in U.S. Appl. No. 14/320,177, filed Jun. 30, 2014.
International Preliminary Report on Patentability mailed on Dec. 11, 2014 in International Application No. PCT/US2013/042915, filed on May 28, 2013 and published as WO 2013/181163 on Dec. 5, 2013.
Office Action mailed on Dec. 22, 2014 in U.S. Appl. No. 13/773,553, filed Feb. 21, 2013 and published as US 2013-0164194 on Jun. 27, 2013.
Office Action mailed on Jan. 15, 2015 in U.S. Appl. No. 14/320,177, filed Jun. 30, 2014 and published as US 2014-0314637 on Oct. 23, 2014.
Office Action mailed on Mar. 10, 2015 in U.S. Appl. No. 13/773,553, filed Feb. 21, 2013 and published as US 2013-0164194 on Jun. 27, 2013.
Office Action mailed on Jul. 16, 2015 in U.S. Appl. No. 14/320,177, filed Jun. 30, 2014 and published as US 2014-0314637 on Oct. 23, 2014.
Supplementary European Search Report dated Jun. 19, 2015 in European Patent Application No. 11735265.8, filed on Jan. 21, 2011 and published as EP 2 525 910 on Nov. 28, 2012.
Office Action mailed on Dec. 1, 2015 in U.S. Appl. No. 14/320,177, filed Jun. 30, 2014 and published as US 2014-0314637 on Oct. 23, 2014.
Extended European Search Report dated Feb. 2, 2016 in EP Patent Application No. 13797065.3, filed on May 28, 2013 and published as EP 2 855 021 on Apr. 8, 2015.
Office Action mailed on Aug. 4, 2016 in U.S. Appl. No. 15/056,978, filed Feb. 29, 2016.
Office Action mailed on Aug. 22, 2016 in U.S. Appl. No. 14/731,245, filed Jun. 4, 2015 and published as US 2015-0266017 on Sep. 24, 2015.

* cited by examiner

SECTION A-A

DETAIL B

10
A
A
B
B
C
C
D
D 80
100
50
70
85
70
SECTION D-D 80
70
100
85
70
50
SECTION C-C 120
100
85
70
70
80
50
SECTION B-B 50
100
110
67
60
120
SECTION A-A

PIPETTE TIPS

RELATED PATENT APPLICATIONS

This patent application claims the benefit of U.S. provisional patent application No. 61/297,658 and design patent application No. 29/354,398, each filed Jan. 22, 2010, and entitled PIPETTE TIPS, naming Arta Motadel, Peter Paul Blaszcak, Phillip Chad Hairfield, and Sean Michael Callahan as inventors. This patent application also claims the benefit of U.S. provisional patent application No. 61/411,859, filed Nov. 9, 2010, and entitled PIPETTE TIPS, naming Arta Motadel, Peter Paul Blaszcak, Phillip Chad Hairfield, and Sean Michael Callahan as inventors. The entire contents of each of the foregoing provisional and design patent applications is incorporated herein by reference, including all text, tables and drawings.

FIELD

The technology relates in part to pipette tips and methods for using them.

BACKGROUND

Pipette tips are utilized in a variety of industries that have a requirement for handling fluids, and are used in facilities including medical laboratories and research laboratories, for example. In many instances pipette tips are used in large numbers, and often are utilized for processing many samples and/or adding many reagents to samples, for example.

Pipette tips often are substantially cone-shaped with an aperture at one end that can engage a dispensing device, and another relatively smaller aperture at the other end that can receive and emit fluid. Pipette tips generally are manufactured from a moldable plastic, such as polypropylene, for example. Pipette tips are made in a number of sizes to allow for accurate and reproducible liquid handling for volumes ranging from nanoliters to milliliters.

Pipette tips can be utilized in conjunction with a variety of dispensing devices, including manual dispensers (e.g., pipettors) and automated dispensers. A dispenser is a device that, when attached to the upper end of a pipette tip (the larger opening end), applies negative pressure to acquire fluids, and applies positive pressure to dispense fluids. The lower or distal portion of a dispenser (typically referred to as the barrel or nozzle) is placed in contact with the upper end of the pipette tip and held in place by pressing the barrel or nozzle of the dispenser into the upper end of the pipette tip. The combination then can be used to manipulate liquid samples.

SUMMARY

In some embodiments, provided are pipette tips comprising a proximal region and a distal region, where the proximal region comprises an exterior surface and an annular flange at the proximal terminus of the proximal region, the proximal region comprises a first set of axially oriented ribs and a second set of axially oriented ribs, the ribs of the first set and the second set are circumferentially spaced and alternately spaced around the exterior surface of the proximal region, and ribs of the first set have a maximum thickness greater than the maximum thickness of ribs of the second set. In certain embodiments, the distal region wall thickness tapers from (a) a point at or between (i) about the junction of the proximal region and distal region to (ii) about one-quarter of the axial distance from the terminus of the distal region to the junction, to (b) the distal region terminus, and the wall thickness at the distal region terminus is about 0.0040 inches to about 0.0055 inches.

Provided also, in some embodiments, are pipette tips comprising a proximal region and a distal region, where the proximal region comprises an exterior surface and an annular flange at the proximal terminus of the proximal region, the distal region wall thickness tapers from (a) a point at or between (i) about the junction of the proximal region and distal region to (ii) about one-quarter of the axial distance from the terminus of the distal region to the junction, to (b) the distal region terminus, and the wall thickness at the distal region terminus is about 0.0040 inches to about 0.0055 inches. In certain embodiments, the proximal region comprises a first set of axially oriented ribs and a second set of axially oriented ribs. In some embodiments, the ribs of the first set and the second set are circumferentially spaced and alternately spaced around the exterior surface of the proximal region. In certain embodiments, ribs of the first set have a maximum thickness greater than the maximum thickness of ribs of the second set.

Some pipette tip embodiments can comprise rib sets of differing thickness disposed on, or co-extensive with, the flexible proximal region. In some embodiments, ribs can have a profile shape selected from an arc, pyramid, flat, rectangle, semi-circular, stepped, triangle, rhombus, parallelogram, trapezoid, and the like, and combinations thereof. In some embodiments, ribs can be disposed at a particular distance below the flange terminal opening of the pipette tip (e.g., the top boundary of each section of increased thickness can be offset from the edge of the pipette tip). A pipette tip sometimes includes a region of increased thickness (e.g., ribs) at an outer or exterior surface of the proximal region of the pipette tip, while retaining a substantially smooth inner surface in the proximal region, in specific embodiments. On a pipette tip, (i) one or more ribs may be coextensive with a portion of the flange, (ii) one or more ribs may be coextensive with the flange/proximal region junction, (iii) one or more ribs may terminate at a point on the proximal region before the flange/proximal region junction, (iv) one or more ribs may be coextensive with the junction between the proximal region and the distal region of the pipette tip, (v) one or more ribs may terminate at a point on the proximal region before the junction between the proximal region and the distal region of the pipette tip, or combinations of the foregoing, in some embodiments.

In certain embodiments, the proximal region may comprise a frustum-shaped cavity within the interior of the proximal region. In some embodiments, the frustum-shaped cavity can be substantially smooth. In certain embodiments, the frustum-shaped cavity may comprise an optional annular groove.

In some embodiments, the wall thickness at the distal region terminus is about 0.0043 inches to about 0.0050 inches. In certain embodiments, the wall thickness at the distal region terminus is about 0.0044 inches to about 0.0049 inches. In some embodiments, the interior surface of the distal region is substantially smooth, and in certain embodiments, the exterior surface of the distal region comprises a step.

In some embodiments, each rib of the first set alternates with each rib of the second set. In certain embodiments, one end of ribs in the first set, one end of ribs in the second set, or one end of ribs in the first and the second set is co-extensive with, or terminates at, the flange. In some embodiments, one end of ribs in the first set, one end of ribs in the second set, or one end of ribs in the first and the second set is co-extensive with, or terminates at the junction between the flange and proximal region. In certain embodiments, one end of ribs in the first set, one end of ribs in the second set, or one end of ribs in the first and the second set is co-extensive with, or terminates at the junction between the proximal region and the distal region.

Provided in some embodiments, are pipette tips comprising a proximal region and a distal region, where the proximal region has an average softness rating of less than about 1.75 pounds of force. As used herein, the term "softness rating" is the amount of force required to deflect a surface of the pipette tip (e.g., deflection force) a given distance from a starting or resting position. In certain embodiments, the force for a softness rating is measured by pressing on the side of a pipette tip, often in the proximal region of the pipette tip, towards the axis extending longitudinally from the distal region terminus to the proximal region terminus (e.g., Example 1). In some embodiments, the softness rating is a mean, nominal, average, maximum or minimum value. In certain embodiments, pipette tips described herein have a mean, nominal or average deflection force to deflect a pipette tip a given amount from the resting position of below about 1.75 pounds of force, below about 1.70 pounds of force, below about 1.65 pounds of force, below about 1.60 pounds of force, below about 1.55 pounds of force, below about 1.50 pounds of force, below about 1.45 pounds of force, below about 1.40 pounds of force, below about 1.35 pounds of force, below about 1.30 pounds of force, below about 1.25 pounds of force, below about 1.20 pounds of force, below about 1.15 pounds of force, and below about 1.10 pounds of force required for deflection of the pipette tip proximal region. In some embodiments, a pipette tip proximal region has a minimal deflection force of about 1.07 pounds. In certain embodiments, a pipette tip proximal region has a maximal deflection force of about 1.75 pounds. In some embodiments, a pipette tip has a deflection force in the range of between about 1.07 pounds and about 1.26 pounds (e.g., about 1.07 pounds, about 1.08 pounds, about 1.09 pounds, about 1.10 pounds, about 1.11 pounds, about 1.12 pounds, about 1.13 pounds, about 1.14 pounds, about 1.15 pounds, about 1.16 pounds, about 1.17 pounds, about 1.18 pounds, about 1.19 pounds, about 1.20 pounds, about 1.21 pounds, about 1.22 pounds, about 1.23 pounds, about 1.24 pounds, about 1.25 pounds, and about 1.26 pounds of force).

In some embodiments, provided are pipette tips comprising a proximal region and a distal region, where the proximal region comprises an exterior surface and an annular flange at the proximal terminus of the proximal region, the proximal region comprises a first set of axially oriented ribs and a second set of axially oriented ribs, the ribs of the first set and the second set are circumferentially spaced and alternately spaced around the exterior surface of the proximal region, and ribs of the first set have a maximum thickness greater than the maximum thickness of ribs of the second set. In certain embodiments, the distal region wall thickness tapers from (a) a point at or between (i) about the junction of the proximal region and distal region to (ii) about one-quarter of the axial distance from the terminus of the distal region to the junction, to (b) the distal region terminus, the wall thickness at the distal region terminus is about 0.0040 inches to about 0.0055 inches, and the proximal region is deflected by a known amount from its starting or resting position by a deflection force of less than 1.75 pounds. In certain embodiments, the proximal region is deflected by a known amount from the starting position by a deflection force between about 1.07 pounds and about 1.26 pounds.

Provided also, in some embodiments, are pipette tips comprising a proximal region and a distal region, where the proximal region comprises an exterior surface and an annular flange at the proximal terminus of the proximal region, the distal region wall thickness tapers from (a) a point at or between (i) about the junction of the proximal region and distal region to (ii) about one-quarter of the axial distance from the terminus of the distal region to the junction, to (b) the distal region terminus, the wall thickness at the distal region terminus is about 0.0040 inches to about 0.0055 inches, and the proximal region is deflected a by a known amount from its starting or resting position by a deflection force of less than 1.75 pounds. In certain embodiments, the proximal region is deflected by a known amount from the starting position by a deflection force between about 1.07 pounds and about 1.26 pounds. In certain embodiments, the proximal region comprises a first set of axially oriented ribs and a second set of axially oriented ribs. In some embodiments, the ribs of the first set and the second set are circumferentially spaced and alternately spaced around the exterior surface of the proximal region. In certain embodiments, ribs of the first set have a maximum thickness greater than the maximum thickness of ribs of the second set.

In some embodiments, provided also are pipette tips comprising a proximal region and a distal region, where the proximal region comprises an exterior surface and an annular flange at the proximal terminus of the proximal region, the proximal region comprises a plurality of axially oriented ribs, a thickness of the proximal region is about 0.005 inches to about 0.015 inches, the thickness is (i) at or near a sealing zone for a dispensing device, and (ii) at a portion between the ribs, the ribs or portion thereof extend over the sealing zone, and the proximal region is deflected by a known amount from its starting or resting position by a deflection force of less than 1.75 pounds. In certain embodiments, the proximal region is deflected by a known amount from the starting position by a deflection force between about 1.07 pounds and about 1.26 pounds.

Also provided, in some embodiments, is a method of using a pipette tip, comprising: (a) inserting a pipettor into a pipette tip, and (b) contacting the pipette tip with a fluid, where the pipette tip comprises a proximal region and a distal region, and further where the proximal region comprises an exterior surface and an annular flange at the proximal terminus of the proximal region, the proximal region comprises a first set of axially oriented ribs and a second set of axially oriented ribs, the ribs of the first set and the second set are circumferentially spaced and alternately spaced around the exterior surface of the proximal region, and ribs of the first set have a maximum thickness greater than the maximum thickness of ribs of the second set.

Provided also, in some embodiments, is method of using a pipette tip, comprising: (a) inserting a pipettor into a pipette tip, and (b) contacting the pipette tip with a fluid, where the pipette tip comprises a proximal region and a distal region, the proximal region comprises an exterior surface and an annular flange at the proximal terminus of the proximal region, and further where the distal region wall thickness tapers from (a) a point at or between (i) about the junction of the proximal region and distal region to (ii) about one-quarter of the axial distance from the terminus of the distal region to the junction, to (b) the distal region terminus, and the wall thickness at the distal region terminus is about 0.0040 inches to about 0.0055 inches.

Also provided in some embodiments, is a method for manipulating a solution using a pipette tip described herein, comprising: (a) applying a pipette tip to a pipettor, (b) aspirating a solution, (c) dispensing the solution into a receptacle, and (d) ejecting the pipette tip from the pipettor, where the average time to complete 3 cycles of steps (a) to (d) is about 20.88 seconds or less. Provided also in certain embodiments, is a method for measuring improved pipetting efficiency, comprising: (a) applying a pipette tip to a pipettor, (b) aspirating a solution, (c) dispensing the solution into a receptacle, and (d) ejecting the pipette tip from the pipettor, where the average time to complete 3 cycles of steps (a) to (d) is about 20.88 seconds or less. In certain embodiments, the thickness of the tip wall at the distal region terminus is 0.0055 or less. In some embodiments the average time to complete a single cycle of steps (a) to (d) is about 6.7 seconds or less. In certain embodiments, dispensing includes touching the distal terminus of the pipette tip to a wall of the receptacle after the fluid is dispensed from the interior of the tip.

In some embodiments, a pipette tip having a wall thickness at the distal region terminus of about 0.0040 inches to about 0.0055 inches is configured to retain less than 0.065% of the fluid drawn into the pipette tip, after the fluid is dispensed (e.g., less than about 0.065%, 0.060%, 0.055%, 0.050%, 0.045%, 0.040%, 0.035%, 0.030%, 0.025%, 0.020%, 0.015%, 0.010%, 0.0095%, 0.0090%, 0.0085%, 0.0080%, 0.0075%, 0.0070%, 0.0065%, 0.0060%, 0.0055%, 0.0050%, 0.0045%, 0.0040%, 0.0035%, 0.0030%, 0.0025%, 0.0020%, 0.0015%, 0.0010%, 0.00095%, 0.00090%, 0.00085%, 0.00080%, 0.00075%, 0.00070%, 0.00065%, 0.00060%, 0.00055%, 0.00050%, 0.00045%, 0.00040%, 0.00035%, 0.00030%, 0.00025%, 0.00020%, 0.00015%, 0.00014%, 0.00013%, 0.00012%, 0.00011%, or about 0.00010%). In certain embodiments, the pipette tip retains between about 0.00010% and about 0.00015% (e.g., about 0.00011%, 0.00012%, 0.00013%, or 0.00014%) of the fluid drawn into the tip, after the fluid is dispensed. In some embodiments, the pipette tip is configured to retain no more than 0.00012% of the fluid drawn into the tip, after the fluid is dispensed. In certain embodiments, provided is a method for dispensing fluid from a pipette tip, comprising, (a) drawing a volume of fluid into a pipette tip having a wall thickness at the distal region terminus of about 0.0040 inches to about 0.0055 inches, and (b) dispensing the fluid from the pipette tip, where the pipette tip retains less than 0.065% of the volume of the fluid that was drawn into the pipette tip, and in some embodiments, the pipette tip is configured to retain no more than 0.00012% of the volume of the fluid that was drawn into the pipette tip, after the fluid is dispensed. In some embodiments, the percentage of the fluid drawn into the pipette tip that is retained after dispensing is determined by weight, and in certain embodiments, the percentage of the fluid drawn into the pipette tip that is retained after dispensing is determined using a plurality of pipette tips. In some embodiments, the method optionally comprises one or more of (i) applying a pipette tip to a pipettor prior to step (a), (ii) visually inspecting the pipette tip after step (b), (iii) ejecting the pipette tip from the pipettor after step (b), and (iv) combinations thereof.

In certain embodiments, less than 3.72% of a plurality of pipette tips having a wall thickness at the distal region terminus of about 0.0040 inches to about 0.0055 inches retain a portion of the liquid drawn into the pipette tips after the liquid is dispensed (e.g., less than 3.72%, 3.70%, 3.65%, 3.60%, 3.55%, 3.50%, 3.45%, 3.40%, 3.35%, 3.30%, 3.25%, 3.20%, 3.15%, 3.10%, 3.05%, 3.00%, 2.95%, 2.90%, 2.80%, 2.70%, 2.60%, 2.50%, 2.40%, 2.30%, 2.20%, 2.10%, 2.00%, 1.90%, 1.80%, 1.70%, 1.60%, 1.50%, 1.40%, 1.35%, 1.30%, 1.25%, 1.20%, 1.15%, 1.10%, 1.05%, 1.00%, 0.95%, 0.90%, 0.85%, 0.80%, 0.75%, 0.70%, 0.65%, 0.60%, 0.55%, 0.50%, 0.45%, 0.40%, 0.35%, 0.34%, 0.33%, 0.32%, 0.31%, 0.30%, 0.29%, 0.28%, 0.26%, 0.25%, 0.24%, 0.23%, 0.22%, 0.21%, 0.20%, 0.19%, 0.18%, 0.17%, 0.16%, 0.15%, 0.14%, 0.13%, 0.12%, 0.11%, 0.10%, 0.09%, 0.08%, 0.07%, 0.06%, or less than about 0.05%). In some embodiments, between about 0.05% and about 1.0% of the plurality of pipette tips having a wall thickness at the distal region terminus of about 0.0040 inches to about 0.0055 inches retain a portion of the liquid drawn into pipette tips after the liquid is dispensed. In certain embodiments, between about 0.15% and about 0.30% of the plurality of pipette tips having a wall thickness at the distal region terminus of about 0.0040 inches to about 0.0055 inches retain a portion of the liquid drawn into pipette tip after the liquid is dispensed. In some embodiments, between about 0.20% and about 0.26% of the plurality of pipette tips having a wall thickness at the distal region terminus of about 0.0040 inches to about 0.0055 inches retain a portion of the liquid drawn into pipette tips after the liquid is dispensed. In certain embodiments, provided is a method for dispensing fluid from a pipette tip, comprising, (a) drawing fluid into a plurality of pipette tips having a wall thickness at the distal region terminus of about 0.0040 inches to about 0.0055 inches, and (b) dispensing the fluid from the pipette tips, where less than 3.72% of the pipette tips retain a portion of the liquid drawn into pipette tips after the liquid is dispensed. In some embodiments, provided is a method for dispensing fluid from a pipette tip, comprising (a) drawing fluid into a plurality of pipette tips having a wall thickness at the distal region terminus of about 0.0040 inches to about 0.0055 inches, and (b) dispensing the fluid from the pipette tips, where between about 0.15% and about 0.30% of the pipette tips retain a portion of the liquid drawn into pipette tips after the liquid is dispensed, and in certain embodiments, between about 0.20% and about 0.26% of the pipette tips retain a portion of the liquid drawn into pipette tips after the liquid is dispensed. In some embodiments, the number of pipette tips that retain liquid after dispensing is determined by visual inspection. In certain embodiments, the method optionally comprises one or more of (i) applying a pipette tip to a pipettor prior to step (a), (ii) visually inspecting the pipette tip after step (b), (iii) ejecting the pipette tip from the pipettor after step (b), and (iv) combinations thereof.

In some embodiments, a pipette tip having a wall thickness at the distal region terminus of about 0.0040 inches to about 0.0055 inches contributes to a reduction of between about 20% and about 90% in the average time to complete a cycle of steps in a fluid manipulation procedure (e.g., about 20%, 25%, 30%, 35%, 40%, 45%, 50%, 55%, 60%, 65%, 70%, 75%, 80%, 85%, or up to about 90%). In some embodiments, provided is a method for dispensing fluid from a pipette tip, comprising (a) drawing a volume of fluid into a pipette tip having a wall thickness at the distal region terminus of about 0.0040 inches to about 0.0055 inches, and (b) dispensing the fluid from the pipette tip, where the pipette tip contributes to a reduction of between about 20% and about 90% in the average time to complete a cycle of steps in a method for dispensing fluid from a pipette tip. In certain embodiments, the method optionally comprises one or more of (i) applying a pipette tip to a pipettor prior to step (a), (ii) visually inspecting the pipette tip after step (b), (iii) ejecting the pipette tip from the pipettor after step (b), and (iv) combinations thereof.

Also provided, in certain embodiments, is a method of manufacturing a pipette tip, comprising: (a) contacting a pipette tip mold with a molten polymer, and releasing the formed pipette tip from the mold after cooling, where the pipette tip comprises a proximal region and a distal region, and further where the proximal region comprises an exterior surface and an annular flange at the proximal terminus of the proximal region, the proximal region comprises a first set of axially oriented ribs and a second set of axially oriented ribs, the ribs of the first set and the second set are circumferentially spaced and alternately spaced around the exterior surface of the proximal region, and ribs of the first set have a maximum thickness greater than the maximum thickness of ribs of the second set.

Provided also, in some embodiments, is method of manufacturing a pipette tip comprising: (a) contacting a pipette tip mold with a molten polymer, and releasing the formed pipette tip from the mold after cooling, where the pipette tip comprises a proximal region and a distal region, and further where the proximal region comprises an exterior surface and an annular flange at the proximal terminus of the proximal region, the distal region wall thickness tapers from (a) a point at or between (i) about the junction of the proximal region and distal region to (ii) about one-quarter of the axial distance from the terminus of the distal region to the junction, to (b) the distal region terminus, and the wall thickness at the distal region terminus is about 0.0040 inches to about 0.0055 inches.

Also provided, in some embodiments, are pipette tips comprising a proximal region and a distal region, where the proximal region comprises an exterior surface and an annular flange at the proximal terminus of the proximal region, the proximal region comprises a plurality of axially oriented ribs; a thickness of the proximal region is about 0.005 inches to about 0.015 inches; the thickness is (i) at or near a sealing zone for a dispensing device, and (ii) at a portion between the ribs; and the ribs or portion thereof extend over the sealing zone. One end of ribs is co-extensive with, or terminates at, the flange, in certain embodiments. At times, one end of ribs is co-extensive with, or terminates at, the junction between the flange and the proximal region. Sometimes one end of ribs is co-extensive with, or terminates at, the junction between the proximal region and the distal region. In certain embodiments, the ribs extend from the junction of the flange and proximal region to the junction of the proximal and distal regions. In some embodiments, the distal region wall thickness tapers from (a) a point at or between (i) about the junction of the proximal region and distal region to (ii) about one-quarter of the axial distance from the terminus of the distal region to the junction, to (b) the distal region terminus, and the wall thickness at the distal region terminus is about 0.0040 inches to about 0.0055 inches. The wall thickness at the distal region terminus sometimes is about 0.0043 inches to about 0.0050 inches, and at times is about 0.0044 inches to about 0.0049 inches. In certain embodiments, the interior surface of the distal region is substantially smooth, and sometimes the exterior surface of the distal region comprises a step. The proximal region sometimes comprises a frustum-shaped cavity within the interior of the proximal region, and at the frustum-shaped cavity is substantially smooth and, in some embodiments, comprises an optional annular groove. In certain embodiments, the thickness of the proximal region is about 0.007 inches to about 0.0013 inches, is about 0.008 inches to about 0.0012 inches, is about 0.009 inches to about 0.011 inches or is about 0.010 inches. In some embodiments, the maximum thickness of the ribs is about 0.037 inches to about 0.060, is about 0.016 inches to about 0.027 inches, is about 0.015 inches to about 0.025 inches, is about 0.011 to about 0.021 inches or is about 0.003 inches to about 0.009 inches. Also included are methods of manufacturing and using such pipette tips, described in greater detail hereafter.

In some embodiments, the pipette tip is a unitary construction. In certain embodiments, the pipette tip is made of not made of an elastomer. In some embodiments, the interior surface of the proximal region does not include an internal shelf. In certain embodiments, the internal surface of the proximal region has a continuous circumferential thickness. In some embodiments, the internal surface of the proximal region does not have a continuous axial thickness. In certain embodiments, the internal surface of the proximal region provides a continuous contact zone. In some embodiments, the internal surface of the proximal region does not include internal spaced contact points.

Certain embodiments are described further in the following description, examples, claims and drawings.

BRIEF DESCRIPTION OF THE DRAWINGS

The drawings illustrate embodiments of the invention and are not limiting. For clarity and ease of illustration, the drawings are not necessarily made to scale and, in some instances, various aspects may be shown exaggerated or enlarged to facilitate an understanding of particular embodiments.

FIG. 1A is a side perspective view. FIG. 1B shows a side view with cross-section markings indicating the view shown in FIG. 1C. FIG. 1C is a midline cross-sectional view of the drawing illustrated in FIG. 1B. FIG. 1C contains detail (indicated by the circle B) illustrated in FIG. 1D. FIG. 1D is an enlarged view of the distal aperture, illustrating the decrease in taper ending in the “blade” or “knife-edge” tip.

FIGS. 31 and 32 present the results of force measurements performed using pipettor 1, where FIG. 31 presents the results of the 200 microliter tips and FIG. 32 presents the results of the 1000 microliter tips. FIGS. 33 and 34 present the results of force measurements performed using pipettor 2, where FIG. 33 presents the results of the 200 microliter tips and FIG. 34 presents the results of the 1000 microliter tips. FIG. 35 presents the results of the force measurements performed using pipettor 3 using only brand specific custom pipette tips in the 200 microliter and 1000 microliter capacities. FIGS. 36 and 37 present the results of force measurements performed using pipettor 4, where FIG. 36 presents the results of the 200 microliter tips and FIG. 37 presents the results of the 1000 microliter tips. FIGS. 38 and 39 present the results of force measurements performed using pipettor 5, where FIG. 38 presents the results of the 200 microliter tips and FIG. 39 presents the results of the 1000 microliter tips. Experimental details for FIGS. 31-39 are given in Example 2 and experimental results are presented in Example 8.

DETAILED DESCRIPTION

Figure 1A:
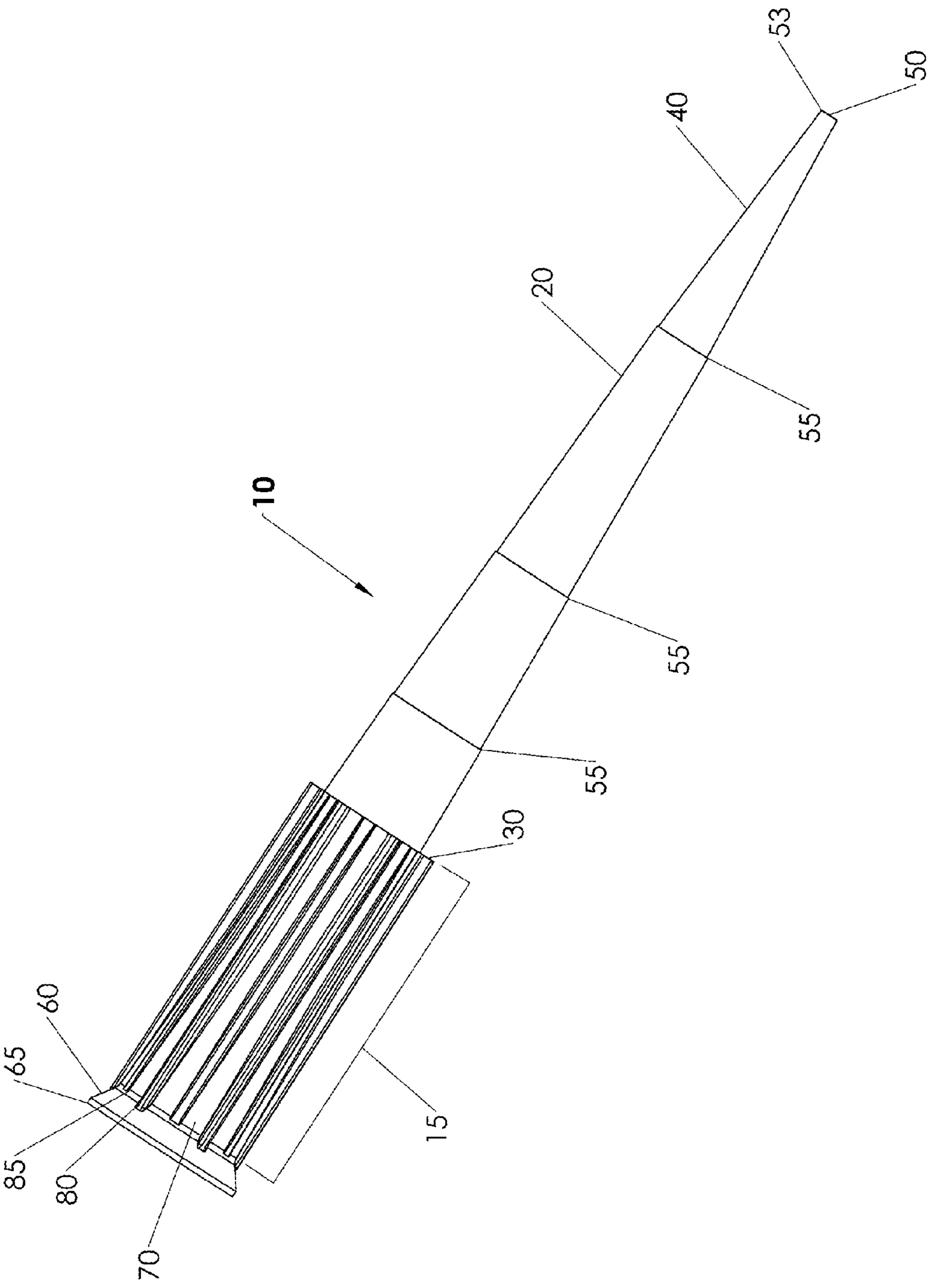
FIGS. 1A-1D illustrate perspective and cross-sectional views of a pipette tip embodiment as described herein, configured to manipulate volumes up to 200 microliters.

Certain structural features of pipette tip embodiments described herein may afford particular advantages to some users. In some embodiments, one or more of the structural features described may be incorporated into a pipette tip embodiment in one or more combinations. Incorporation of a structural feature can result in an advantage described hereafter, in certain instances.

Pipette Tip General Features

Pipette tip embodiments described herein can be of any overall geometry useful for dispensing fluids in combination with a dispensing device. The pipette tips described herein also can be of any volume useful for dispensing fluids in combination with a dispensing device. Non-limiting examples of volumes useful for dispensing fluids in combination with a dispensing device, and described as non-limiting embodiments herein, include pipette tips configured in sizes that hold from 0 to 10 microliters, 0 to 20 microliters, 1 to 100 microliters, 1 to 200 microliters, 1 to 300 microliters, and from 1 to 1250 microliters, for example. In some embodiments, the volumes pipette tips described herein can manipulate are larger than the volume designation given that particular pipette tip. For example, a pipette tip designated as suitable to manipulate volumes up to 300 microliters, can sometimes be used to manipulate volumes up to about 1%, 2%, 3%, 5%, 10%, 15% or sometimes as much as up to about 20% larger than the designated pipette tip volume.

The external appearance of pipette tips may differ, and certain pipette tips can comprise a continuous tapered wall forming a central channel or tube that is roughly circular in horizontal cross section, in some embodiments. A pipette tip can have any cross-sectional geometry that results in a tip that (i) provides suitable flow characteristics, and (ii) can be fitted to a dispenser (e.g., pipette), for example.

In certain embodiments, pipette tips comprise a proximal region 15 and a distal region 20 (e.g., FIGS. 1A-1D). Proximal region 15 comprises an outer or exterior surface upon which regions of increased thickness (e.g., ribs) are disposed, in some embodiments. In certain embodiments, proximal region 15 comprises an annular flange at the proximal terminus of the proximal region. The bore of the top-most portion of the central channel or tube generally is wide enough to accept a particular dispenser apparatus (e.g., nozzle, barrel). Pipette tips described herein often taper from the widest point at the top-most portion of the pipette tip (pipette proximal end or end that engages a dispenser), to a narrow opening at the bottom most portion of the pipette tip (pipette distal end used to acquire or dispel fluid). In certain embodiments, a pipette tip wall includes two or more taper angles. In some embodiments, pipette tips described herein are of unitary construction.

Proximal region 15 also comprises an interior or inner surface. The inner surface of the pipette tip sometimes forms a tapered continuous wall, in some embodiments, and in certain embodiments, the external wall may assume an appearance ranging from a continuous taper to a stepped taper or a combination of smooth taper with external protrusions. In some embodiments, the interior surface of proximal region 15 is smooth and does not include an internal shelf. That is, the inner surface of proximal region 15 does not have internal walls or protrusions that stop the axial insertion of a pipette tip barrel or nozzle. In certain embodiments, the inner surface of proximal region 15 provides a continuous contact zone (e.g., sealing zone), for engagement of a pipettor nozzle or barrel. In some embodiments, the inner surface of proximal region 15 does not include internal spaced contact points.

In some embodiments, a pipette tip can have (i) an overall length of about 1.10 inches to about 3.50 inches (e.g., about 1.25, 1.50, 1.75, 2.00, 2.25, 2.50, 2.75, 3.00, 3.25 inches); (ii) a fluid-emitting distal section terminus having an inner diameter of about 0.01 inches to about 0.03 inches (e.g., about 0.015, 0.020, 0.025 inches) and an outer diameter of about 0.02 to about 0.7 inches (e.g., about 0.025, 0.03, 0.04, 0.05, 0.06 inches); and (iii) a dispenser-engaging proximal section terminus having an inner diameter of about 0.10 inches to about 0.40 inches (e.g., about 0.15, 0.20, 0.25, 0.30, 0.35 inches) and an outer diameter of about 0.15 to about 0.45 inches (e.g., about 0.20, 0.25, 0.30, 0.35, 0.45 inches). In the latter embodiments, the inner diameter is less than the outer diameter.

The wall of the proximal section of a pipette tip described herein sometimes is continuously tapered from the top portion, to a narrower terminus. The top portion generally is open and often is shaped to receive a pipette tip engagement portion of a dispensing device. The wall of a proximal section, in some embodiments, forms a stepped tapered surface. The angle of each taper in the proximal section is between about zero degrees to about thirty degrees from the central longitudinal vertical axis of the pipette tip (e.g., about 0, 1, 2, 3, 4, 5, 6, 7, 8, 9, 10, 11, 12, 13, 14, 15, 16, 17, 18, 19, 20, 21, 22, 23, 24, 25, 26, 27, 28, 29 or 30 degrees), in certain embodiments. The wall thickness of a proximal section may be constant over the length of the section, or may vary with the length of the proximal section (e.g., the wall of the proximal section closer to the distal section of the pipette tip may be thicker or thinner than the wall closer to the top of the proximal section; the thickness may continuously thicken or thin over the length of the wall). In certain embodiments, the walls of proximal region 15 do not have a continuous axial thickness. That is, the thickness of the walls in proximal region 15 sometimes decreases axially towards the midpoint of proximal region 15, then increases axially from the midpoint towards the junction of proximal region 15 and distal region 20. In some embodiments, the walls of proximal thickness 15 have a continuous circumferential thickness. That is, the thickness of the walls in proximal region 15, as viewed in a particular cross section, do not vary in thickness. A proximal section of a pipette tip may contain a filter, insert or other material.

The wall of the distal section of a pipette tip sometimes is continuously tapered from the wider portion, which is in effective connection with the proximal section, to a narrower terminus. The wall of the distal section, in some embodiments, forms a stepped tapered surface. The angle of each taper in a distal section is between about zero degrees to about thirty degrees from the central longitudinal vertical axis of the pipette tip (e.g., about 0, 1, 2, 3, 4, 5, 6, 7, 8, 9, 10, 11, 12, 13, 14, 15, 16, 17, 18, 19, 20, 21, 22, 23, 24, 25, 26, 27, 28, 29 or 30 degrees), in certain embodiments. In some embodiments, the wall of the distal section forms stepped vertical sections. The wall thickness of a distal section may be constant along the length of the section, or may vary with the length of the section (e.g., the wall of the distal section closer to the proximal section of the pipette tip may be thicker or thinner than the wall closer to the distal section terminus; the thickness may continuously thicken or thin over the length of the wall). The distal section of a pipette tip generally terminates in an aperture through which fluid passes into or out of the distal portion. In some embodiments, the interior surface of the distal region is substantially smooth. In certain embodiments, the exterior surface of the distal region comprises a step. In some embodiments, a distal section of a pipette tip may contain a filter, insert or other material.

Many features of the pipette tip embodiments described herein are shared between the pipette tip embodiments of different sizes. Therefore, the features will be described in detail for one pipette tip size and related to the similar features of the pipette tip embodiments of other sizes.

Pipette Tip Embodiments Comprising Proximal Flange Feature

Figure 1B:
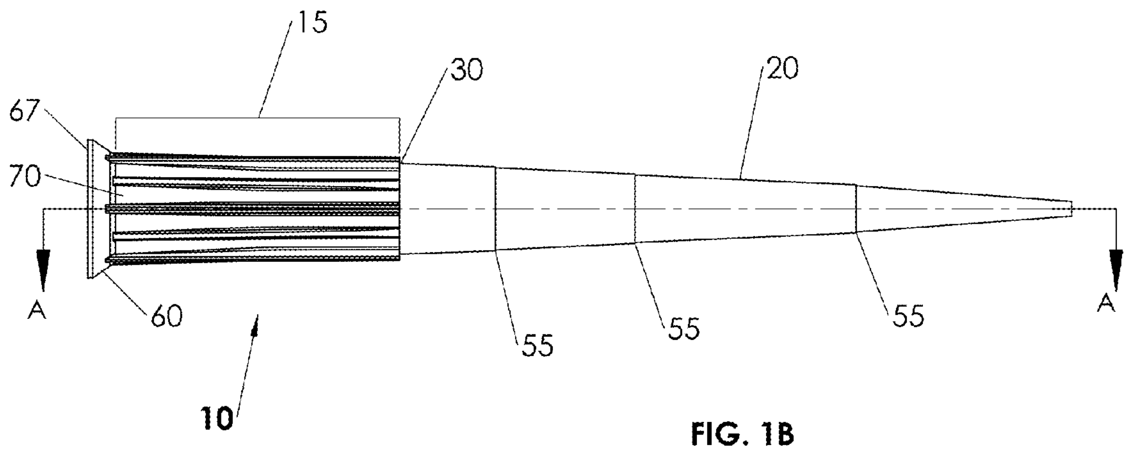

Certain pipette tip embodiments can include a flared lead-in surface at the end of the proximal region. Certain pipette tip embodiments may include a flange (e.g., annular flange) at the end of each pipette tip in the proximal region. In such embodiments, the flange may be flared, and the lead-in diameter of the flange can allow for dispenser engagement tolerance, which is relevant for multi-dispenser applications, for example. Such a flange can provide a larger contact zone for engaging a pipettor nozzle, and can increase the probability of a sealing engagement between the dispenser nozzle not coaxially aligned with a pipette tip by guiding the axial center of the pipette tip to axial center of the dispenser nozzle. An annular flange also can provide pipette tip rigidity in addition to facilitating dispenser alignment. In some embodiments, pipette tips described herein include an annular flange at the proximal terminus of the proximal region. An example of a flared lead-in surface and flange is illustrated in FIGS. 1A and 1B (e.g., 60, 65 and 70).

Pipette Tip Embodiments Comprising Blade Feature

Some pipette tip embodiments can include a distal region having a tapered wall thickness and terminating with a "knife edge" thickness. The term "knife edge" or "blade," as used herein refers to an edge resulting from a continuous taper of a pipette wall surface. The taper can be established by the inner surface disposed at a different angle than the outer surface along all or a portion of the axial length of the distal region. In certain embodiments, the surfaces form a sharply defined single contiguous edge or boundary of minimal thickness. This feature can reduce the area of the surface to which liquid droplets can adhere, and also may reduce the surface tension between the tip and the droplets, thereby reducing the probability and frequency with which droplets may adhere to the discharge aperture of the pipette tips. This feature also can reduce the number of times a user needs to touch a pipette tip to a surface to remove a droplet adhered to the pipette tip, which sometimes is referred to as "touching off." This feature also may increase precision and accuracy in manual or automated applications ("precision" and "accuracy" are described in further detail below).

The term "minimal thickness" as used herein refers to a value representative of the limits of current and future manufacturing and molding capabilities. Factors such as plastic viscosity and flow characteristics, as well as plastic hardeners (e.g., currently available plasticizers or hardeners, or plasticizers yet to be formulated) also may contribute to the minimal thickness attainable for pipette tips described herein. Therefore, thicknesses described herein for pipette tip walls of the distal opening (e.g. the edge or blade walls of the opening) sometimes are at the current limit of molding and manufacturing technology, and it is possible that future molding, manufacturing and plastics technology will result in lesser thicknesses.

In some embodiments, the lower (or distal) about one-quarter of the distance 40 from the distal region terminus 50 to the junction 30, may comprise a distal terminus 50 featuring a knife or blade edge wall thickness 53 in the range of about 0.0040 inches to about 0.0055 inches thick. In some embodiments, the wall thickness 53 at distal terminus 50 can resemble a blade or knife edge and can be about 0.0040 inches, 0.0041 inches, 0.0042 inches, 0.0043 inches, 0.0044 inches, 0.0045 inches, 0.0046 inches, 0.0047 inches, 0.0048 inches, 0.0049 inches, 0.0050 inches, 0.0051 inches, 0.0052 inches, 0.0053 inches, 0.0054 inches, or about 0.0055 inches thick, in certain embodiments. In some embodiments, the wall thickness at the distal region terminus is about 0.0043 inches to about 0.0050 inches. In certain embodiments, the wall thickness at the distal region terminus is about 0.0044 inches to about 0.0049 inches. In certain embodiments, the distal region comprises a wall thickness that tapers from (a) a point at or between (i) about the junction of the proximal region and distal region 30 to (ii) about one quarter of the axial distance 40 from the terminus of the distal region to the junction 30, to (b) the distal region terminus 50, as illustrated in FIG. 1A.

Without being limited by theory, a knife edge or blade feature (e.g., distal region terminus wall thickness 53) may reduce the area of the surface to which liquid droplets can adhere, and also may reduce the surface tension between the tip and the droplets, thereby reducing the probability and frequency with which droplets may adhere to the discharge aperture of the pipette tips. Without being limited by theory, the "inverse taper" (e.g., the taper of the inner surface caused by the thinning of the distal terminus, while the outer surface taper remains constant) of the blade feature may cause drops of liquid to become less likely to adhere to the pipette tip while being dispelled from the pipette tip due to the combination of increased drop surface area and surface tension (e.g., the drop is stretched due to the internal inverse taper) and decreased pipette tip inner surface area, in some embodiments. Without being limited by theory, the combination of increased drop surface area and surface tension combined with the decreased pipette tip surface area enables the efficient release of liquid droplets from the surfaces of the pipette tip. This feature also may lessen the number of times a user needs to touch a pipette tip to a surface to remove a droplet adhered to the pipette tip, and also may increase precision and accuracy in manual or automated applications. Reducing the number of times a user needs to touch off may help increase throughput of samples (e.g., time savings), increase accuracy of sample delivery (e.g., delivery of entire sample or reagent), and decrease costs (e.g., fewer repetitive injury claims, higher sample throughput, and fewer repeated samples due to pipetting error or inaccuracy). An example of the time savings associated with the combination of blade feature, flange feature and flexible region feature is described in the Examples section herein. The term "user" as used herein refers to a person or extension under the direct or indirect control of a person (e.g., a pipettor, an automated device, an automated device controlled by a computer).

Pipette Tip Embodiments Comprising Flexible Feature(s)

Some pipette tip embodiments can comprise one or more flexible features. In certain embodiments, a pipette tip includes a section of flexible thickness (e.g., proximal region) that sometimes also can include axially oriented alternating regions of increased thickness (e.g., axially oriented ribs or sets of ribs). In some embodiments, the ribs comprise a first set and a second set of axially oriented ribs. In certain embodiments, the axially oriented ribs can be alternately spaced and circumferentially spaced around the external surface of the proximal region of the pipette tip.

A terminus of a dispenser often sealingly engages an inner portion of a pipette tip at a sealing zone, which generally is located a particular distance from the proximal terminus of the pipette tip. Thus, a sealing zone in certain embodiments is disposed a particular distance below the terminal opening of the pipette tip (e.g., the sealing zone is offset from the edge of the pipette tip). A sealing zone often is a point at which a fluid tight, frictional and/or sealing engagement occurs between a pipette tip and a dispenser. A sealing zone is axially coextensive with a region of flexible thickness and/or increased thickness (e.g., ribs) in some embodiments. In certain embodiments, the proximal region comprises a sealing zone. In some embodiments, a sealing zone provides a continuous contact zone for frictional and/or sealing engagement between a pipette tip and a dispenser.

Figure 9:
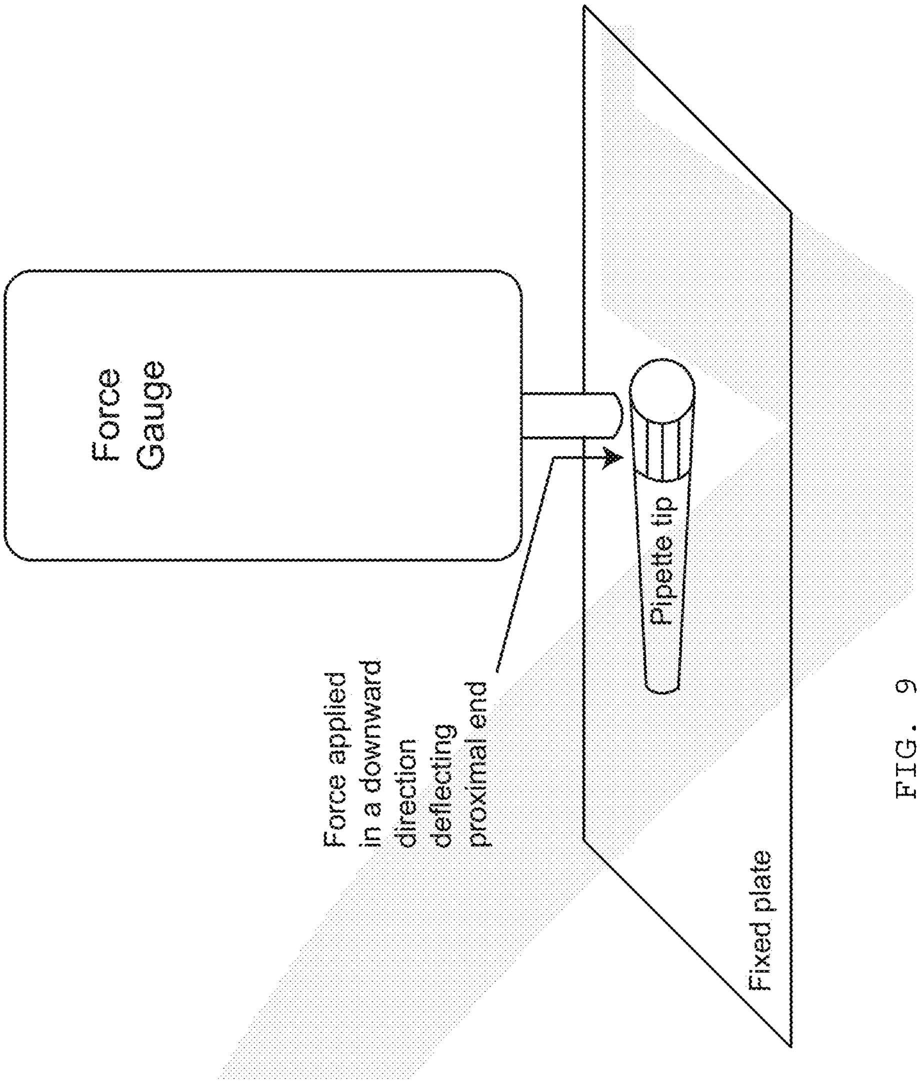
FIG. 9 illustrates the experimental protocol used for the pipette tip flexibility deformation test. In the experiment, a pipette tip embodiment described herein is compared to pipette tips currently commercially available. The results are presented in graphical form in FIG. 10.
Figure 10:
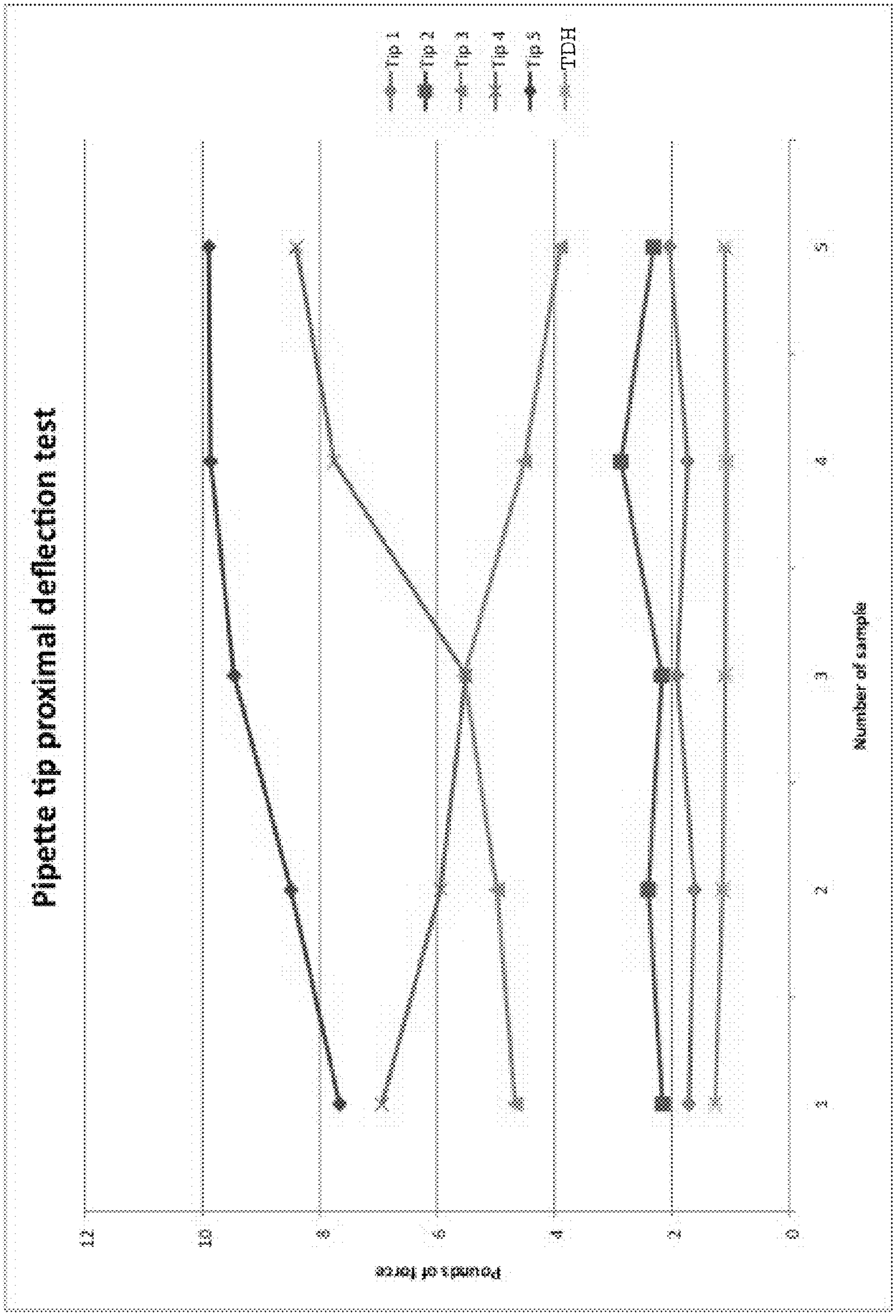
FIG. 10 graphically illustrates the data from the pipette tip deformation experiment. "TDH" in the legend of FIG. 10, and subsequent figures, refers to "Tip Described Herein". The data is also presented in table form in Example 1.

Incorporating a flexible region (e.g., flexible thickness) in a pipette tip proximal region (e.g., at a sealing zone) can reduce the amount of axial force required to engage and/or disengage a pipette tip from a dispenser. A pipette tip sometimes includes a flexible proximal region where the softness or flexibility allows deflection of the proximal region when a deflecting force is applied. The softness or flexibility sometimes is referred to as a "softness rating" or a "flexibility rating." Any suitable method can be used to measure pipette tip flexibility in the flexible region of a pipette tip. Non-limiting examples of tests that can be utilized to measure pipette tip flexibility include a deformation test, a pipette tip engagement test, a pipette tip ejection test, the like and combinations thereof. A pipette tip deformation test sometimes includes the use of a force gauge to press down on an outer surface (e.g., proximal outer surface, distal outer surface, proximal and distal outer surfaces) of the pipette tip, and the force necessary to cause deformation of the normal pipette tip shape by a predetermined amount, is recorded. Often the measurement is presented as pounds of force necessary to deform the pipette tip, and sometimes the measurement can be presented in grams of force necessary to deform a pipette tip, attach a pipette tip to a pipettor, and/or eject a pipette tip from a pipettor. An example of a deformation flexibility experiment is shown in FIG. 9, and the results of the deformation experiment are presented graphically in FIG. 10 and in table form in the examples herein. Pipette tip engagement and ejection experiments sometimes includes the use of digital force gauges to measure the amount of force exerted during pipette/pipette tip engagement and pipette tip ejection. Examples of experiments performed to measure pipette tip deflection (softness of tip), engagement force and ejection force are presented in the Examples.

As noted above, a pipette tip generally is affixed to a dispensing device by inserting a portion of the dispenser (e.g., dispenser barrel, tip or nozzle) into the proximal or receiving end of a pipette tip with a downward or axial force. The downward force applied to the dispenser that can securely engage the pipette tip may be less than pipette tips currently manufactured. A proximal region having flexible thickness (e.g., in the sealing zone) can reduce the amount of axial force required to engage and/or disengage a pipette tip to a dispenser. Non-limiting examples of reduced axial forces include an average, mean or nominal axial force reduction of about 20% to about 80% of the force required to engage standard inflexible pipette tips (e.g., about 25%, 30%, 35%, 40%, 45%, 50%, 55%, 60%, 65%, 70%, or 75% of the force required to engage pipette tips currently manufactured). A non-limiting example of a manufactured inflexible pipette tip that can be used as a standard against which to compare mean or nominal axial force reduction, is manufactured by Eppendorf International (e.g., Eppendorf Dualfilter 100 microliter tip, USA/CDN Catalog No. 022491237).

Without being limited by theory, circumferentially spaced regions of increased thickness (e.g., axially oriented ribs or sets of ribs) disposed on or protruding from a flexible thickness at or near a sealing zone can allow, and can limit, a certain degree of radial expansion of a circumference around the proximal region of the pipette tip, and/or segmental expansion of the proximal region of the pipette tip. Radial expansion and segmental expansion can allow for a secure, fluid tight sealing engagement of a pipette tip with different dispensers having disparate nozzle or barrel diameters. Radial and segmental expansion properties can be a result of circumferentially spaced alternating regions of thicker and thinner ribs, in some embodiments.

Certain flexible features described herein can reduce costs and injuries associated with repetitive motions, and increase efficiency, precision and accuracy of pipette tip use. For example, reducing the axial force required for engagement and/or disengagement of a pipette tip with a dispenser. Also, reducing the frequency of "touching off" can reduce the number of repetitive motions associated with using pipette tips.

In some embodiments, a proximal region comprises a wall thickness of about 0.005 inches to about 0.015 inches at or near the sealing zone (e.g., about 0.006, 0.007, 0.008, 0.009, 0.010, 0.011, 0.012, 0.013, 0.014 inches). In some embodiments, the proximal region comprises a wall thickness of about 0.008 inches to about 0.012 inches or about 0.009 inches to about 0.011 inches. The latter-referenced wall thickness is measured at a point of the proximal region where there are no ribs (e.g., a point between ribs). Such a thickness measurement sometimes is measured at or near where callout 70 in FIG. 2 meets the pipette tip proximal region, for example. In some embodiments, the thickness of proximal region 15 gradually increases below the sealing zone towards the proximal region/distal region junction. Without being limited by theory, the increased thickness below the sealing zone may limit the travel of a dispenser past the sealing zone, due to the larger force required to insert the dispenser past the sealing zone as a result of a thicker, less flexible area in the proximal region.

In some embodiments, the wall thickness at the junction of the proximal region and the distal region, measured from the interior surface to the exterior surface of the pipette tip, is about 0.017 inches to about 0.030 inches thick (e.g., about 0.018, 0.019, 0.020, 0.021, 0.022, 0.023, 0.024, 0.025, 0.026, 0.027, 0.028, 0.029). In some embodiments, the wall thickness at this junction is about 0.022 to about 0.027 inches thick, or about 0.023 to about 0.026 inches thick. In certain embodiments, the step from the exterior surface of the distal region to the exterior surface of the proximal region at the proximal region/distal region junction is about 0.003 inches to about 0.008 inches thick (e.g., about 0.004, 0.005, 0.006, 0.007 inches thick). This step is located at about the position in FIG. 2 where callout 72 meets the pipette tip.

In certain embodiments, the proximal region comprises a first set of axially extended ribs (e.g., 80) and a second set of axially extended ribs (e.g., 85). Axially extended ribs, which also are referred to herein as "axially oriented ribs," are longer in the direction of the pipette tip axis, where the axis extends from the center of the proximal region terminus cross section to the center of the distal region terminus cross section. Axially extended ribs are shorter in the radial, circumferential direction around the pipette tip. In certain embodiments, the longer length of axially extended ribs is parallel to the pipette tip axis. In some embodiments, the longer length of axially extended ribs is at an angle with respect to the pipette tip axis, which angle sometimes is between about zero to ten degrees from such axis.

In some embodiments, one or more ribs are longer than other ribs on a pipette tip. Ribs of the first set sometimes are longer than ribs of the second set, and in certain embodiments, ribs of the first set are shorter than ribs of the second set. In certain embodiments, the axial length of one or more ribs (e.g., all ribs) is substantially equal to the axial length of the proximal region (e.g., proximal region 15, illustrated in FIG. 2 and FIG. 3).

In some embodiments, a pipette tip comprises a set of axially extended ribs circumferentially spaced around the external surface of the proximal region of the pipette tip. The term "circumferentially spaced," "circumferentially configured," "circumferentially disposed" and the like as used herein, refer to axially extended ribs disposed around a circumference of the proximal region of a pipette tip.

In certain embodiments, ribs of a first set and a second set are circumferentially spaced and alternately spaced around the external surface of the proximal region. The terms “alternately spaced”, “spaced alternately,” “alternates” and grammatical equivalents thereof, when used to describe spacing between ribs, or sets of ribs, can refer to one or more ribs of the first set or first type between two ribs of the second set or second type, or one or more ribs of the second set or second type between two ribs of the first set or first type, and combinations of the foregoing. In some embodiments, there can be one or more circumferential spacing distances between ribs (e.g., ribs may be spaced equidistant from one another or may be spaced with different distances). Ribs may be patterned around the proximal region of a pipette tip in a regular pattern (e.g., all ribs are equidistantly spaced, some ribs are equidistantly spaced) in some embodiments, and in certain embodiments, ribs are spaced in an irregular pattern. In some embodiments, all ribs are equidistant from one another along a circumference of the pipette tip, and thereby are spaced regularly along the circumference.

A pipette tip may include any suitable number of ribs that confer proximal region flexibility. In some embodiments, pipette tips comprise about 4 or more ribs, and sometimes about 6 to about 60 ribs (e.g., about 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59 ribs). In certain embodiments, a pipette tip includes a total of about 8 to about 16 ribs. In some embodiments, a pipette tip comprises a number of ribs in a first set equal to the number of ribs in a second set. In some embodiments, a pipette tip includes about 3 to about 20 ribs of a first set and about 3 to about 20 ribs of a second set.

Figure 2:
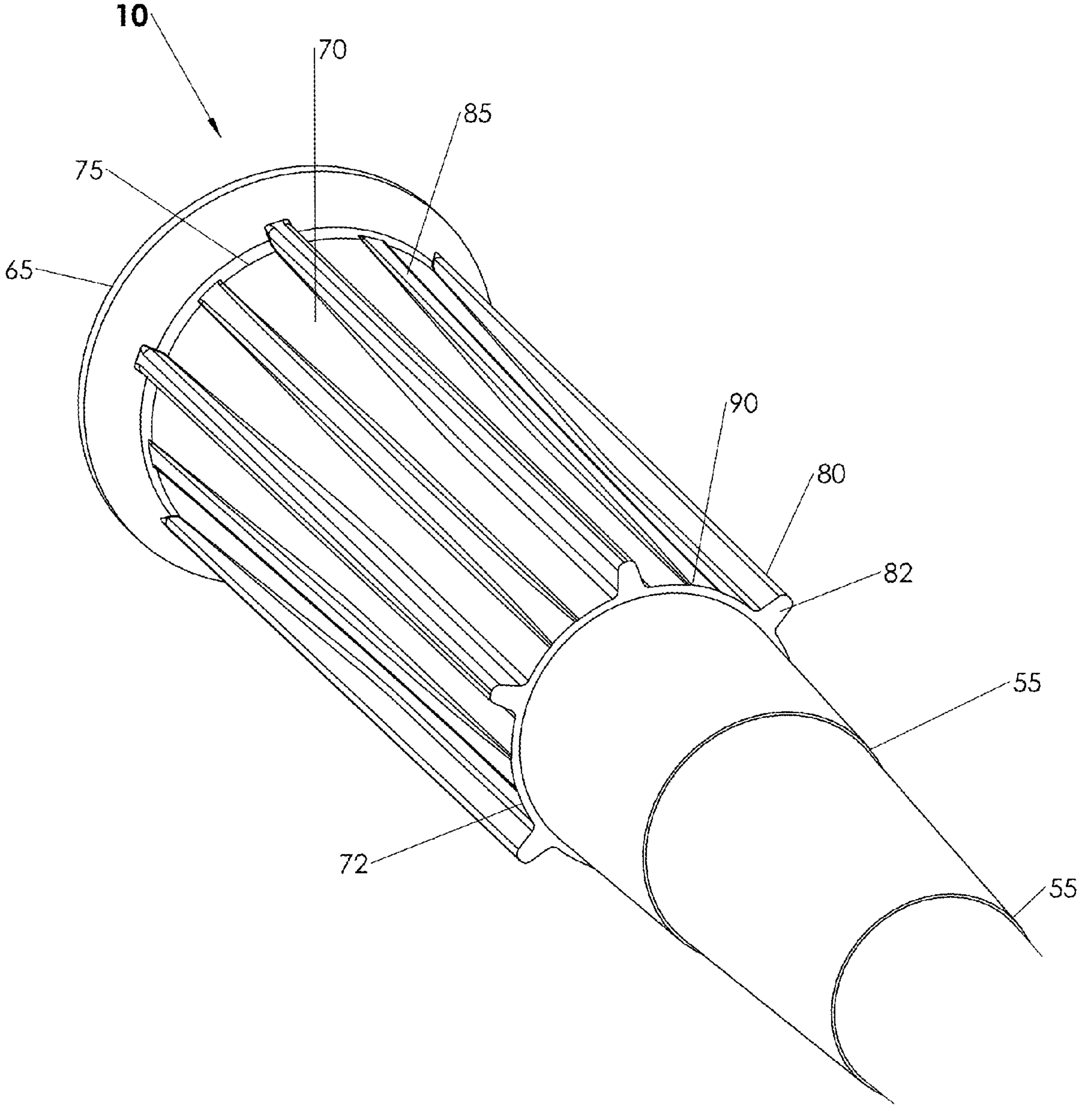
FIG. 2 is an enlarged perspective view of the proximal portion of the pipette tip embodiment described in FIG. 1.

Ribs on a pipette tip have a particular thickness (e.g., height measured from the exterior surface of the pipette tip proximal region; height measured from the surface to which callout 70 in FIG. 2 connects) and a particular width (e.g., the width of the face to which callout 85 in FIG. 2 connects). In certain embodiments, the maximum thickness of a rib is about 0.060 inches, and sometimes the maximum thickness of a rib is about 0.037 inches to about 0.060 inches (e.g., about 0.038, 0.039, 0.040, 0.041, 0.042, 0.043, 0.044, 0.045, 0.046, 0.047, 0.048, 0.049, 0.050, 0.051, 0.052, 0.053, 0.054, 0.055, 0.056, 0.057, 0.058, 0.059 inches thick). Sometimes the maximum thickness of a rib is about 0.016 inches to about 0.027 inches thick (e.g., about 0.017, 0.018, 0.019, 0.020, 0.021, 0.022, 0.023, 0.024, 0.025, 0.026 inches thick), and sometimes the maximum thickness of a rib is about 0.011 to about 0.021 inches thick (e.g., about 0.012, 0.013, 0.014, 0.015, 0.016, 0.017, 0.018, 0.019, 0.020 inches thick). The foregoing thickness can be applicable to a first set of ribs, and if a second set of ribs is present on a pipette tip, the second set of ribs often have a smaller maximum thickness. For a second set of ribs, the maximum thickness sometimes is about 0.003 inches to about 0.009 inches thick (e.g., about 0.004, 0.005, 0.006, 0.007, 0.008, 0.009 inches thick). In some embodiments, the first set of ribs have a maximum thickness about 2-fold to about 10-fold greater than the maximum thickness of the second set of ribs (e.g., about 3-fold, 4-fold, 5-fold, 6-fold, 7-fold, 8-fold, 9-fold greater). The width of ribs on a pipette tip sometimes is about 0.015 inches to about 0.025 inches (e.g., about 0.016, 0.017, 0.018, 0.019, 0.020, 0.021, 0.022, 0.023, 0.024 inches). In some embodiments, the maximum thickness of a rib is about 1.2-fold to about 7-fold greater than the wall thickness of the pipette tip at or near the sealing zone (e.g., about 2-fold, 3-fold, 4-fold, 5-fold, 6-fold greater). Where a second set of thinner ribs are present on a pipette tip, the pipette tip wall thickness at or near the sealing zone sometimes is about 1.2-fold to about 2.0-fold thicker than the maximum thickness of the ribs in the second set (e.g., about 1.2, 1.4, 1.5, 1.6, 1.7, 1.8, 1.9-fold thicker).

In certain embodiments where there are different types of ribs on a pipette tip, ribs of a first set have a maximum thickness greater than the maximum thickness of ribs of a second set. In some embodiments, ribs of a first set (e.g., 80) have a mean thickness greater than the mean thickness of ribs of a second set (e.g., 85). In certain embodiments, ribs of the first set have a nominal thickness greater than the nominal thickness of ribs of the second set, and in some embodiments, ribs of the first set have an average thickness greater than the average thickness of ribs of the second set. In certain embodiments, the thickness at or near the proximal terminus of the distal region is substantially similar to the thickness at or near the distal terminus of the proximal region.

Ribs can have any useful profile shape, as seen from the side or the end, with the proviso the shape is suitable for adding rigidity to proximal region 15 flexible thickness 70. Non-limiting examples of profile shapes that can be utilized for ribs in pipette tips described herein include arc, pyramid, flat, rectangle, semi-circular, stepped, rhombus, parallelogram, trapezoid and the like, and combinations of the foregoing. In some embodiments, the size and shape of the distal terminus of ribs 80 and 85 also provides additional surface area for seating engagement with a pipette tip rack or a nested pipette tip. In some embodiments, ribs can be configured to have additional termini 83 (e.g., ribs with a stepped shape or profile, not shown in FIG. 2, but see termini 283 and 383 in FIGS. 5 and 6, respectively).

In some embodiments, one end of ribs in the first set, one end of ribs in the second set, or one end of ribs in the first and the second set is co-extensive with, or terminates at, the flange. In some embodiments, one end of ribs in the first set, one end of ribs in the second set, or one end of ribs in the first and the second set is co-extensive with, or terminates at the junction between the flange and proximal region. In certain embodiments, one end of ribs in the first set, one end of ribs in the second set, or one end of ribs in the first and the second set is co-extensive with, or terminates at the junction between the proximal region and the distal region. In some embodiments, one end of ribs in the first set, of ribs in the second set, or of ribs in the first set and the second set extend from the junction of the flange and proximal region to the junction of the proximal and distal regions. In some embodiments, one or more (e.g., all) ribs on a pipette tip extend over the sealing zone.

FIG. 1A and FIG. 2 show certain rib embodiments. Extending axially from near the base of flange 60 to junction 30, and spaced circumferentially around the external surface of proximal region 15, are alternating ribs 80 and 85 or rib sets, in some embodiments. Alternating ribs 80, 85 often have different maximum, mean, average or nominal thicknesses. In some embodiments, proximal region 15 may comprise flexible thickness 70 with alternating regions of first rib thickness (e.g., ribs of the first set) 80 and second rib thickness (e.g., ribs of the second set) 85 on the exterior surface of proximal region 15. In certain embodiments, the circumferential and axial midpoint of the alternating ribs are spaced around a circumference of the pipette tip proximal region.

In some embodiments, the thickness of proximal region 15 flexible thickness 70 can vary. In certain embodiments, the thickness can taper from a from a less flexible to a more flexible thickness (e.g., to about 0.008 inches to about 0.012 inches or about 0.009 inches to about 0.011 inches). In some embodiments, the thickness of proximal region 15 can gradually increase from a more flexible thickness to a less flexible thickness (e.g., about 0.022 to about 0.027 inches thick, or about 0.023 to about 0.026 inches thick) towards the distal end of proximal region 15, at or near junction 30. In certain embodiments, the thickness of proximal region 15 flexible thickness 70 can taper towards the sealing zone and gradually increase towards junction 30. In some embodiments, the thickness of proximal region 15 flexible thickness 70 can remain constant. In certain embodiments, the thickness of proximal region 15 flexible thickness 70 does not have a continuous axial thickness in the region of the sealing zone.

Figures 3, 4A, 4B, 4C, 4D:
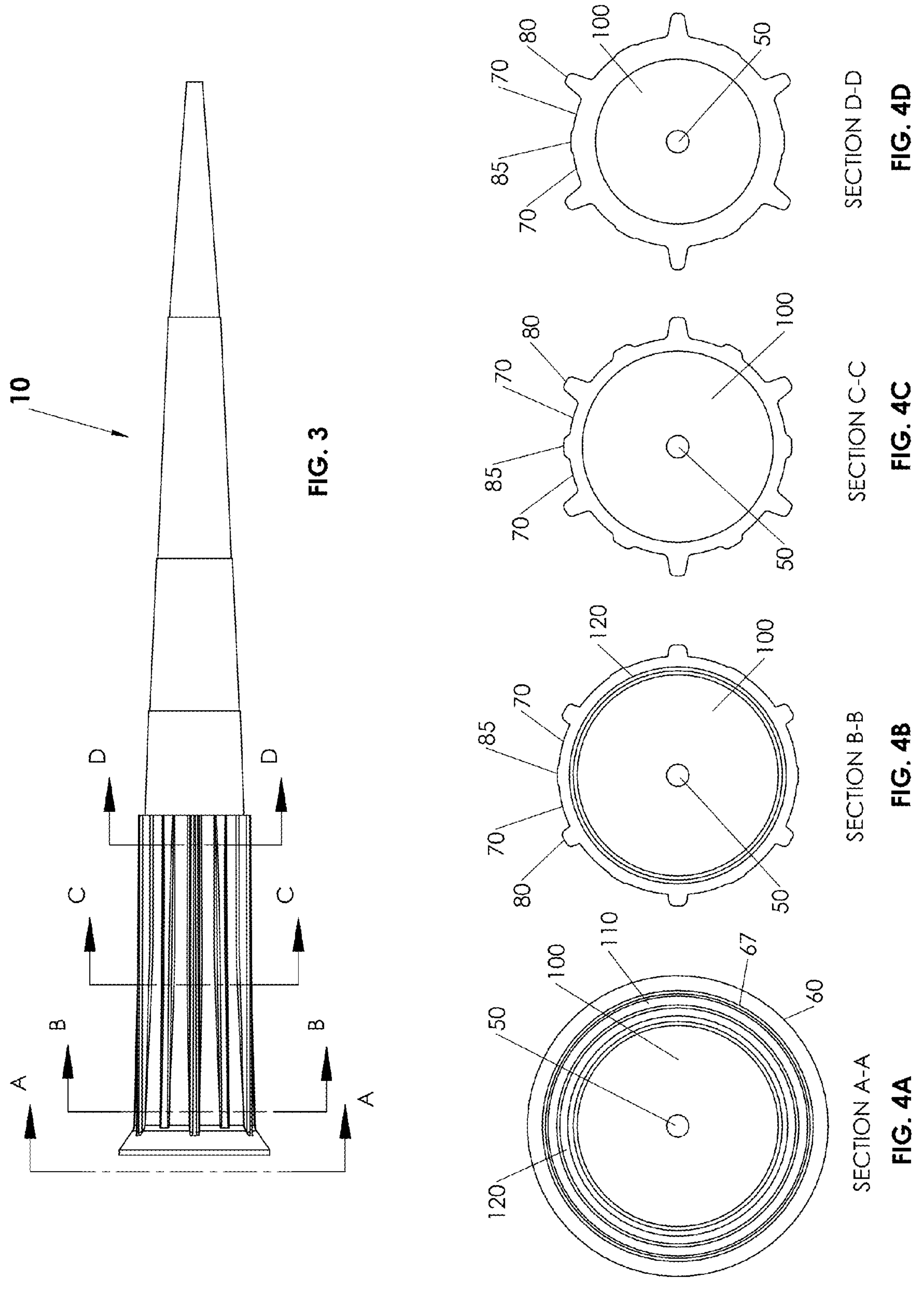
FIG. 3 represents a side view of the pipette tip embodiment described in FIGS. 1 and 2, labeled to illustrate various cross-sections presented in FIGS. 4A-4D.
FIGS. 4A-4D illustrate views looking down at the cross-sections taken along the lines illustrated in FIG. 3.

Without being limited by theory, the combination of proximal region 15 flexible thickness 70 and the regions of increased thickness in ribs 80 and 85 may allow some radial and/or segmental expansion to accommodate, and sealingly engage, the leading edge of an inserted pipette nozzle or barrel, while also reducing the axial force required to achieve said sealing engagement. Illustrated in FIGS. 4B-4D are the heights and widths of alternating ribs 80, 85 at each lower successive cross-section in proximal region 15. The increase in the height (e.g., protrusion above proximal region 15 flexible thickness 70) and width along the axial length of the ribs provides for an increase in rigidity towards the distal portion of the proximal region near junction 30, thereby providing a lower zone, in the proximal region, past which an engaging pipettor nozzle cannot be inserted, without the application of excessive downward axial forces. The term "excessive downward axial forces" as used herein refers to the application of sufficient force to cause physical damage or deformation of the pipette tip, such that the pipette tip is no longer capable of functioning for its intended purpose.

The radial and/or segmental expansion that accommodates, and sealingly engages the leading edge of an inserted pipette nozzle, can be attributed to the flexible thickness of the proximal region. The flexible thickness can be rated in terms of its softness or flexibility. In some embodiments, the softness or flexibility can be measured as pounds of force required for deflection, and in certain embodiments, the softness or flexibility can be measured as grams of force required for deflection, tip insertion or tip ejection. A non-limiting method of measuring softness or flexibility is determining the amount of force required to cause a predetermined amount of deflection in the proximal region of the pipette tip, using a digital force gauge, and is described in further detail in Example 1.

In some embodiments, pipette tips described herein sometimes have a mean, nominal or average deflection force to deflect a pipette tip a given (e.g., defined) amount from the resting position of below about 1.75 pounds of force, below about 1.70 pounds of force, below about 1.65 pounds of force, below about 1.60 pounds of force, below about 1.55 pounds of force, below about 1.50 pounds of force, below about 1.45 pounds of force, below about 1.40 pounds of force, below about 1.35 pounds of force, below about 1.30 pounds of force, below about 1.25 pounds of force, below about 1.20 pounds of force, below about 1.15 pounds of force, and below about 1.10 pounds of force required for deflection of the pipette tip proximal region. In some embodiments, a pipette tip proximal region has a minimal deflection force of about 1.07 pounds. In certain embodiments, a pipette tip proximal region has a maximal deflection force of about 1.75 pounds. In some embodiments, a pipette tip has a deflection force in the range of between about 1.07 pounds and about 1.26 pounds (e.g., about 1.07 pounds, about 1.08 pounds, about 1.09 pounds, about 1.10 pounds, about 1.11 pounds, about 1.12 pounds, about 1.13 pounds, about 1.14 pounds, about 1.15 pounds, about 1.16 pounds, about 1.17 pounds, about 1.18 pounds, about 1.19 pounds, about 1.20 pounds, about 1.21 pounds, about 1.22 pounds, about 1.23 pounds, about 1.24 pounds, about 1.25 pounds, and about 1.26 pounds of force).

Without being limited by theory, regions of increased wall thickness (e.g., ribs 80, 85) may help retain tip integrity under circumstances where excess downward axial forces are applied, for example. Additionally, alternating ribs may aid in providing a better sealing engagement by ensuring the correct longitudinal axis alignment of the pipettor barrel and the sealing zone in proximal region 15. In some embodiments, the additional rigidity offered by ribs 80, 85 may direct the advancing pipettor barrel into the correct alignment to ensure a fluid tight, sealing engagement of pipette tip embodiment 10 and a pipettor nozzle or barrel.

In some embodiments, the co-extensive bottom or terminus surfaces of proximal region 15 flexible thickness 70 and ribs 80, 85 (e.g., rib termini 82 and 90, respectively), near junction 30, can provide a seating support surface 72. In some embodiments, the terminus surfaces are configured to have a width sufficient to overlap the diameter of the openings commonly found in many commercially available pipette tip storage units, and can therefore interact with pipette tip rack, pipette card or pipette box, support surfaces to provide seating engagement. Thus, the pipette tip embodiments described herein are configured in a manner compatible with many commercially available pipette tip storage systems, in some embodiments.

Advantageous Benefits of Flange, Flexible and Blade Features

The advantageous benefits of features described herein (e.g., flange feature, blade feature, flexible features, or combinations thereof) sometimes is a cumulative effect realized over the course of repeated cycles of pipetting. A pipette cycle frequently includes the steps of (a) applying a pipette tip to a pipettor, (b) aspirating a solution, (c) dispensing the solution into a receptacle, and (d) ejecting the pipette tip from the pipettor. In certain embodiments, dispensing optionally includes one or more of (i) touching the distal terminus of the pipette tip to a wall of the receptacle after the fluid is dispensed from the interior of the tip, (ii) visual inspection of the tip to determine if any liquid adhered to the tip, or (iii) touching the distal terminus of the pipette tip to a wall of the receptacle after the fluid is dispensed from the interior of the tip and visual inspection of the tip to determine if any liquid adhered to the tip. Pipetting efficiency sometimes can be measured by the time required to complete one, two, three, four, five or more pipetting cycles involving steps (a) to (d). In some embodiments, pipetting efficiency is measured by determining the average time required to complete three full cycles of steps (a) to (d). In some embodiments, step (c) includes touching the distal terminus of the pipette tip to a wall of the receptacle after the fluid is dispensed from the interior of the tip.

In certain embodiments, the average time to compete three cycles of steps (a) to (d) is 20.88 seconds or less (e.g., about 20.88 seconds or less, about 20.80 seconds or less, about 20.75 seconds or less, about 20.70 seconds or less, about 20.65 seconds or less, about 20.60 seconds or less, about 20.55 seconds or less, about 20.50 seconds or less, about 20.45 seconds or less, about 20.40 seconds or less, about 20.35 seconds or less, about 20.30 seconds or less, about 20.25 seconds or less, about 20.20 seconds or less, about 20.15 seconds or less, about 20.10 seconds or less, or about 20.00 seconds or less). In some embodiments, the average time to complete a single cycle of steps (a) to (d) is about 6.7 seconds or less (e.g., about 6.7 seconds or less, about 6.6 seconds or less, or about 6.5 seconds or less). The average time to complete a single cycle of steps (a) to (d) can be determined by taking the average time to complete 3 cycles of steps (a) to (d) and dividing by 3, to arrive at the average time required to complete a single cycle. Similarly, the average time to complete a single cycle of steps (a) to (d) can be determined by taking the average time to complete any number of cycles and diving the time by the number of cycles.

Provided also herein is a method for manipulating a solution using pipette tips described herein, comprising: (a) applying a pipette tip to a pipettor, (b) aspirating a solution, (c) dispensing the solution into a receptacle, and (d) ejecting the pipette tip from the pipettor, where the average time to complete 3 cycles of steps (a) to (d) is about 20.88 seconds or less. In some embodiments the average time to complete a single cycle of steps (a) to (d) is about 6.7 seconds or less. In certain embodiments, dispensing includes touching the distal terminus of the pipette tip to a wall of the receptacle after the fluid is dispensed from the interior of the tip.

Measurements of pipetting efficiency can provide data allowing the results of modifications to pipette tip shape, features or materials to be quantified. Pipetting efficiency can be measured using the pipetting cycle tests described herein or using other methods of measurement known to a user. Accordingly, also provided herein is a method for measuring improved pipetting efficiency, comprising: (a) applying a pipette tip to a pipettor, (b) aspirating a solution, (c) dispensing the solution into a receptacle, and (d) ejecting the pipette tip from the pipettor, wherein achieving an average time to complete 3 cycles of steps (a) to (d) in about 20.88 seconds or less is indicative of improved pipetting efficiency. In some embodiments the average time to complete a single cycle of steps (a) to (d) is about 6.7 seconds or less. In certain embodiments, dispensing includes touching the distal terminus of the pipette tip to a wall of the receptacle and/or visually inspecting the pipette tip for liquid, after the fluid is dispensed from the interior of the tip.

Figure 16:
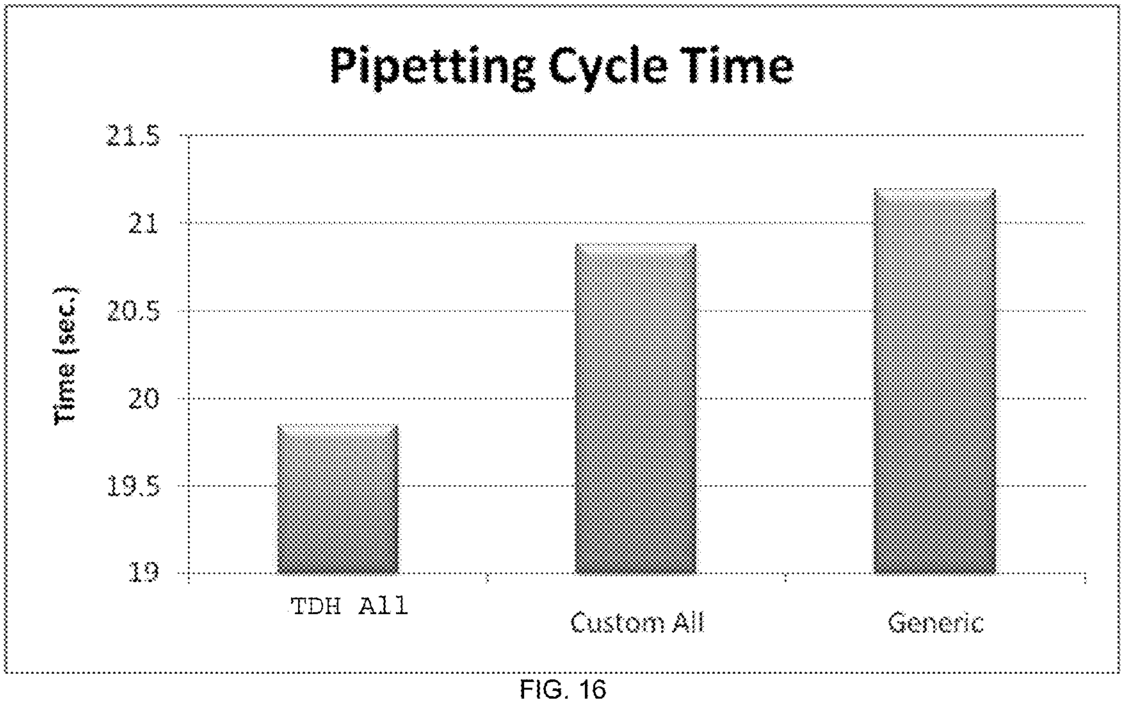
FIG. 16 graphically illustrates the average time to task completion for pipette cycling time. Experimental details are given in Example 2, and results are given in Example 5.
Figure 17:
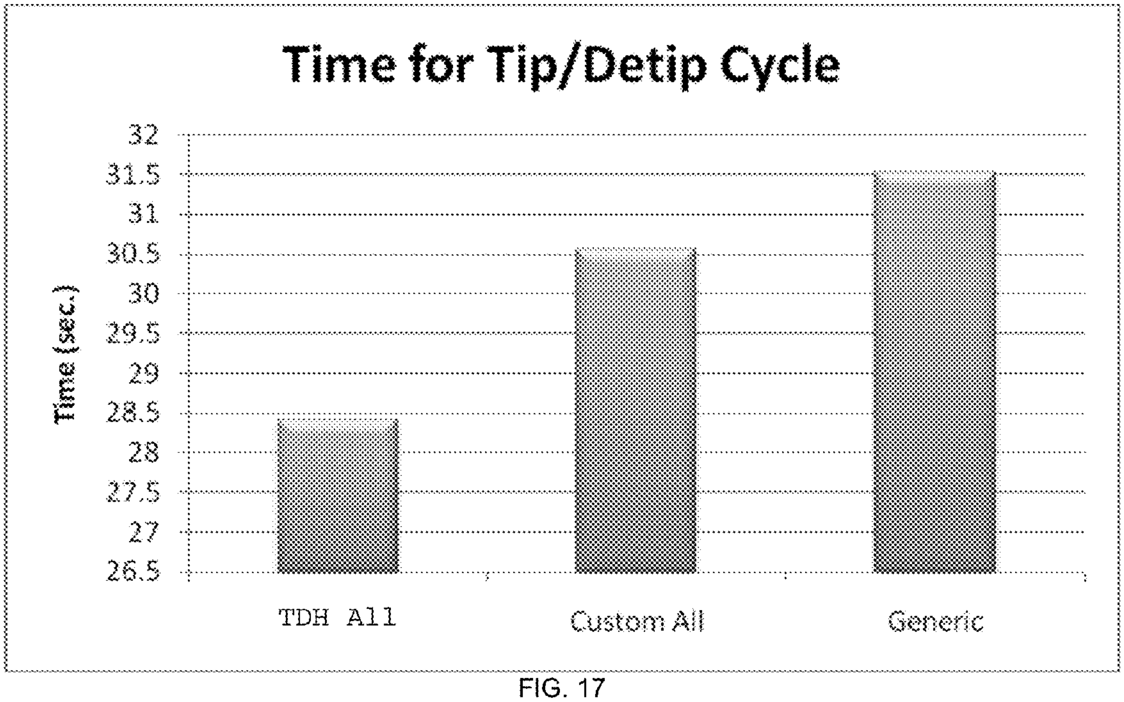
FIG. 17 graphically illustrates the average time to perform a tip/de-tip cycle. Experimental details are given in Example 2, and results are given in Example 5.

Example 5 and FIGS. 16 and 17 present data indicative of the average time to complete 3 pipette cycles for pipette tips described herein, as compared to custom and generic pipette tips. Tips described herein provide time savings advantages that, when scaled to the number of pipette tip cycles performed by a user on a daily, weekly, monthly and/or yearly basis, can provide significant time and cost savings. Custom and generic pipette tips are further described in the Examples.

In some embodiments the combination of features of pipette tips described herein contributes to a reduction in the average time required to complete one or more pipetting cycles of between about 20% and about 90%. In certain embodiments the reduction in time is due, in whole or in part, to a reduction in the amount of fluid that remains with the pipette tip. In some embodiments the pipette tip blade tip feature contributes to the reduction in liquid retained by the pipette tip. In certain embodiments the fluid retained by the pipette tip is less than about 0.065% of the liquid drawn into the tip after the liquid is dispensed. In some embodiments, the fluid retained by the pipette tip is no more than 0.00012% of the liquid drawn into the tip after the liquid is dispensed. In certain embodiments, less than 3.72% of the pipette tips described herein, utilized in a pipetting cycle, retain a portion of the liquid drawn into the pipette tips after the liquid is dispelled. In some embodiments, no more than 0.00012% of the pipette tips described herein, utilized in a pipetting cycle, retain a portion of the liquid drawn into the pipette tips after the liquid is dispelled. In certain embodiments, about 3.72% or less of the pipette tips described herein, utilized in a pipetting cycle, retain less than about 0.065% of the liquid drawn into the tips after the liquid is dispensed.

Other Features of Certain Pipette Tip Embodiments

Pipette tip embodiments also may comprise one or more of the following features illustrated in FIGS. 1A-D and FIG. 2: step(s) 55 along the outer surface of the distal region 20; region of inner surface where wall taper of the inner and outer surfaces reaches 0 degrees and the wall surfaces become parallel 57; flange 60; flange rim 65; flange lead-in surface 67; proximal region flexible thickness 70 that extends from the junction 75 of flange 60 and proximal region 15 to the junction 30 of proximal region 15 and distal region 20.

Figure 1C:
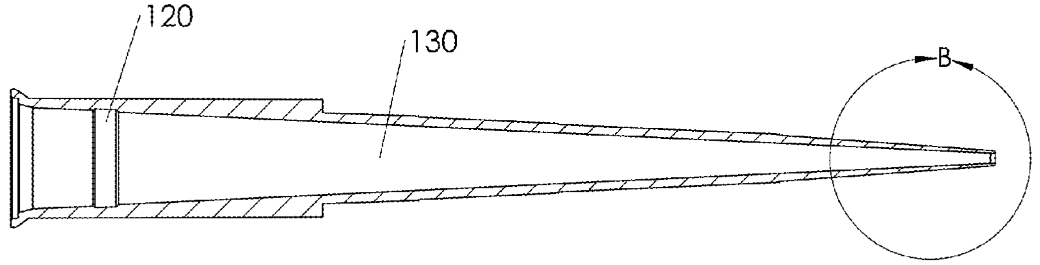
Figure 1D:
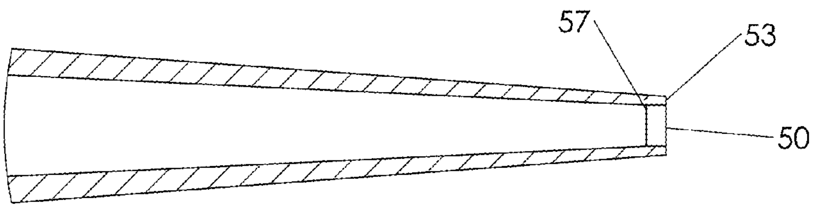

In certain embodiments, the interior surface 130 of the distal region 20 is substantially smooth, as illustrated in FIGS. 1C-1D. FIG. 1B provides a side view of 200 microliter pipette tip embodiment 10, highlighted with line 1C-1C that denotes the cross-section presented in FIG. 1C. FIG. 1B features are labeled identically to the features presented in FIG. 1A. FIG. 1C illustrates the substantially smooth interior surface 130 of the distal region 20, and also highlights detail area 1D, which is presented in FIG. 1D. Pipette embodiment 10 may comprise annular groove 120 on the interior surface of proximal region 15 (see FIG. 1C). Annular groove 120 may provide a region of increased surface area for interaction with a mold core pin, as described below in further detail. FIG. 1D is an enlarged view of the detail area highlighted in FIG. 1C. Illustrated in FIG. 1D is a gradually decreasing taper. The decreasing taper is denoted by the change in taper from about 4.2 degrees to about 2.7 degrees. The decrease in taper continues until the taper angle reaches 0 at or near region 57, in the range of about 0.008 to about 0.012 inches from distal region terminus 50. In some embodiments, the region of 0 degree taper 57 (e.g., the region where the inner and outer walls become essentially parallel, for example) can be about 0.008 inches, about 0.009 inches, about 0.010 inches, about 0.011 inches or about 0.012 inches from distal region terminus 50. This region, starting approximately 0.01 inches from distal terminus 50 and ending at distal terminus 50, defines the knife edge or blade region of pipette tip embodiment 10. The region where the taper ends is highlighted as a line 57 denoting the point where the inner and outer walls become essentially parallel (e.g., taper angle becomes 0 degrees). The distal terminus region wall 53 thickness in this area was described above, and in the embodiment illustrated in FIG. 1D is about 0.0044 inches thick.

In some embodiments, the exterior surface of the distal region may comprise a step. In certain embodiments, the exterior surface of the distal region may comprise more than one step. Exterior surface step(s) 55 can aid in visual assessment of the uptake or delivery of sample or reagent by providing external visual volumetric gradations, which allow the user to determine if sample has been successfully acquired or expelled, and can allow the user to visually determine how much sample has been delivered, in reverse pipetting applications for example. Reverse pipetting is the process whereby a pipettor plunger is depressed to its fully depressed position, and sample is taken up. Taking up sample in this manner allows more than the preset volume to be taken up. The preset volume of sample is then delivered by depressing the plunger to the first stop. This ensures delivery of the correct volume to more than one sample, since the pipette tip has actually taken up more than one volume of sample to be delivered. This technique can be useful for delivering a sample or reagent to many tubes, where the possibility of cross contamination is minimal (e.g., when pipetting the initial reagent or liquid into a tube, during reaction set up).

Proximal region 15 also may comprise a frustum-shaped cavity within the interior of proximal region 15, in certain embodiments, as illustrated in FIGS. 4A-4D. FIGS. 4A-4D illustrate a view looking down the top of various cross-sections of pipette tip embodiment 10. The areas, in proximal region 15, in which the cross-sections are taken, are illustrated in FIG. 3 as lines; A-A, B-B, C-C, and D-D. Also illustrated in FIG. 4A-4D (and not previously described) are proximal region inner surface 100, flange tapered inner surface 110, and annular groove 120. In some embodiments, the frustum-shaped cavity is substantially smooth.

In certain embodiments, the frustum-shaped cavity comprises an optional annular groove 120. As described above, annular groove 120 is an area of increased surface area formed during the molding process that corresponds to a portion of the mold core pin. The core pin often forms the internal surfaces of the object to be molded, for example the pipette tips described herein. The distance between the core pin and the mold cavity (e.g., the part of the mold that forms the outer surface of the object) determines the thickness of the object to be molded (e.g., pipette tip). The shape of the core pin can offer an increased surface area upon which the cooling pipette tip (e.g., specifically annular groove 120) may find purchase and therefore remain in contact with the core pin during cooling and separation from the portion of the mold that forms the pipette tip outer surface, which in turn may facilitate release and ejection of the pipette tip from the mold core after cooling of the pipette tip. Annular groove 120 resides on the interior surface 100 of proximal region 15. The sealing zone, which is located in the proximal region of a pipette tip, sometimes is located at a position in the pipette tip interior proximal of the annular groove 120, sometimes is located at a position distal to annular groove 120, and sometimes is located in the same region as annular groove 120.

In some embodiments, the proximal region also may be in connection with an annular flange 60 at the proximal terminus of proximal region 15. Flange 60 at the proximal terminus of pipette tip 10 in proximal region 15 may be flared, and the lead-in surface 67 (see FIG. 4A) diameter of the flange 60 can allow for pipettor engagement tolerance in multi-pipettor applications. Flange 60 can provide a larger contact zone for engaging a pipettor nozzle, and can increase the probability of a sealing engagement between a pipettor nozzle not coaxially aligned with a pipette tip by guiding the axial center of the pipette tip to the axial center of the pipettor nozzle. Without being limited by theory, it is expected that the edge of the flange 60 also may provide pipette tip rigidity, in some embodiments, and also may facilitate pipette entry and seating, in certain embodiments.

As noted above, the pipette tip embodiments described herein can be configured in any volume. Multiple features and properties described for 200 microliter pipette tip embodiment 10 are also common to the pipette tips configured in different sizes, such as 10 microliter, 300 microliter and 1250 microliter pipette tips, for example (referred to herein after as 10 microliter pipette tip, 300 microliter pipette tip and 1250 microliter pipette tip, respectively). Therefore, while FIGS. 1A-1D, 2, 3 and 4A-4D often pertain to 200 microliter pipette tips, certain features illustrated in FIGS. 1A-1D, 2, 3 and 4A-4D are related to features of 10 microliter, 300 microliter and 1250 microliter pipette tip embodiments, and similar reference characters are utilized in FIGS. 5-8. For example, the distal region terminus is referenced as 50 in FIGS. 1A-1D, and 10 microliter pipette tip embodiment 200 has distal region terminus 250, in FIG. 5.

Figure 5:
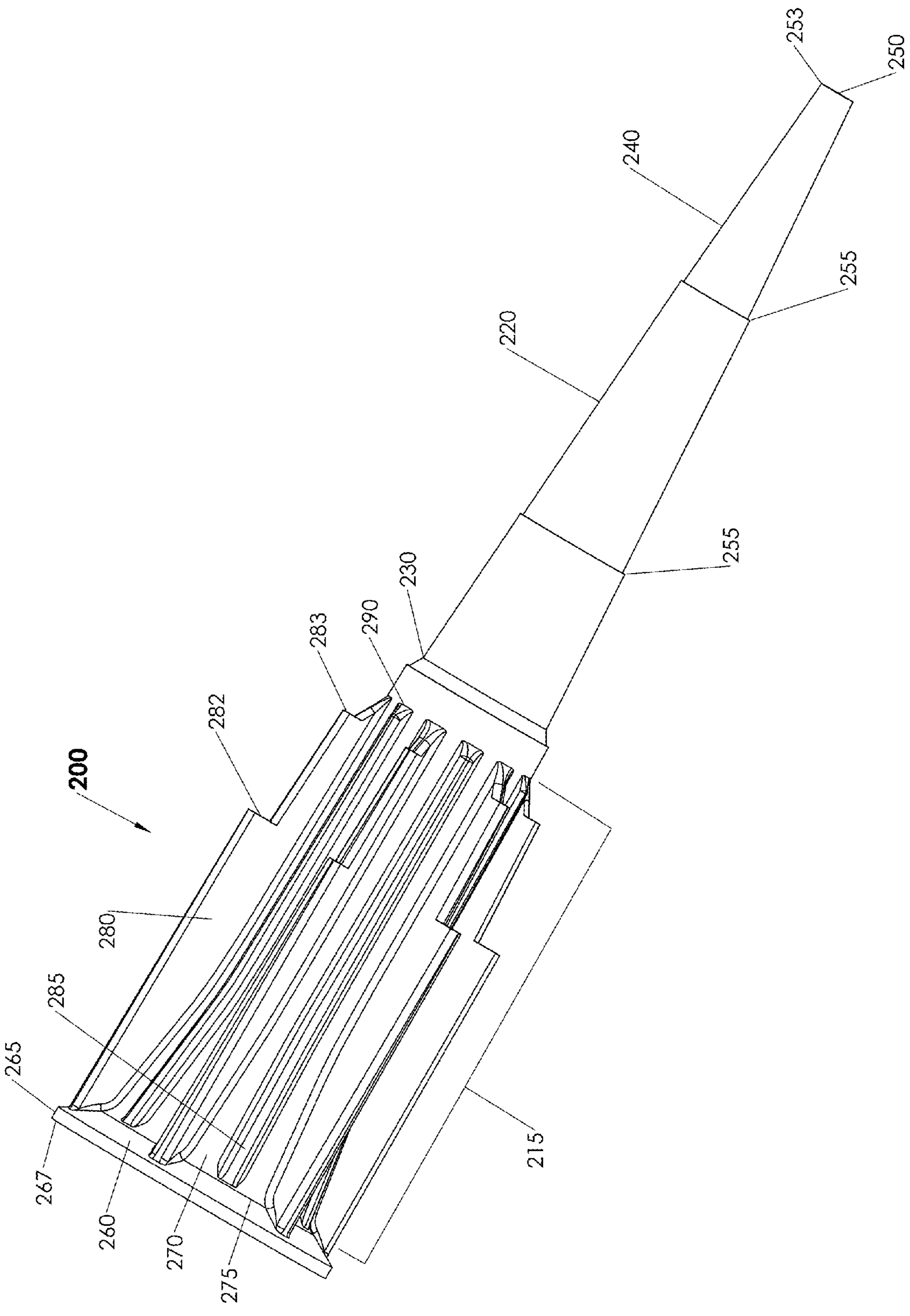
FIG. 5 illustrates a perspective view of a pipette tip embodiment as described herein, configured to manipulate volumes in the range of about 1 to about 20 microliters (e.g., about 1, 2, 3, 4, 5, 6, 7, 8, 9, 10, 11, 12, 13, 14, 15, 16, 17, 18, 18, or about 20 microliters), with a mean or average volume of about 10 microliters.
Figure 6:
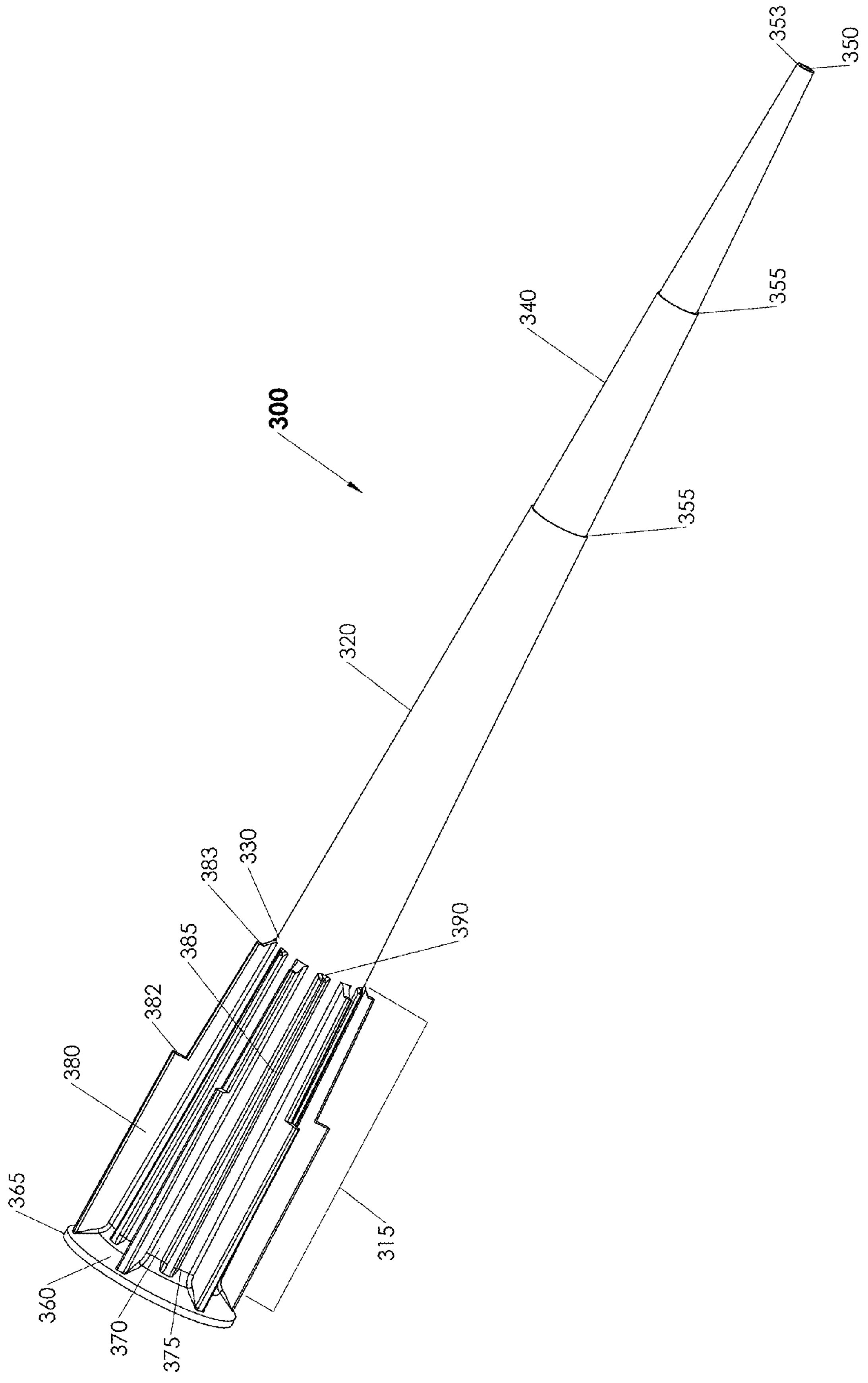
FIG. 6 illustrates a perspective view of an extra long pipette tip embodiment as described herein, configured to manipulate volumes in the range of about 1 to about 20 microliters, with a mean or average volume of about 10 microliters.

10 microliter and 10 microliter extra long pipette tip embodiments 200 and 300, respectively, may comprise one or more of the following features illustrated in FIG. 5 and FIG. 6: proximal region 215, 315; distal region 220, 320; junction between distal region and proximal region 230, 330; tapered junction surface 232; region 240, 340 that is about one-quarter of the distance from the distal region terminus to the junction; distal region terminus 250, 350; blade or knife edge wall thickness 253, 353 at distal region terminus; step(s) 355; flange 260, 360; flange rim 265, 365; proximal region flexible thickness 270, 370 that extends from the junction 275, 375 of flange 260, 360 and proximal region 215, 315 to junction 230, 330 of proximal region 215, 315 and distal region 220, 320. Proximal region 215, 315, between junctions 275, 375 and 230, 330 sometimes can include alternating ribs 280, 380 and 285, 385, which can end in rib termini. Illustrated in FIGS. 5 and 6 are ribs ending in termini 282, 283, and 290.

Figure 7:
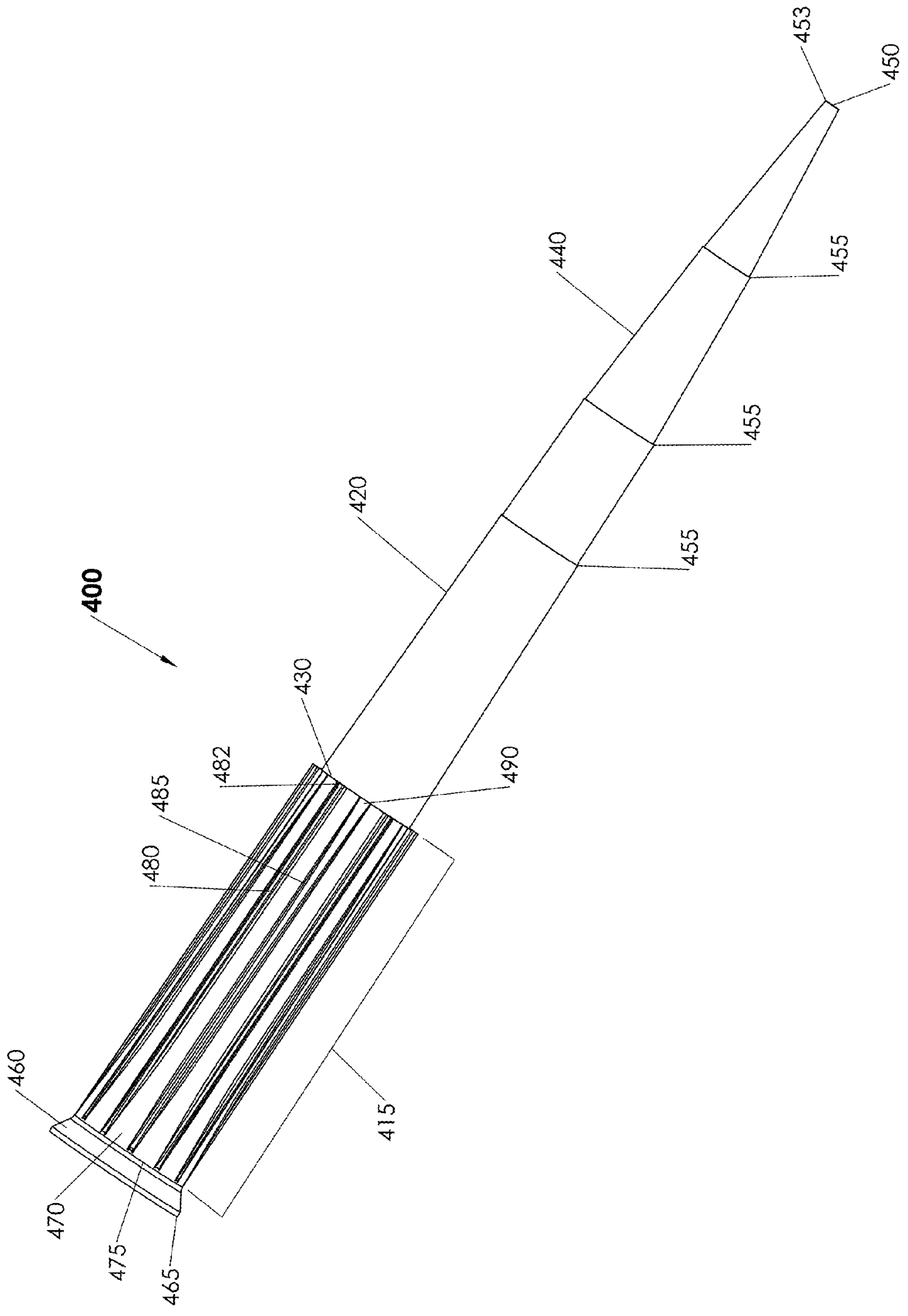
FIG. 7 illustrates a perspective view of a pipette tip embodiment as described herein, configured to manipulate volumes up to about 300 microliters.

300 microliter pipette tip embodiment 400, may comprise one or more of the following features illustrated in FIG. 7: proximal region 415; distal region 420; junction between distal region and proximal region 430; tapered junction surface 432 (not shown); region 440 that is about one-quarter of the distance from the distal region terminus to the junction; distal region terminus 450; blade or knife edge wall thickness 453 at distal region terminus; step(s) 455; flange 460; flange rim 465; proximal region flexible thickness 470 that extends from the junction 475 of flange 460 and proximal region 415 to junction 430 of proximal region 415 and distal region 420. Proximal region 415, between junctions 475 and 430 sometimes can include alternating ribs 480 and 485, which can end in rib termini. Illustrated in FIG. 7 are ribs ending in termini 482 and 490.

Figure 8:
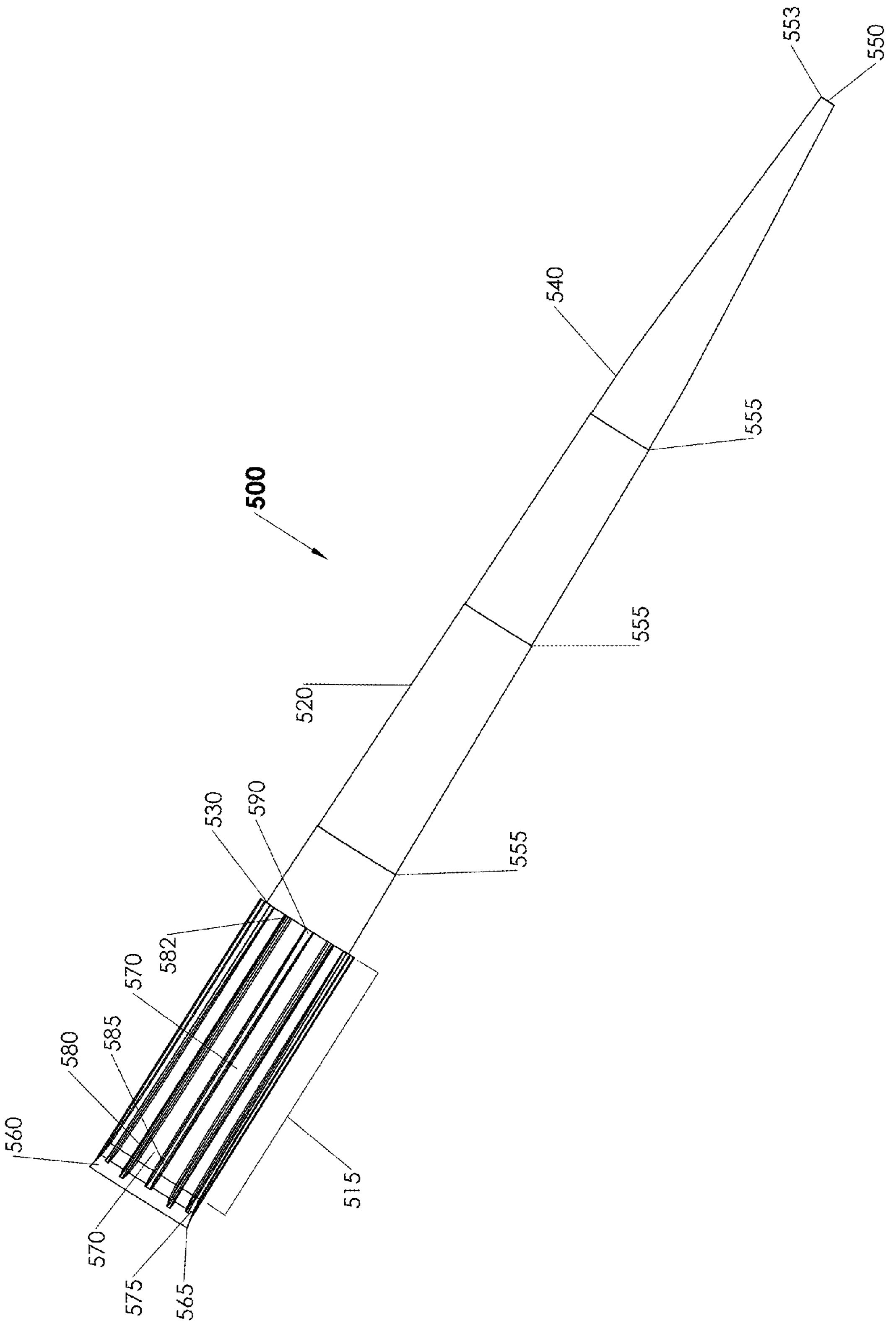
FIG. 8 illustrates a perspective view of a pipette tip embodiment as described herein, configured to manipulate volumes up to about 1250 microliters.

1250 microliter pipette tip embodiment 500, may comprise one or more of the following features illustrated in FIG. 8: proximal region 515; distal region 520; junction between distal region and proximal region 530; tapered junction surface 532 (not shown); region 540 that is about one-quarter of the distance from the distal region terminus to the junction; distal region terminus 550; blade or knife edge wall thickness 553 at distal region terminus; step(s) 555; flange 560; flange rim 565; proximal region flexible thickness 570 that extends from the junction 575 of flange 560 and proximal region 515 to junction 530 of proximal region 515 and distal region 520. Proximal region 515, between junctions 575 and 530 sometimes can include alternating ribs 580 and 585, which can end in rib termini. Illustrated in FIG. 8 are ribs ending in termini 582 and 590.

The 10 microliter, 300 microliter and 1250 microliter pipette tip embodiments also may comprise features and properties illustrated or described for 200 microliter pipette tip embodiment 10, but not illustrated in FIGS. 5-8. For example, 10 microliter pipette tip embodiment 200 may also comprise, a smooth inner distal or proximal surface, as illustrated in FIGS. 1C and 1D. The 10 microliter, 300 microliter and 1250 microliter pipette tip embodiments also may comprise a smooth distal inner surface. The 10 microliter, 300 microliter and 1250 microliter pipette tip embodiments also may comprise; a region of 0 degree taper about 0.01 inches above the distal region terminus 20; flexibility contributed by proximal wall thickness 70; rigidity contributed by alternating regions of increased thickness in rib 80, 85 regions and the lower portion of the proximal region, co-extensive rib and proximal region termini that provide for seating engagement with pipette tip storage units and the like. In some embodiments, all features and properties described for the 200 microliter pipette tip embodiment, and applicable to the 10 microliter, 300 microliter and 1250 microliter pipette tip embodiments are understood to be incorporated into the 10 microliter, 300 microliter and 1250 microliter pipette tip embodiments. Additionally, in some embodiments, features such as the smooth inner surface (e.g., 100 and 130) or annular groove 120, which are not shown in certain embodiments, are understood to be adaptable, and can be included in certain embodiments where they are not shown. Therefore, it will be understood, all features shown and described for 200 microliter pipette tip embodiment 10, but not shown or described for the other pipette tip embodiments described herein, can be included in the 10 microliter, 10 microliter extra long, 300 microliter and 1250 microliter pipette tip embodiments.

Pipette Tip Filters

In certain embodiments, pipette tips may comprise one or more of a filter component and/or an insert component. A filter component and/or insert component may be located in any suitable portion of a pipette tip, and sometimes is located in a proximal portion of a pipette tip near a pipette tip aperture that can engage a dispensing device. A filter component and/or insert component sometimes also can be located in a distal portion of the pipette tip near a pipette tip aperture that can engage a fluid. A filter can be of any shape (e.g., plug, disk; U.S. Pat. Nos. 5,156,811 and 7,335,337) and can be manufactured from any material that impedes or blocks migration of aerosol through the pipette tip to the proximal section terminus, including without limitation, polyester, cork, plastic, silica, gels, and the like, and combinations thereof. In some embodiments a filter may be porous, non-porous, hydrophobic, hydrophilic or a combination thereof. A filter in some embodiments may include vertically oriented pores, and the pore size may be regular or irregular. Pores of a filter may include a material (e.g., granular material) that can expand and plug pores when contacted with aerosol (e.g., U.S. Pat. No. 5,156,811). In certain embodiments, a filter may include nominal, average or mean pore sizes of about 30, 25, 20, 15, 10, 9, 8, 7, 6, 5, 4, 3, 2, 1, 0.5, or 0.05 micrometers, for example. A section of a pipette tip also may include an insert or material that can interact with a molecule of interest, such as a biomolecule. The insert or material may be located in any suitable location for interaction with a molecule of interest, and sometimes is located in the distal section of a pipette tip (e.g., a material or a terminus of an insert may be located at or near the terminal aperture of the distal section). An insert may comprises one or more components that include, without limitation, multicapillaries (e.g., US 2007/0017870), fibers (e.g., randomly oriented or stacked, parallel orientation), and beads (e.g., silica gel, glass (e.g. controlled-pore glass (CPG)), nylon, Sephadex®, Sepharose®, cellulose, a metal surface (e.g. steel, gold, silver, aluminum, silicon and copper), a magnetic material, a plastic material (e.g., polyethylene, polypropylene, polyamide, polyester, polyvinylidenedifluoride (PVDF)), Wang resin, Merrifield resin or Dynabeads®). Beads may be sintered (e.g., sintered glass beads) or may be free (e.g., between one or two barriers (e.g., filter, frit)). Each insert may be coated or derivitized (e.g., covalently or non-covalently modified) with a molecule that can interact with (e.g., bind to) a molecule of interest (e.g., C18, nickel, affinity substrate).

Pipette Tip Materials

Each pipette tip can be manufactured from a commercially suitable material. Pipette tips often are manufactured from one or more moldable materials, independently selected from those that include, without limitation, polypropylene (PP), polyethylene (PE), high-density polyethylene (HDPE), low-density polyethylene (LDPE), polyethylene teraphthalate (PET), polyvinyl chloride (PVC), polytetrafluoroethylene (PTFE), polystyrene (PS), high-density polystyrene, acrylnitrile butadiene styrene copolymers, crosslinked polysiloxanes, polyurethanes, (meth)acrylate-based polymers, cellulose and cellulose derivatives, polycarbonates, ABS, tetrafluoroethylene polymers, corresponding copolymers, plastics with higher flow and lower viscosity or a combination of two or more of the foregoing, and the like.

Non-limiting examples of plastics with higher flow and lower viscosity include, any suitable material having a hardness characterized by one or more of the following properties, in certain embodiments: a melt flow rate (230 degrees Celsius at 2.16 kg) of about 30 to about 75 grams per 10 minutes using an ASTM D 1238 test method; a tensile strength at yield of about 3900 to about 5000 pounds per square inch using an ASTM D 638 test method; a tensile elongation at yield of about 7 to about 14% using an ASTM D 638 test method; a flexural modulus at 1% sectant of about 110,000 to about 240,000 pounds per square inch using an ASTM D 790 test method; a notched Izod impact strength (23 degrees Celsius) of about 0.4 to about 4.0 foot pounds per inch using an ASTM D 256 test method; and/or a heat deflection temperature (at 0.455 MPa) of about 160 degrees to about 250 degrees Fahrenheit using an ASTM D 648 test method. A material used to construct the distal section and/or axial projections include moldable materials in some embodiments. Non-limiting examples of materials that can be used to manufacture the distal section and/or axial projections include polypropylene, polystyrene, polyethylene, polycarbonate, and the like, and mixtures thereof. In certain embodiments, pipette tips described herein are not made from an elastomer.

Materials suitable for use in embodiments described herein, and methods for manufacture using those materials have been described in U.S. Provisional Patent Application No. 61/144,031, filed on Jan. 12, 2009, and entitled "FLEXIBLE PIPETTE TIPS", the entirety of which is hereby incorporated by reference herein.

Anti-Microbial Materials

A pipette tip also may include one or more antimicrobial materials. An antimicrobial material may be coated on a surface (e.g., inner and/or outer surface) or impregnated in a moldable material, in some embodiments. One or more portions or sections, or all portions and sections, of a pipette tip or other pipette tip tray component may include one or more antimicrobial materials. In some embodiments antimicrobial agents or substances may be added to the moldable plastic during the manufacture process. In some embodiments, the anti-microbial agent or substance can be an anti-microbial metal. The addition of anti-microbial agents may be useful in (i) decreasing the amount of microbes present in or on a device, (ii) decreasing the probability that microbes reside in or on a device, and/or (iii) decreasing the probability that microbes form a biofilm in or on a device, for example. Antimicrobial materials include, without limitation, metals, halogenated hydrocarbons, quaternary salts and sulfur compounds.

Non-limiting examples of metals with anti-microbial properties are silver, gold, platinum, palladium, copper, iridium (i.e. the noble metals), tin, antimony, bismuth, zinc cadmium, chromium, and thallium. The afore-mentioned metal ions are believed to exert their effects by disrupting respiration and electron transport systems upon absorption into bacterial or fungal cells. A commercially accessible form of silver that can be utilized in devices described herein is SMARTSILVER NovaResin. SMARTSILVER NovaResin is a brand of antimicrobial master batch additives designed for use in a wide range of polymer application. Billions of silver nanoparticles can easily be impregnated into PET, PP, PE and nylon using standard extrusion or injection molding equipment. SMARTSILVER NovaResin additives may be delivered as concentrated silver-containing master batch pellets to facilitate handling and processing. NovaResin is designed to provide optimum productivity in a wide range of processes, including fiber extrusion, injection molding, film extrusion and foaming.

Further non-limiting examples of anti-microbial substances or agents include, without limitation, inorganic particles such as barium sulfate, calcium sulfate, strontium sulfate, titanium oxide, aluminum oxide, silicon oxide, zeolites, mica, talcum, and kaolin.

Halogenated hydrocarbons, include, without limitation, halogenated derivatives of salicylanilides (e.g., 5-bromo-salicylanilide; 4',5-dibromo-salicylanilide; 3,4',5-tribromo-salicylanilide; 6-chloro-salicylanilide; 4'5-dichloro-salicylanilide; 3,4'5-trichloro-salicylanilide; 4',5-diiodo-salicylanilide; 3,4',5-triiodo-salicylanilide; 5-chloro-3'-trifluoromethyl-salicylanilide; 5-chloro-2'-trifluoromethyl-salicylanilide; 3,5-dibromo-3'-trifluoromethyl-salicylanilide; 3-chloro-4-bromo-4'-trifluoromethyl-salicylanilide; 2',5-dichloro-3-phenyl-salicylanilide; 3',5-dichloro-4'-methyl-3-phenyl-salicylanilide; 3',5-dichloro-4'-phenyl-3-phenyl-salicylanilide; 3,3',5-trichloro-6'-(p-chlorophenoxy)-salicylanilide; 3',5-dichloro-5'-(p-bromophenoxy)-salicylanilide; 3,5-dichloro-6'-phenoxy-salicylanilide; 3,5-dichloro-6'-(o-chlorophenoxy)-salicylanilide; 5-chloro-6'-(o-chlorophenoxy)-salicylanilide; 5-chloro-6'-beta-naphthyloxy-salicylanilide; 5-chloro-6'-alpha-naphthyloxy-salicylanilide; 3,3',4-trichloro-5,6'-beta-naphthyloxy-salicylalide and the like).

Halogenated hydrocarbons also can include, without limitation, carbanilides (e.g., 3,4,4'-trichlorocarbanilide (TRICLOCARBAN); 3,3',4-trichloro derivatives; 3-trifluoromethyl-4,4'-dichlorocarbanilide and the like). Halogenated hydrocarbons include also, without limitation, bisphenols (e.g., 2,2'-methylenebis(4-chlorophenol); 2,2'-methylenebis (4,5-dichlorophenol); 2,2'-methylenebis(3,4,6-trichlorophenol); 2,2'-thiobis(4,6-dichlorophenol); 2,2'-diketobis(4-bromophenol); 2,2'-methylenebis(4-chloro-6-isopropylphenol); 2,2'-isopropylidenebis(6-sec-butyl-4-chlorophenol) and the like).

Also included within hydrogenated hydrocarbons are halogenated mono- and poly-alkyl and aralkyl phenols (e.g., methyl-p-chlorophenol; ethyl-p-chlorophenol; n-propyl-p-chlorophenol; n-butyl-p-chlorophenol; n-amyl-p-chlorophenol; sec-amyl-p-chlorophenol; n-hexyl-p-chlorophenol; cyclohexyl-p-chlorophenol; n-heptyl-p-chlorophenol; n-octyl-p-chlorophenol; o-chlorophenol; methyl-o-chlorophenol; ethyl-o-chlorophenol; n-propyl-o-chlorophenol; n-butyl-o-chlorophenol; n-amyl-o-chlorophenol; tert-amyl-o-chlorophenol; n-hexyl-o-chlorophenol; n-heptyl-o-chlorophenol; p-chlorophenol; o-benzyl-p-chlorophenol; o-benzyl-m-methyl-p-chlorophenol; o-benzyl-m, m-dimethyl-p-chlorophenol; o-phenylethyl-p-chlorophenol; o-phenylethyl-m-methyl-p-chlorophenol; 3-methyl-p-chlorophenol; 3,5-dimethyl-p-chlorophenol; 6-ethyl-3-methyl-p-chlorophenol; 6-n-propyl-3-methyl-p-chlorophenol; 6-iso-propyl-3-methyl-p-chlorophenol; 2-ethyl-3,5-dimethyl-p-chlorophenol; 6-sec butyl-3-methyl-p-chlorophenol; 6-diethylmethyl-3-methyl-p-chlorophenol; 6-iso-propyl-2-ethyl-3-methyl-p-chlorophenol; 2-sec amyl-3,5-dimethyl-p-chlorophenol; 2-diethylmethyl-3,5-dimethyl-p-chlorophenol; 6-sec octyl-3-methyl-p-chlorophenol; p-bromophenol; methyl-p-brdmophenol; ethyl-p-bromophenol; n-propyl-p-bromophenol; n-butyl-p-bromophenol; n-amyl-p-bromophenol; sec-amyl-p-bromophenol; n-hexyl-p-bromophenol; cyclohexyl-p-bromophenol; o-bromophenol; tert-amyl-o-bromophenol; n-hexyl-o-bromophenol; n-propyl-m, m-dimethyl-o-bromophenol; 2-phenyl phenol; 4-chloro-2-methyl phenol; 4-chloro-3-methyl phenol; 4-chloro-3,5-dimethyl phenol; 2,4-dichloro-3,5-dimethylphenol; 3,4,5,6-terabromo-2-methylphenol; 5-methyl-2-pentylphenol; 4-isopropyl-3-methylphenol; 5-chloro-2-hydroxydiphenylemethane).

Halogenated hydrocarbons also include, without limitation, chlorinated phenols (e.g., parachlorometaxylenol, p-chloro-o-benzylphenol and dichlorophenol); cresols (e.g., p-chloro-m-cresol), pyrocatechol; p-chlorothymol; hexachlorophene; tetrachlorophene; dichlorophene; 2,3-dihydroxy-5,5'-dichlorophenyl sulfide; 2,2'-dihydroxy-3,3',5,5'-tetrachlorodiphenyl sulfide; 2,2'-dihydroxy-3,3',5,5',6,6'-hexachlorodiphenyl sulfide and 3,3'-dibromo-5,5'-dichloro-2,2'-dihydroxydiphenylamine). Halogenated hydrocarbons also may include, without limitation, resorcinol derivatives (e.g., p-chlorobenzyl-resorcinol; 5-chloro-2,4-dihydroxy-diphenyl methane; 4'-chloro-2,4-dihydroxydiphenyl methane; 5-bromo-2,4-dihydroxydiphenyl methane; 4'-bromo-2,4-dihydroxydiphenyl methane), diphenyl ethers, anilides of thiophene carboxylic acids, chlorhexidines, and the like.

Quaternary salts include, without limitation, ammonium compounds that include alkyl ammonium, pyridinum, and isoquinolinium salts (e.g., 2,2'-methylenebis(4-chlorophenol); 2,2'-methylenebis(4,5-dichlorophenol); 2,2'-methylenebis(3,4,6-trichlorophenol); 2,2'-thiobis(4,6-dichlorophenol); 2,2'-diketobis(4-bromophenol); 2,2'-methylenebis(4-chloro-6-isopropylphenol); 2,2'-isopropylidenebis(6-sec-butyl-4-chlorophenol); cetyl pyridinium chloride; diisobutylphenoxyethoxyethyldimethylbenzyl ammonium chloride; N-methyl-N-(2-hydroxyethyl)-N-(2-hydroxydodecyl)-N-benzyl ammonium chloride; cetyl trimethylammonium bromide; stearyl trimethylammonium bromide; oleyl dimethylethylammonium bromide; lauryidimethylchlorethoxyethylammonium chloride; lauryidimethylbenzyl-ammonium chloride; alkyl (Cg-Cig) dimethyl (3, 4-dichlorobenzyl)-ammonium chloride; lauryl pyridinium bromide; lauryl iso-quinolinium bromide; N(lauroyloxyethylaminoformylmethyl)pyridinium chloride, and the like).

Sulfur active compounds include, without limitation, thiuram sulfides and dithiocarbamates, for example (e.g., disodium ethylene bis-dithiocarbamate (Nabam); diammonium ethylene bis-dithiocarbamate (amabam); Zn ethylene bis-dithiocarbamate (ziram); Fe ethylene bis-dithiocarbamate (ferbam); Mn ethylene bis-dithiocarbamate (manzate);

tetramethyl thiuram disulfide; tetrabenzyl thiuram disulfide; tetraethyl thiuram disulfide; tetramethyl thiuram sulfide, and the like).

In certain embodiments, an antimicrobial material comprises one or more of 4',5-dibromosalicylanilide; 3,4',5-tribromosalicylanilide; 3,4',5-trichlorosalicylanilide; 3,4,4'-trichlorocarbanilide; 3-trifluoromethyl-4,4'-dichlorocarbanilide; 2,2'-methylenebis(3,4,6-trichlorophenol); 2,4,4'-trichloro-2'-hydroxydiphenyl ether; Tyrothricin; N-methyl-N-(2-hydroxyethyl-N-(2-hydroxydodecyl)-N-benzylammonium chloride; cetyl pyridinium chloride; 2,3',5-tribromosalicylanilide; chlorohexidine digluconate; chlorohexidine diacetate; 4',5-dibromosalicylanilide; 3,4,4'-trichlorocarbanilide; 2,4,4'-trichloro-2-hydroxydiphenyl ether (TRICLOSAN; 5-chloro-2-(2,4-dichlorophenoxy) phenol); 2,2'-dihydroxy-5,5'-dibromo-diphenyl ether) and the like. Methods of manufacture of anti-microbial containing plastics, and amounts of anti-microbial substances used in manufacture of anti-microbial containing plastics have been described in U.S. Provisional Patent Application No. 61/144,029, filed on Jan. 12, 2009, and entitled "ANTIMICIROBIAL FLUID HANDLING DEVICES AND METHODS OF MANUFACTURE", the entirety of which is hereby incorporated herein by reference.

Anti-Static Materials

In certain embodiments anti-static agents can be incorporated into the moldable plastic during the manufacture process of pipette tips described herein. A pipette tip may comprise any type of electrically conductive material, such as a conductive metal for example. Non-limiting examples of electrically conductive metals include platinum (Pt), palladium (Pd), copper (Cu), nickel (Ni), silver (Ag) and gold (Au). The metals may be in any form in or on a pipette tip, for example, such as metal flakes, metal powder, metal strands or coating of metal.

Electrically conductive materials, or portions thereof, may be any material that can contain movable electric charges, such as carbon for example. In some embodiments, a pipette tip comprises about 5% to about 40% or more carbon by weight (e.g., 7-10%, 9-12%, 11-14%, 13-16%, 15-18%, 17-20%, 19-22%, 21-24%, 23-26%, 25-28%, 27-30%, 29-32%, 32-34%, 33-36%, or 35-38% carbon by weight). Methods for manufacturing components comprising an anti-static member have been described in U.S. Provisional Patent Application No. 61/147,065, filed on Jan. 23, 2009, and entitled "ANTI-STATIC PIPETTE TITRAYS", and is hereby incorporated herein, in its entirety.

Precision and Accuracy

Pipette tip "precision" refers to the ability of a plurality of pipette tips to deliver about the same volume of fluid, with a relatively small standard deviation, for a given dispenser (e.g., pipette tips stated to deliver 200 microliters of fluid consistently deliver about 197 microliters of fluid). Pipette tip "accuracy" refers to the ability of a plurality of pipette tips to deliver a particular volume of fluid (e.g., pipette tips stated to deliver 200 microliters of fluid deliver, in practice, about 200 microliters of fluid). One measure of pipette tip precision is a calculated percent "coefficient of variation," which also is referred to herein as "CV" and discussed in greater detail hereafter.

Coefficient of variation (CV) can be calculated for a pipette tip lot in a variety of manners. In general, percent CV equals (a) the quotient of (i) standard deviation in volume dispensed from the pipette tips, divided by (ii) the average volume dispensed from the pipette tips, (b) multiplied by 100. A CV value often is calculated for a particular lot of pipette tips. One of many protocols can be selected for collecting pipette tips in the lot to calculate a CV value. Random pipette tips may be selected from a lot after a manufacturing run is completed in some embodiments, and in certain embodiments, pipette tips are collected at different time points during the manufacturing run of the lot (e.g., pipette tips are collected at time points during the manufacture run at regular intervals).

In certain embodiments pertaining to CV measurements, water is dispensed from pipette tips of a particular lot using one dispensing device, and volume of each dispensed amount is weighed. The average and standard deviation of all weighed aliquots of water then can be calculated in such embodiments.

In some embodiments pertaining to CV measurements, liquid containing a dye is dispensed from each pipette tip into a well of a tray having an array of wells. The average volume can be determined from the weight of the plate containing the dispensed liquid less the weight of the plate before liquid was dispensed. The standard deviation in volume dispensed into each well can be determined by optically determining the volume in each well by the amount of dye in each well (e.g., using a light, fluorescence, luminescence or absorbance detector in a plate reader).

In some embodiments, pipette tip embodiments described herein can deliver a volume of double distilled water with a CV of 10% or less, when the pipettor is set at a low or minimum volume. In certain embodiments, pipette tips described herein can deliver a volume of double distilled water with a CV of 5% or less, when the pipettor is set at a high or maximum volume. The precision and accuracy measurements of the pipette tips is dependent on the condition and calibration of the pipettor being tested with the tips described herein. In general, accuracy and CV values for the pipette tip embodiments described herein can range between 1% and 10% depending on the volume at which the pipettor is tested, and the condition and calibration of the pipettor (e.g., CV of 9%, 8%, 7%, 6%, 5%, 4%, 3%, 22% or less).

Pipette Tips—Methods of Use

Pipette tips frequently are used in conjunction with a pipetting device (manual or automated) to take up, transport or deliver precise volumes of liquids or reagents. In some embodiments, suitably configured pipette tips also can be used to prepare or isolate biomolecules of interest (e.g., nucleic acids, proteins, antibodies and the like). In certain embodiments a biomolecule of interest can be contained in a biological fluid or biological preparation with a fluid component.

Provided herein is a method of using a pipette tip comprising (a) inserting a pipettor into a pipette tip, and (b) contacting the pipette tip with a fluid, where the pipette tip comprises a proximal region and a distal region, and further where the proximal region comprises a first set of axially oriented ribs and a second set of axially oriented ribs, the ribs of the first set and the second set are circumferentially spaced and alternately spaced around the proximal region, and ribs of the first set have a maximum thickness greater than the maximum thickness of ribs of the second set. Provided also herein in some embodiments, is method of using a pipette tip comprising, (a) inserting a pipettor into a pipette tip, and (b) contacting the pipette tip with a fluid, where the pipette tip comprises a proximal region and a distal region, and further where the distal region wall thickness tapers from (a) a point at or between (i) about the junction of the proximal region and distal region to (ii) about one-quarter of the axial distance from the terminus of the distal region to the junction, to (b) the distal region terminus, and the wall thickness at the distal region terminus is about 0.0040 inches to about 0.0055 inches.

In certain embodiments, the wall thickness of the tip at the distal region terminus is 0.0055 or less. In some embodiments, the wall thickness at the distal region terminus is about 0.0043 inches to about 0.0050 inches. In certain embodiments, the wall thickness at the distal region terminus is about 0.0044 inches to about 0.0049 inches.

Pipette Tips—Methods of Manufacture

Pipette tips may be manufactured by injection molding. In some embodiments, pipette tips described herein are injection molded as a unitary construct. Injection molding is a manufacturing process for producing objects (e.g., pipette tips, for example) from thermoplastic (e.g., nylon, polypropylene, polyethylene, polystyrene and the like, for example) and thermosetting plastic (e.g., epoxy and phenolics, for example) materials. The plastic material of choice often is fed into a heated barrel, mixed, and forced into a mold cavity where it cools and hardens to the configuration of the mold cavity. The melted material sometimes is forced or injected into the mold cavity, through openings (e.g., a sprue), under pressure. A pressure injection method ensures the complete filling of the mold with the melted plastic. After the mold cools, the mold portions are separated, and the molded object is ejected. In some embodiments, additional additives can be included in the plastic or heated barrel to give the final product additional properties (e.g., anti-microbial, or anti-static properties, for example).

The mold is configured to hold the molten plastic in the correct geometry to yield the desired product upon cooling of the plastic. Injection molds sometimes are made of two or more parts, and comprise a core pin. The core pin sometimes can determine the thickness of the object wall, as the distance between the core pin and the outer mold portion is the wall thickness. Molds are typically designed so that the molded part reliably remains on the core pin when the mold opens, after cooling. The core pin sometimes can be referred to as the ejector side of the mold. The part can then fall freely away from the mold when ejected from the core pin, or ejector side of the mold. In some embodiments, ejector pins and/or an ejector sleeve push the pipette tip from the core pin.

Also provided herein is a mold for manufacturing a device by an injection mold process, which comprises a body that forms an exterior portion of the device and a member that forms an inner surface of the device, where the member comprises an irregular surface that results in a portion of the inner surface that is irregular (e.g., annular groove 120). In some embodiments, the member is a core pin for forming the inner surface of a pipette tip.

Provided also herein is a method for manufacturing a pipette tip comprising (a) contacting a pipette tip mold with a molten polymer, and releasing the formed pipette tip from the mold after cooling, where the pipette tip comprises a proximal region and a distal region, and further where the proximal region comprises an exterior surface and an annular flange at the proximal terminus of the proximal region, the proximal region comprises a first set of axially oriented ribs and a second set of axially oriented ribs, the ribs of the first set and the second set are circumferentially spaced and alternately spaced around the exterior surface of the proximal region, and ribs of the first set have a maximum thickness greater than the maximum thickness of ribs of the second set.

Also provided herein in some embodiments, is method of manufacturing a pipette tip comprising, (a) contacting a pipette tip mold with a molten polymer, and releasing the formed pipette tip from the mold after cooling, where the pipette tip comprises a proximal region and a distal region, and further where the proximal region comprises an exterior surface and an annular flange at the proximal terminus of the proximal region, the distal region wall thickness tapers from (a) a point at or between (i) about the junction of the proximal region and distal region to (ii) about one-quarter of the axial distance from the terminus of the distal region to the junction, to (b) the distal region terminus, and the wall thickness at the distal region terminus is about 0.0040 inches to about 0.0055 inches.

Provided also herein is a method for manufacturing a device having an inner surface and an exterior surface, which comprises: (a) injecting a liquid polymer mixture into a mold that comprises a body that forms the exterior surface of the device and a member that forms the inner surface of the device, (b) curing the device in the mold (e.g., partially curing or fully curing), and (c) ejecting the device from the mold, where the member comprises an irregular surface (e.g., annular groove 120) that results in a portion of the inner surface of the device that is irregular. The polymer mixture comprises a polymer and a material that can provide one or more of the following properties; anti-microbial activity, anti-static function, anti-foaming function and combinations thereof.

EXAMPLES

Example 1

Pipette Tip Deflection

A "soft" or flexible pipette tip often will be easier to mount onto a pipettor than a "hard" or reduced flexibility pipette tip, thus offering several benefits, such as better fit, reduced insertion and/or ejection forces and the ability to fit a larger variety of pipettor nozzles (e.g., a more universal fit). The flexibility or "softness" of pipette tips described herein was quantified and compared to competitors commercially available pipette tips.

To conduct the experiment, a force gauge (Imada model DS2-44 force gauge) was mounted to a fixed aluminum base plate on a table top stand, and a lever with a handle was mounted to the force gauge, as shown in FIG. 9. The depth that the gauge can travel was fixed by incorporating a travel stop on the stand. The travel stop was configured such that the depth the gauge could travel was fixed throughout the experiment so the only change measurable was the force required to depress each tip that same depth or travel distance. Each tip was placed under the force gauge and the handle depressed. The force reading, in pounds, was then recorded. Six different tip styles were used and five independent, randomly chosen, tips per style were tested. The tips were placed on top of the aluminum plate to ensure that the force used on the tip was not bending the tip. The force required for deformation would therefore only change due to the stiffness or pliability of the individual tip. The competitors tips tested included (designated as Tip 1, Tip 2, and the like); tip 1, 200 microliter with filter; tip 2, 100 microliter with filter; tip 3, 200 microliter with filter; tip 4, 100 microliter with filter; tip 5, 300 microliter without filter; and a 300 microliter non-filter pipette tip embodiment as described herein. The results are presented graphically in FIG. 10 and in the table below. Results are presented as pounds of force.

| | Sample 1 | Sample 2 | Sample 3 | Sample 4 | Sample 5 | Average |
|---|---|---|---|---|---|---|
| Tip 1 | 1.71 | 1.61 | 1.91 | 1.73 | 2.04 | 1.8 |
| Tip 2 | 2.16 | 2.4 | 2.17 | 2.87 | 2.31 | 2.38 |
| Tip 3 | 4.67 | 4.98 | 5.54 | 4.51 | 3.9 | 4.72 |
| Tip 4 | 6.94 | 5.94 | 5.51 | 7.75 | 8.4 | 6.91 |
| Tip 5 | 7.66 | 8.49 | 9.46 | 9.86 | 9.89 | 9.07 |
| Pipette tip described herein | 1.26 | 1.13 | 1.09 | 1.07 | 1.1 | 1.13 |

The results presented herein indicate that 300 microliter non-filter pipette tips described herein are, on average, up to about 8 fold (e.g., between about 1.5 and about 8 fold; about 1.5 fold, about 2 fold, about 2.5 fold, about 3 fold, about 3.5 fold, about 4 fold, about 4.5 fold, about 5 fold, about 5.5 fold, about 6 fold, about 6.5 fold, about 7 fold, about 7.5 fold and about 8 fold) more flexible than some currently available competitor pipette tips.

Example 2

Ergonomic Testing—Materials and Methods

Ergonomic testing of pipette tips was performed to quantify the ergonomic performance of tips described herein. Popular, commercially available pipettors were utilized to conduct these experiments. Tips described herein were compared to custom tips manufactured by market leading pipette companies (e.g., for their brand of pipettor) and also to a popular generic pipette tip brand. Pipettors utilized in these experiments were designated pipette 1, pipette 2, pipette 3, pipette 4 and pipette 5, and corresponding custom tips for specific pipettors were similarly designated (e.g., pipette tip 1 was a custom tip for pipettor 1, pipette tip 2 was a custom tip for pipettor 2, etc). The generic pipette tip was designated as "generic". Pipette tips described herein were designated "TDH".

Controlled laboratory testing was conducted by Certified Professional Ergonomists utilizing 11 subjects whose occupations routinely utilize pipetting. Pipette tip performance was measured in terms of reduced tipping and de-tipping forces, enhanced user comfort, reduced muscle effort levels and reduced fatigue potential. The tips were tested in comparison to published guidelines and generally accepted biomechanics and physiologic criteria. Experiments described herein were designed to quantify the ergonomics performance of the tips with regard to the appropriate categories of ergonomics comfort and risk.

Ergonomic testing was accomplished using a combination of objective and subjective measurement techniques. The primary measurements included:

(a) Tip Application Effort & Force
(b) Tip Ejection Forces Effort & Force
(c) Aspiration & Dispense Muscle Effort Levels
(d) Comfort and Performance Surveys
(e) Pipetting cycle time
(f) Ranking Surveys
(g) Anthropometric Measurements
(h) Video documentation The experimental design included appropriate sampling methods (e.g., multiple trials, pipettor and pipette tip randomization, and the like) to allow a valid statistical analysis of product performance. Video and photographic documentation of the testing also was collected.

Prior to the start of testing, participants completed a background survey regarding pipetting experience and a musculoskeletal stress survey of aches, pains or discomfort experienced at work. Anthropometric measurements also were collected. The test subjects included 3 women and 8 men with pipetting experience (11 total). The participants included scientists, research technicians, biologists, a chemist and graduate students. The average age of the participants was 25.9 years and participants had been using pipettes for an average of 4.0 years, for an average of up to 3.3 hrs/day.

Figure 11:
FIG. 11 is a photograph of a test participant wired for electomyographic monitoring while performing pipetting tasks.

Each test participant completed a series of pipetting tasks using each of the following tip types; (a) a tip as described herein, (b) a custom tip for a specific brand of pipettor, and (c) a generic tip, selected for its popularity. Each tip was tested using the 5 different pipettor brands. Each participant also was monitored using electomyographic (EMG) data collection, as shown in FIG. 11. Standardized calibration routines were utilized to ensure accuracy of sampling.

Pipetting Task Tests

Several tests were completed on each pipette and tip combination. These included (i) full cycle testing, (ii) on/off testing, and (iii) step by step sequence testing. In full cycle testing, participants completed a series of three full pipetting cycles that included pipette tip application, pipette tip use (e.g., liquid aspiration, followed by liquid dispensing) and pipette tip ejection. During on/off testing, participants completed a series of 12 applications of a pipette tip followed by tip ejection. The step by step sequence testing included tip application, aspiration, dispensing and tip ejection, in consecutive order.

Two trials were performed for each test. Following the completion of each test sequence, the participants were asked to rate their perceived level of physical exertion. At the completion of tip testing for a pipette, the participants completed a survey of tip performance.

Anthropometric Measurements

Anthropometric measurements were taken for all participants in the study. The participants represented the anthropometric range of the general population ($5^{th}$ percentile female to $95^{th}$ percentile male). The results of anthropometric measurements are presented in the table below. Measurements presented in the table are in inches where not otherwise indicated.

| Gender | Weight (lbs) | Height | Hand Length | Hand Breadth (Metacarpal) | Arm Length. (Acrom-Fngrtip) | Standing Shoulder Height | Standing Elbow height | Power Grip | Bench Ht |
|---|---|---|---|---|---|---|---|---|---|
| Female | 135 | 63 | 6.825 | 3.125 | 25.5 | 52.5 | 39.675 | 50 | 38 |
| Female | 108 | 63 | 6.625 | 3 | 25.25 | 51.25 | 38.75 | 60 | 35 |
| Female | 150 | 69 | 6.875 | 3.125 | 29 | 59 | 44.625 | 85 | 36 |
| Average | 131.00 | 65.00 | 6.78 | 3.08 | 26.58 | 54.25 | 41.02 | 65.00 | 36.33 |

| Gender | Weight (lbs) | Height | Hand Length | Hand Breadth (Metacarpal) | Arm Length. (Acrom-Fngrtip) | Standing Shoulder Height | Standing Elbow height | Power Grip | Bench Ht |
|---|---|---|---|---|---|---|---|---|---|
| Male | 185 | 74 | 7.8 | 4.5 | 30.3 | 61.4 | 45 | 104 | 41.6 |
| Male | 320 | 74 | 7.6 | 3.7 | 31.1 | 62 | 46 | 155 | 4.1 |
| Male | 175 | 73 | 7.9 | 3.7 | 31.6 | 62.5 | 45.4 | 72.5 | 38 |
| Male | 200 | 71 | 8 | 4 | 28.8 | 58 | 45.6 | 130 | 38 |
| Male | 185 | 70 | 7.8 | 3.8 | 30.1 | 58 | 42.4 | 125 | 38 |
| Male | 195 | 65 | 7.4 | 3.8 | 27.5 | 54.6 | 41 | 85 | 37 |
| Male | 148 | 66 | | | | | | | |
| Male | 200 | 73 | 8.1 | 3.8 | 31.5 | 61.5 | 45.6 | 125 | 38.3 |
| Average | 201.00 | 70.75 | 7.78 | 3.88 | 30.13 | 59.71 | 44.43 | 113.79 | 33.56 |

Musculoskeletal Stress Survey

Figure 12:
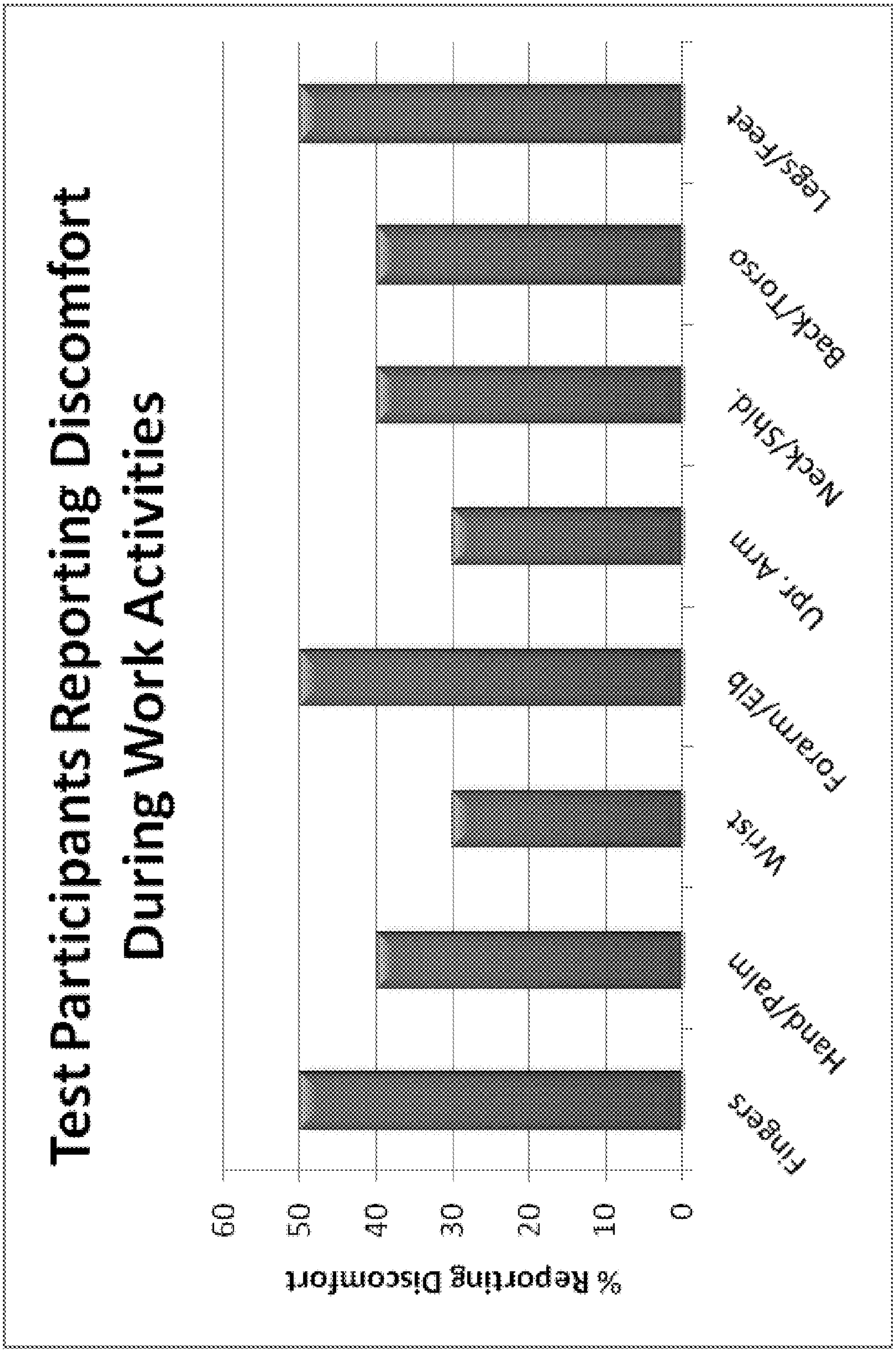
FIG. 12 graphically illustrates the distribution of aches, pains or discomfort during participants normal work activities. Experimental details are given in Example 2, and results are given in Example 3.

Participants were surveyed regarding the presence of aches, pains or discomfort during their normal work activities, as shown graphically in FIG. 12. Among those working in laboratories (10 of the 11 participants), 50% experienced discomfort in their fingers, forearms/elbows and legs/feet. Some of the participants indicated that extended durations of pipetting contributed to their discomfort and fatigue. The majority of those reporting discomfort indicated that the frequency of discomfort ranged between "Rarely" to "Sometimes" and the severity of the discomfort was in the "Mild" to "Moderate" range.

Measurement of Muscle Effort Levels During Pipette Use

Measurements of muscle effort during pipette use were monitored using electromyography (EMG). EMG was used to assess the potential for fatigue and the overall exertion associated with the various tips. Reductions in muscle effort, measured in terms of percent maximum voluntary contraction (% MVC), can provide an improved opportunity for blood flow, lactate resorption and fatigue relief. Research indicates that static muscle contractions below 10% MVC do not restrict blood flow and the physiological equilibrium of muscle is maintained at an aerobic level. At muscle tensions of 20-30% of MVC a "blood flow dept" can occur, limiting oxygen supply and removal of waste products from muscle. Static contractions exceeding 30% MVC result in a decrease in blood flow and total blood flow occlusion occurs at approximately 50-60% MVC. Lower muscle exertions following physical activity can provide a greater recovery potential.

Figure 13:
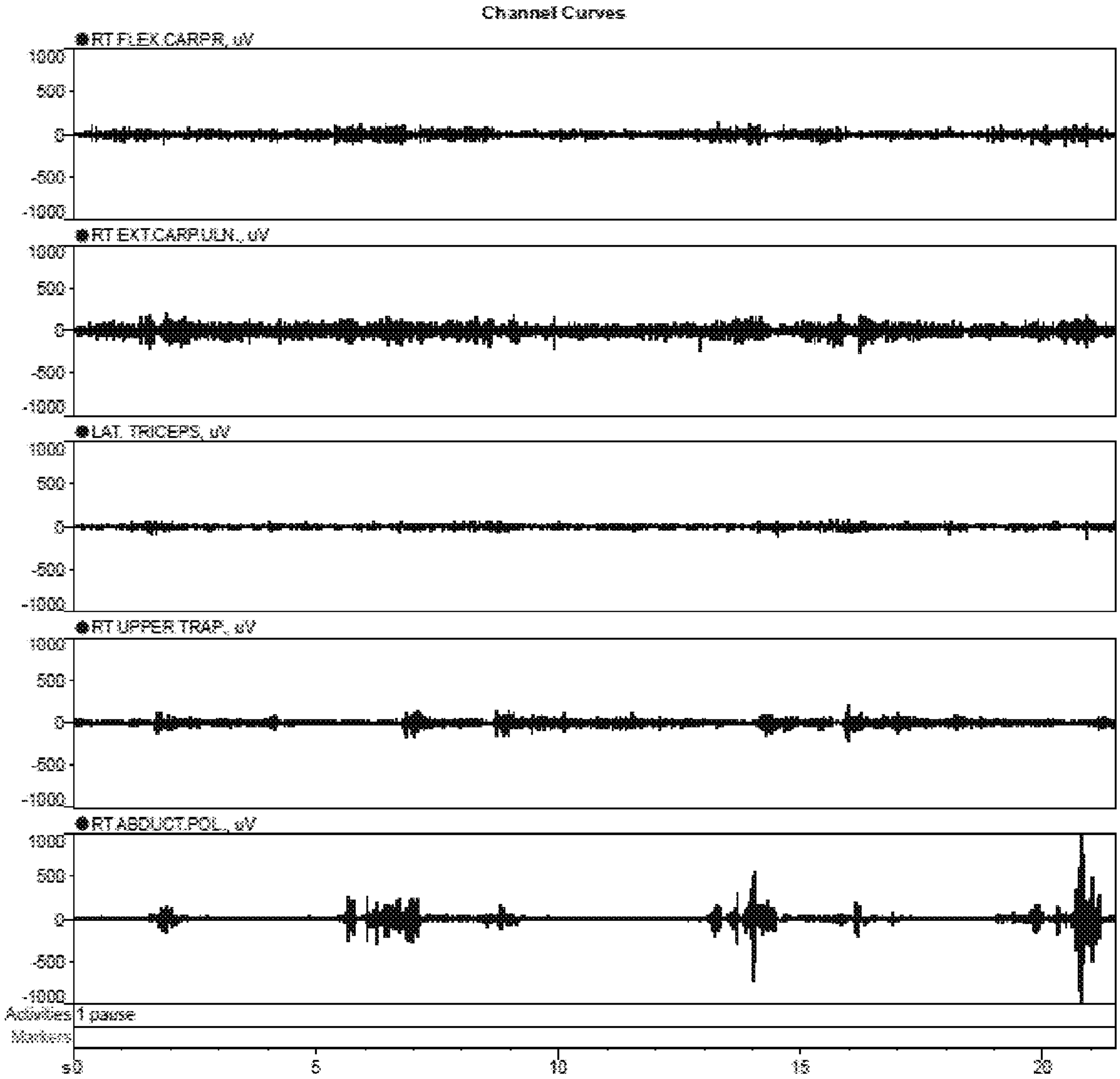
FIG. 13 shows representative tracings of electromyography analysis of muscle effort associated with pipette tip usage. Experimental details are given in Example 2, and results are given in Example 3.

Five muscle groups from the pipetting arm were monitored by EMG. Representative EMG tracings are shown in FIG. 13. The muscle groups monitored included the major muscles involved in hand/finger exertions (e.g., forearm flexor and extensor muscles), the interosseous muscles of the thumb, the bicep, and trapezius muscles.

A calibration routine was conducted at the start of testing to obtain the MVC for each participants' muscles. The corresponding EMG signals were scaled using the MVC to obtain the percent of muscle exertion associated with each subsequent test (% MVC). The applied muscle effort levels were analyzed to determine the physical requirements associated with each pipette and tip combination. In addition, cycle time to complete the task was measured as a gauge of product efficiency, ease of use and productivity. The results were statistically analyzed to determine differences in performance between the products. The primary measurements included; cycle time (e.g., productivity rate in seconds); muscle work (e.g., sum of the average exertion across the 5-muscle groups tested, % maximum voluntary contraction); average exertion (e.g., the average level of muscle effort among the 5-muscle groups tested (% MVC)); peak (e.g., the average peak level of exertion among the muscle groups tested (% MVC)); total work done (e.g., the sum of the total exertions across all 5-muscle groups tested (% MVC)).

Example 3

Measurement of Overall Performance

Pipette tip effort across tasks was used as a measure of overall pipette tip performance. All pipettors with the exception of pipettor 3 were tested with all pipette tips. Pipettor 3 could not accept the generic tips, or tips as described herein.

Figure 14:
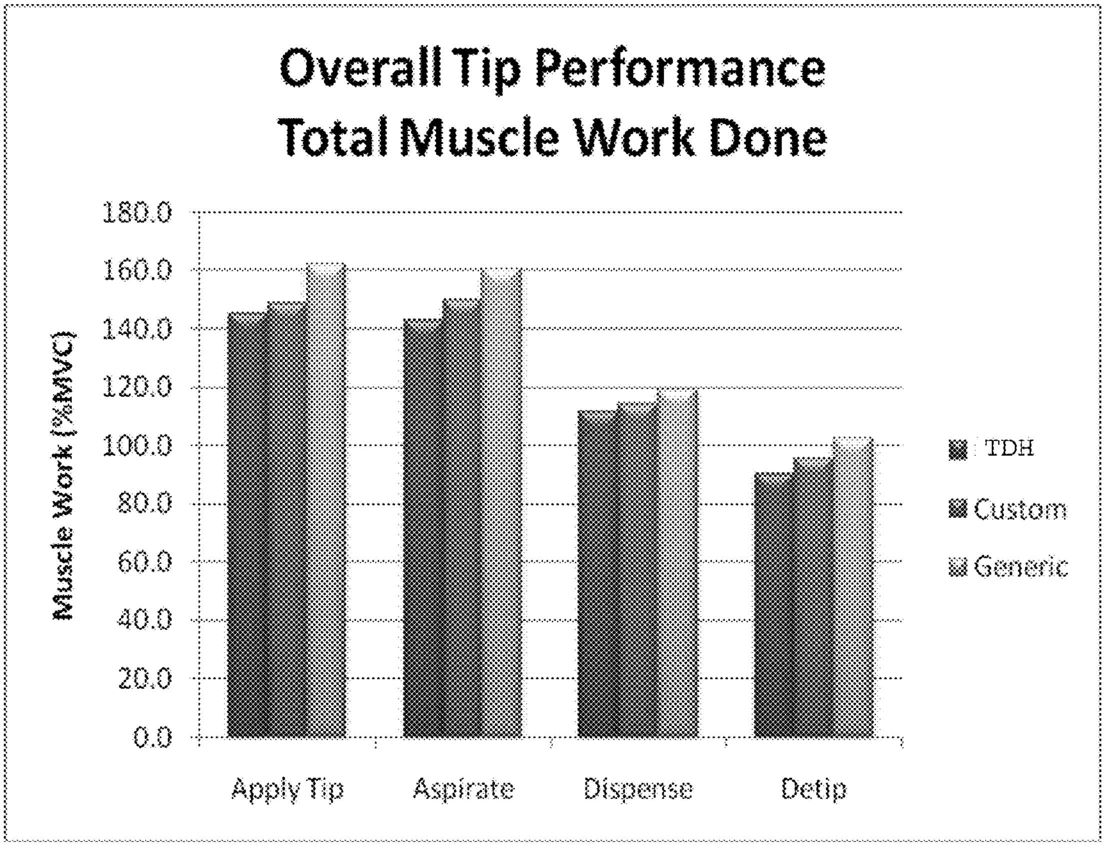
FIG. 14 graphically illustrates the total muscle work done as a measure of tip performance. Experimental details are given in Example 2, and results are given in Example 3.

FIG. 14 graphically illustrates the total muscle work done as a measure of tip performance. The measurements were taken for each of the 4 aspects of pipette tip usage (e.g., apply tip, aspirate liquid, dispense liquid and de-tip or eject tip). The results shown in FIG. 14 indicate that the tips as described herein, perform as well if not better than the generic and custom tips for each of the pipettors tested.

Figure 15:
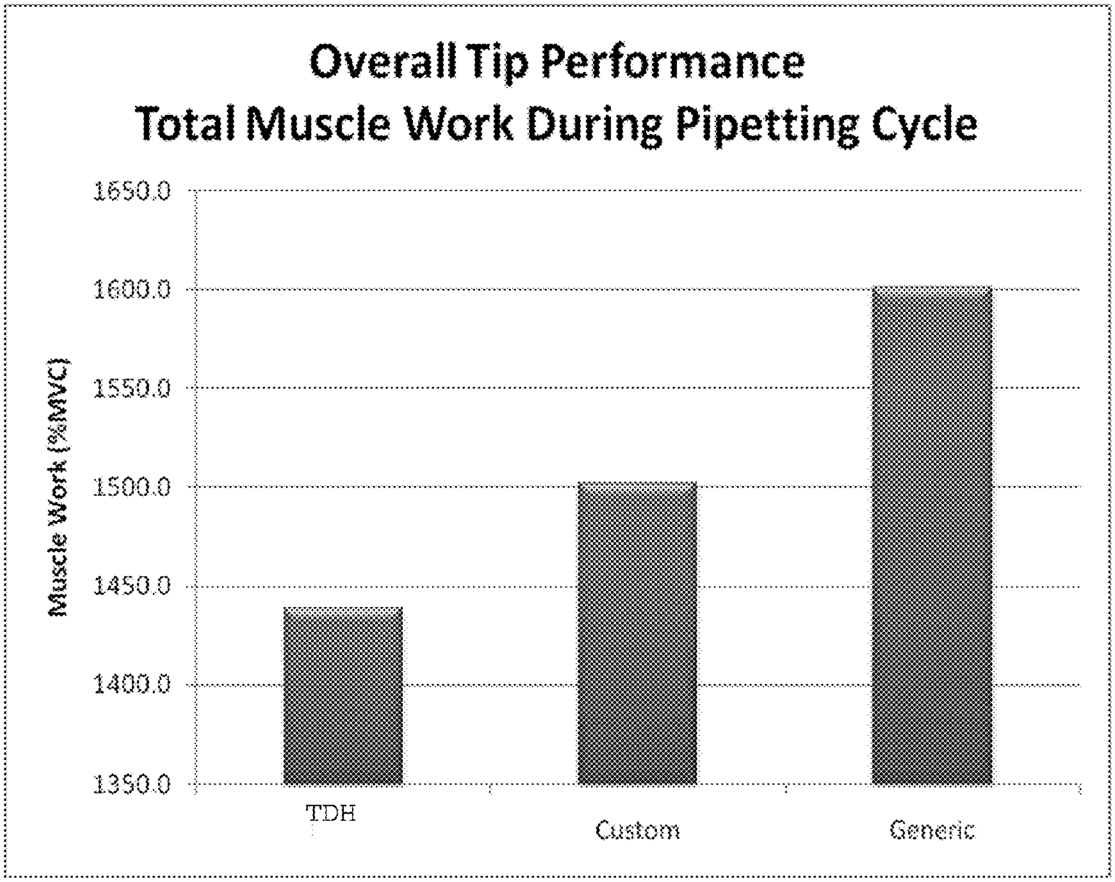
FIG. 15 graphically illustrates the total muscle work during a pipetting cycle as a measure of tip performance. Experimental details are given in Example 2, and results are given in Example 3.

FIG. 15 graphically illustrates the total muscle work during a pipetting cycle as a measure of tip performance. The results presented are the average of the muscle work measurements taken for full cycle testing and on/off testing. The results shown in FIG. 15 indicate that tips described herein perform substantially better than generic tips and custom tips designed for a specific pipettor application.

The results presented in FIGS. 14 and 15 are summarized in the tables below, respectively. The term "TDH" in columns labeled "Tips" in tables presented throughout the disclosure refer to "tips described herein (TDH)".

| Test | Tips | Total Work Done | Muscle Work | Average Exertion | Peak Exertion |
|---|---|---|---|---|---|
| Apply Tip | TDH | 144.91 | 28.98 | 14.80 | 26.98 |
| | Custom* | 149.00 | 29.80 | 14.19 | 25.10 |
| | Generic | 161.92 | 32.38 | 15.93 | 29.45 |
| Aspirate | TDH | 143.08 | 28.62 | 11.25 | 17.02 |
| | Custom* | 149.84 | 29.97 | 10.88 | 16.68 |
| | Generic | 160.53 | 32.11 | 12.16 | 18.44 |
| Dispense | TDH | 111.49 | 22.30 | 10.60 | 18.54 |
| | Custom* | 113.96 | 22.79 | 10.31 | 17.88 |
| | Generic | 119.04 | 23.81 | 11.01 | 18.80 |
| De-tip | TDH | 90.42 | 18.08 | 13.15 | 21.50 |
| | Custom* | 95.73 | 19.15 | 12.76 | 21.99 |
| | Generic | 102.64 | 20.53 | 13.63 | 23.76 |

| Test | Tips | Total Work Done | Muscle Work | Average Exertion | Peak Exertion |
|---|---|---|---|---|---|
| Full Cycle | TDH | 1438.57 | 287.71 | 15.11 | 43.29 |
| | Custom* | 1502.03 | 300.41 | 14.72 | 43.88 |
| | Generic | 1601.45 | 320.29 | 15.45 | 47.38 |
| On Off | TDH | 2503.00 | 500.60 | 17.85 | 49.85 |
| | Custom* | 2593.77 | 518.75 | 17.37 | 49.33 |
| | Generic | 2878.00 | 575.60 | 18.29 | 55.11 |

*Due to tip fit limitations, the Custom tip results do not include Pipettor 3 for Overall Performance. Pipettor 3 results are presented in Example 4, Performance Across Pipette Tips.

Example 4

Performance Across Pipette Tips

Tip performance was examined using full cycle and on/off tests for each pipette. Statistical analysis was performed at either $p<0.05$ or $p<0.1$ confidence intervals. The results are summarized in the table below.

| Product | Test | Tips | Time | Total Muscle Work | Muscle Work | Average Exertion | Peak Exertion |
|---|---|---|---|---|---|---|---|
| Pipettor 1 | Full Cycle | TDH | 19.48 | 1336.08 | 267.22 | 14.22 | 38.30 |
| Pipettor 1 | Full Cycle | Custom | 21.39 | 1516.00 | 303.20 | 14.27 | 40.67 |
| Pipettor 1 | Full Cycle | Generic | 20.59 | 1506.08 | 301.22 | 14.59 | 43.49 |
| Pipettor 1 | On Off | TDH | 26.79 | 2284.29 | 456.86 | 17.38 | 48.83 |
| Pipettor 1 | On Off | Custom | 29.02 | 2317.99 | 463.60 | 16.58 | 45.90 |
| Pipettor 1 | On Off | Generic | 30.43 | 2785.79 | 557.16 | 18.73 | 54.32 |
| Pipettor 2 | Full Cycle | TDH | 20.39 | 1420.92 | 284.18 | 15.26 | 44.18 |
| Pipettor 2 | Full Cycle | Custom | 20.33 | 1498.06 | 299.61 | 15.06 | 45.80 |
| Pipettor 2 | Full Cycle | Generic | 21.37 | 1690.77 | 338.15 | 16.19 | 53.78 |
| Pipettor 2 | On Off | TDH | 28.25 | 2568.33 | 513.67 | 18.83 | 50.01 |
| Pipettor 2 | On Off | Custom | 32.41 | 3187.52 | 637.50 | 19.70 | 58.74 |
| Pipettor 2 | On Off | Generic | 32.25 | 2822.47 | 564.49 | 17.40 | 53.56 |
| Pipettor 3 | Full Cycle | Custom | 21.43 | 1494.65 | 298.93 | 14.05 | 37.73 |
| Pipettor 3 | On Off | Custom | 29.87 | 2516.26 | 503.25 | 16.90 | 46.17 |
| Pipettor 4 | Full Cycle | TDH | 20.01 | 1477.72 | 295.54 | 15.02 | 46.54 |
| Pipettor 4 | Full Cycle | Custom | 21.20 | 1502.86 | 300.57 | 14.60 | 43.53 |
| Pipettor 4 | Full Cycle | Generic | 21.98 | 1607.65 | 321.53 | 15.02 | 48.33 |
| Pipettor 4 | On Off | TDH | 30.68 | 2709.46 | 541.89 | 17.63 | 51.68 |
| Pipettor 4 | On Off | Custom | 32.70 | 2449.55 | 489.91 | 15.21 | 46.42 |
| Pipettor 4 | On Off | Generic | 33.75 | 3286.21 | 657.24 | 19.12 | 65.92 |
| Pipettor 5 | Full Cycle | TDH | 19.43 | 1527.66 | 305.53 | 16.03 | 44.22 |
| Pipettor 5 | Full Cycle | Custom | 20.07 | 1491.20 | 298.24 | 14.95 | 45.50 |
| Pipettor 5 | Full Cycle | Generic | 20.86 | 1596.84 | 319.37 | 15.61 | 42.91 |
| Pipettor 5 | On Off | TDH | 27.90 | 2449.94 | 489.99 | 17.57 | 48.89 |
| Pipettor 5 | On Off | Custom | 28.54 | 2266.01 | 453.20 | 17.03 | 43.33 |
| Pipettor 5 | On Off | Generic | 29.92 | 2662.90 | 532.58 | 18.00 | 47.85 |

The results summarized in the table above illustrate that, on average, the tips described herein consistently resulted in shorter cycle times and frequently required less total and average muscle work than the competitors tips.

Example 5

Productivity Measurements

Speed of task completion was used to measure the overall contribution to productivity for each pipette tip. Full cycle testing and on/off testing were used to determine time to complete pipetting tasks. The results presented in the tables below and FIGS. 16 and 17 indicate that on average the custom and generic tips were 5.25% and 6.83%, respectively, slower than tips described herein during the completion of the pipetting cycle. The on/off test results indicated that the custom and generic tips were 7.57 and 10.98% slower, respectively, than tips described herein.

Speed advantages of tips described herein can be attributed to the following factors; (i) flared tip opening (e.g., enables the user to more easily align the pipettor and pipette tip), (ii) reduced effort to apply and eject the tips described herein (e.g., contributes to faster cycling times), and (iii)

color contrast between tips and pipette tip rack (e.g., tips described herein are packaged in a black rack which can improve visibility when applying a tip to the pipettor barrel).

Due to the repetitive nature of pipette use, improvements in speed performance translate to a reduction in the overall exposure to the stressors that contribute to ergonomic risk.

The results of the productivity measurements are presented in the table below and in FIGS. 16 and 17.

| Test | Tips | Time | % Diff Compared to TDH |
|---|---|---|---|
| Full Cycle | TDH | 19.84 | |
| Full Cycle | Custom | 20.88 | 5.25% |
| Full Cycle | Generic | 21.19 | 6.83% |
| On Off | TDH | 28.41 | |
| On Off | Custom | 30.56 | 7.57% |
| On Off | Generic | 31.53 | 10.98% |

Example 6

Product Performance, Comfort and Ranking Surveys

Subjects evaluated while performing pipetting tasks were surveyed at various points in the test to obtain feedback and their opinions regarding product performance and perceived exertion levels. The methods involved standardized, numerically based ratings survey techniques. A summary of the surveys and results are presented in the following sections.

Perceived Exertion Ratings

The participants were asked to rate their overall perceived exertion at the completion of the on/off and full cycle tests for each pipette tip. The survey used was based on standardized perceptions of effort using a modified Borg scale, shown in the table below. Borg ratings below three (e.g., "Moderate") generally are considered to be acceptable levels of exertion for tasks that have extended durations. The Borg scale can be used as a subjective determination of the physical requirements associated with a task, and a relative comparison of products used to perform a given task.

-continued

| Borg CR-10 Scale (rating of perceived exertion [RPE]) | |
|---|---|
| 0 | Nothing at all |
| 0.5 | Extremely weak (hardly noticeable) |
| 1 | Very weak |
| 2 | Weak (light) |
| 3 | Moderate |
| 4 | |
| 5 | Strong (heavy) |
| 6 | |
| 7 | Very Strong |
| 8 | |
| 9 | |
| 10 | Extremely Strong (almost maximal) |
| * | Maximal |

Figure 18:
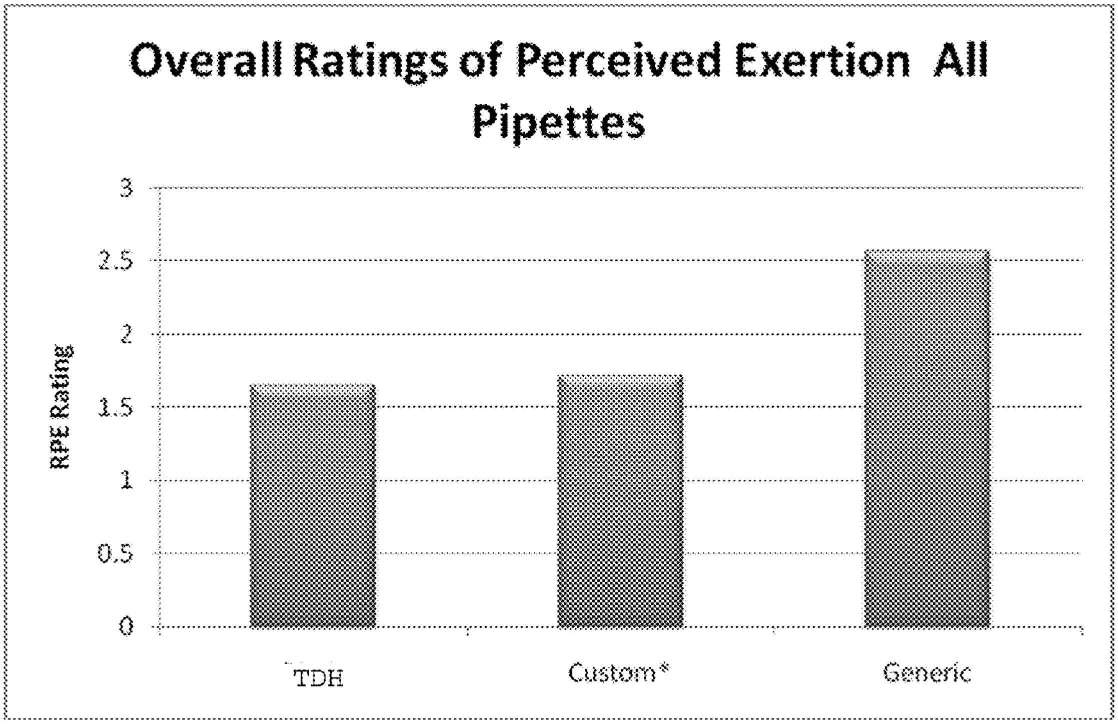
FIG. 18 graphically illustrates the average overall ratings of perceived exertion for all pipette tips tested using all 5 pipettors.
Figure 19:
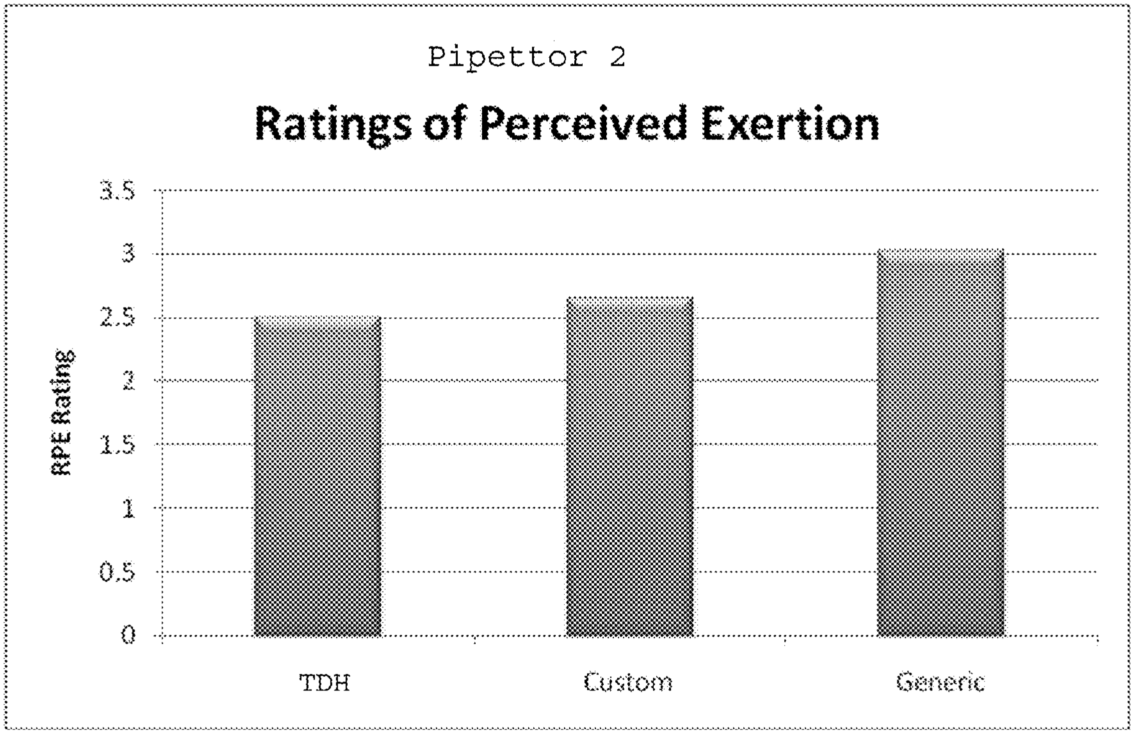
FIG. 19 graphically illustrates the perceived exertion ratings for all pipette tips tested using pipettor 2.
Figure 20:
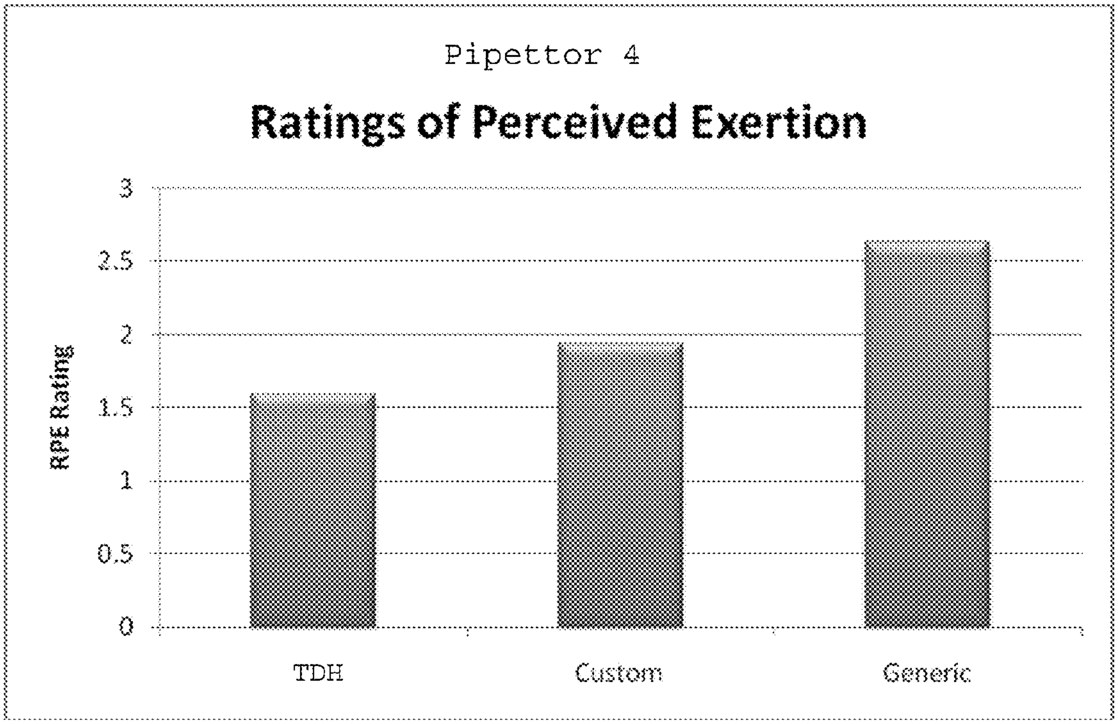
FIG. 20 graphically illustrates the perceived exertion ratings for all pipette tips tested using pipettor 4.
Figure 21:
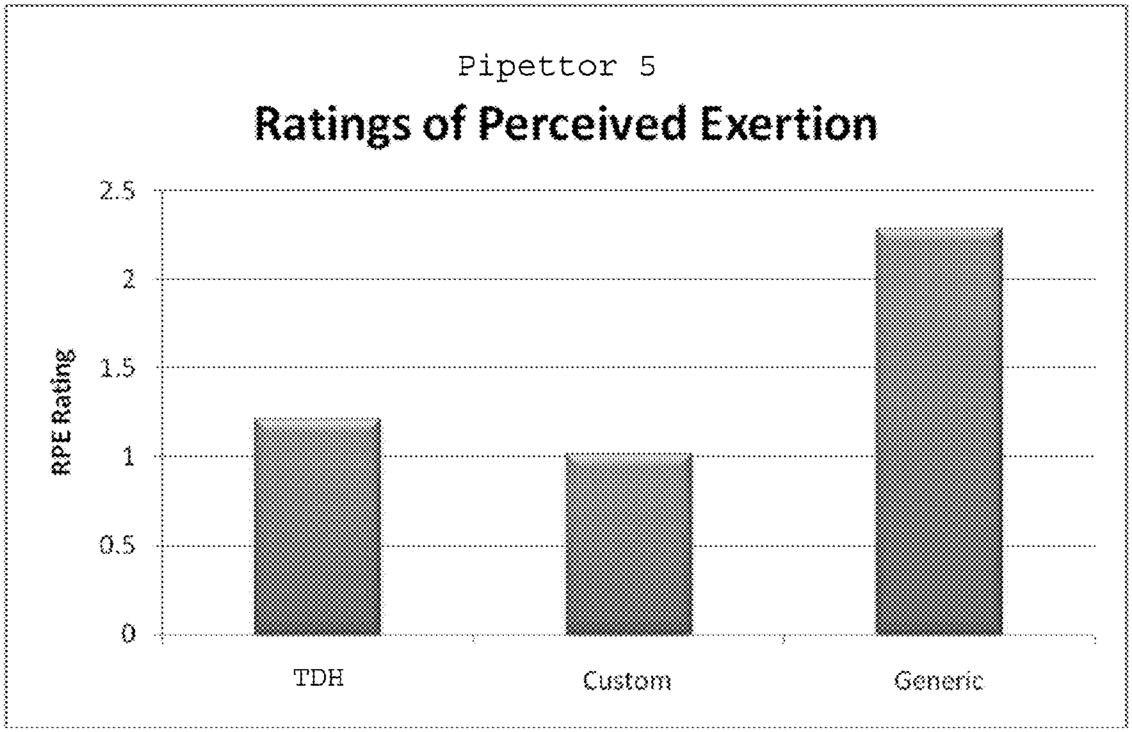
FIG. 21 graphically illustrated the perceived exertion ratings for all pipette tips tested using pipettor 5.
Figure 22:
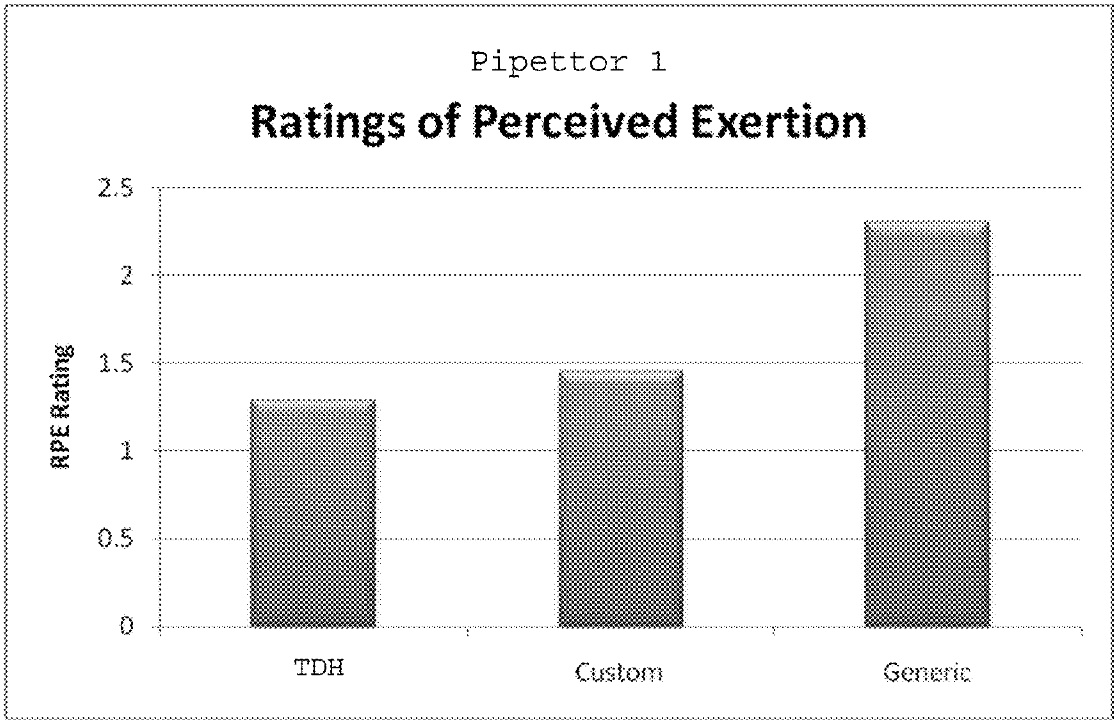
FIG. 22 graphically illustrates the perceived exertion ratings for all pipette tips tested using pipettor 1. Experimental details for FIGS. 18-22 are given in Example 2, and results are given in Example 6.
Figure 23:
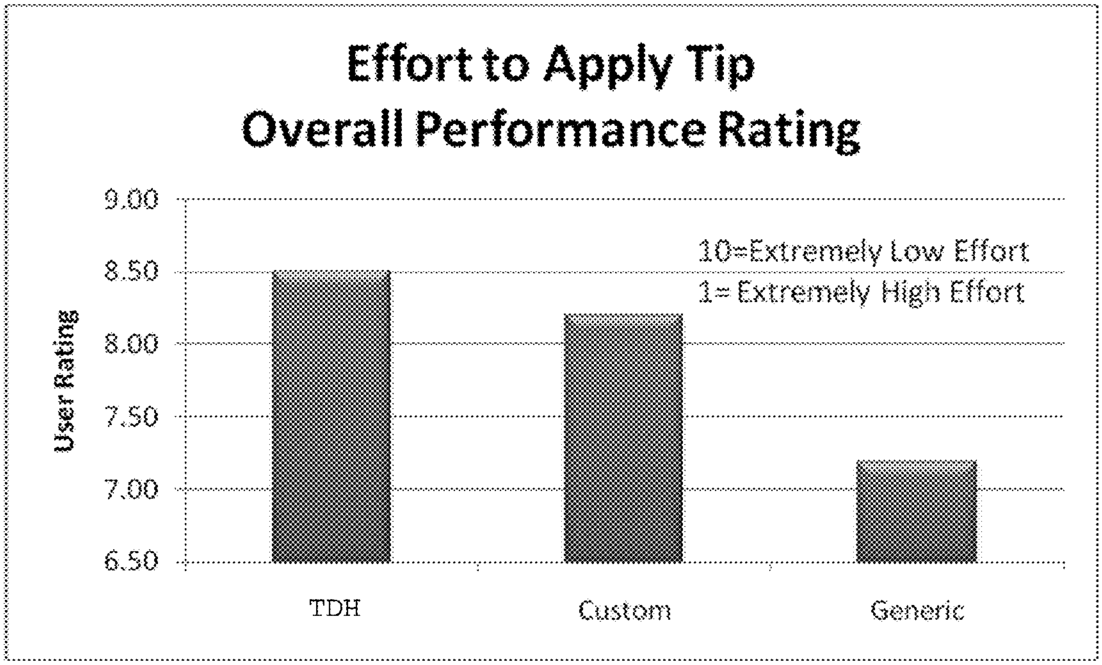
FIG. 23 graphically illustrates the average overall performance rating with respect to 'effort to apply tip" to the various pipettors for each pipette tip.
Figure 24:
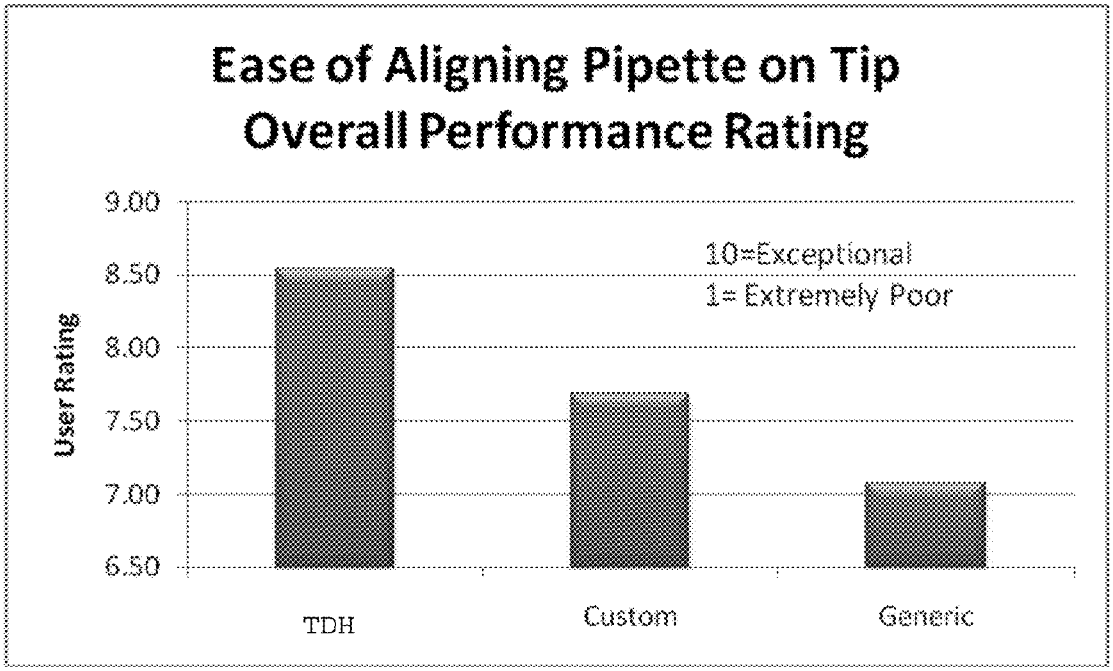
FIG. 24 graphically illustrates the average overall performance rating with respect to "ease of aligning pipette barrel and tip", for each pipette tip.
Figure 25:
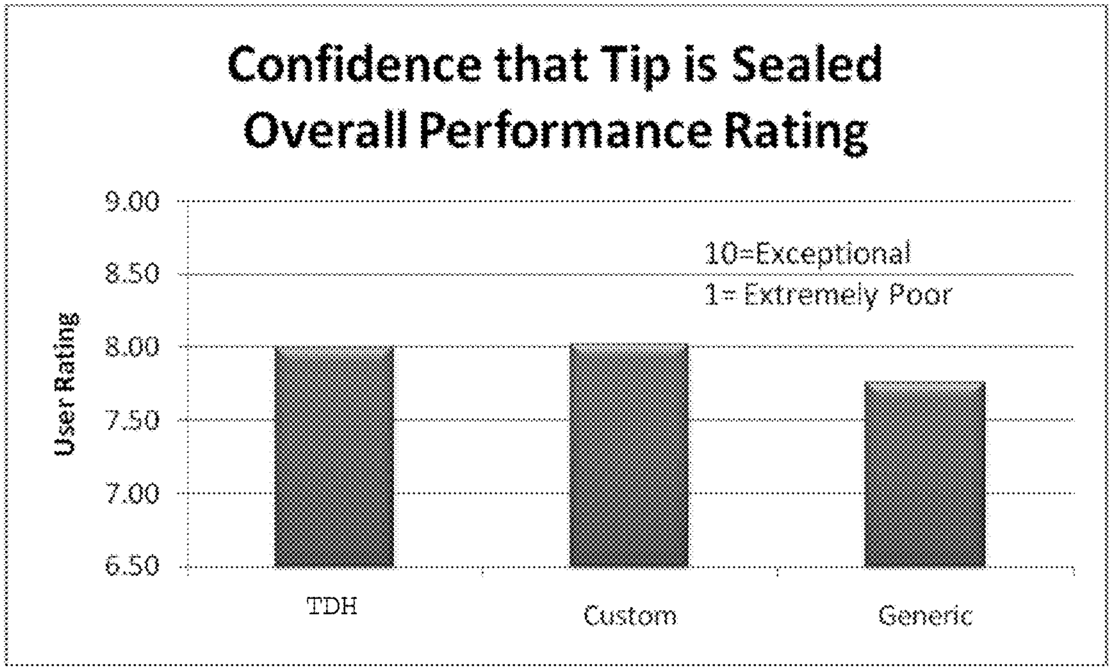
FIG. 25 graphically illustrates the average overall performance rating with respect to "confidence tip is sealed on pipettor", for each pipette tip.
Figure 26:
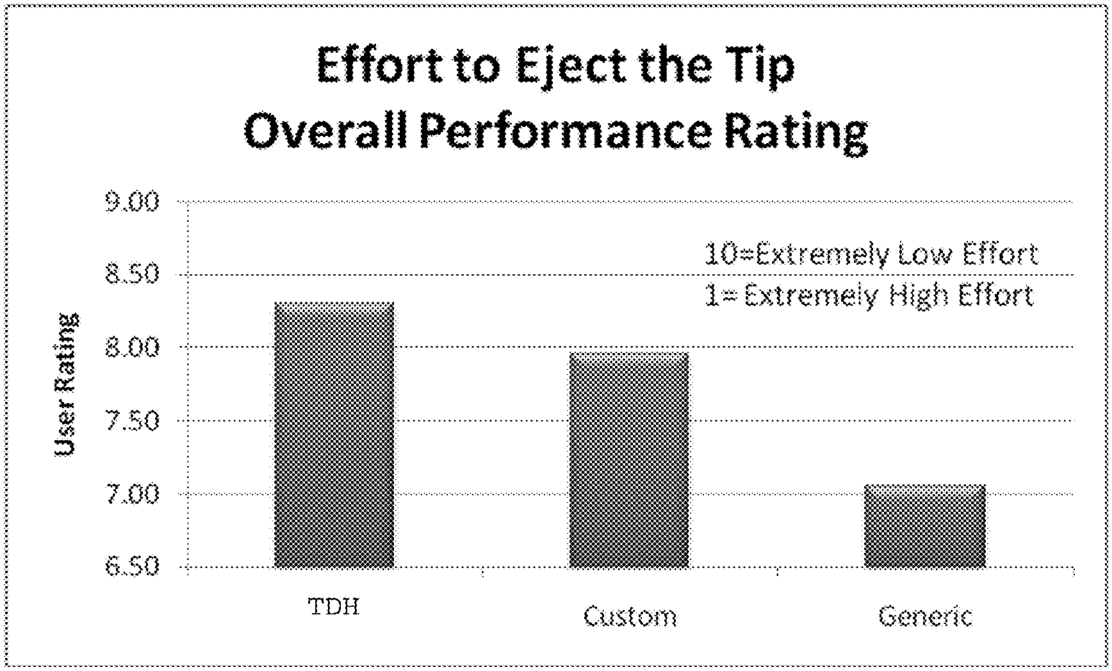
FIG. 26 graphically illustrates the average overall performance rating with respect to "effort to eject tip", from the various pipettors for each pipette tip.
Figure 27:
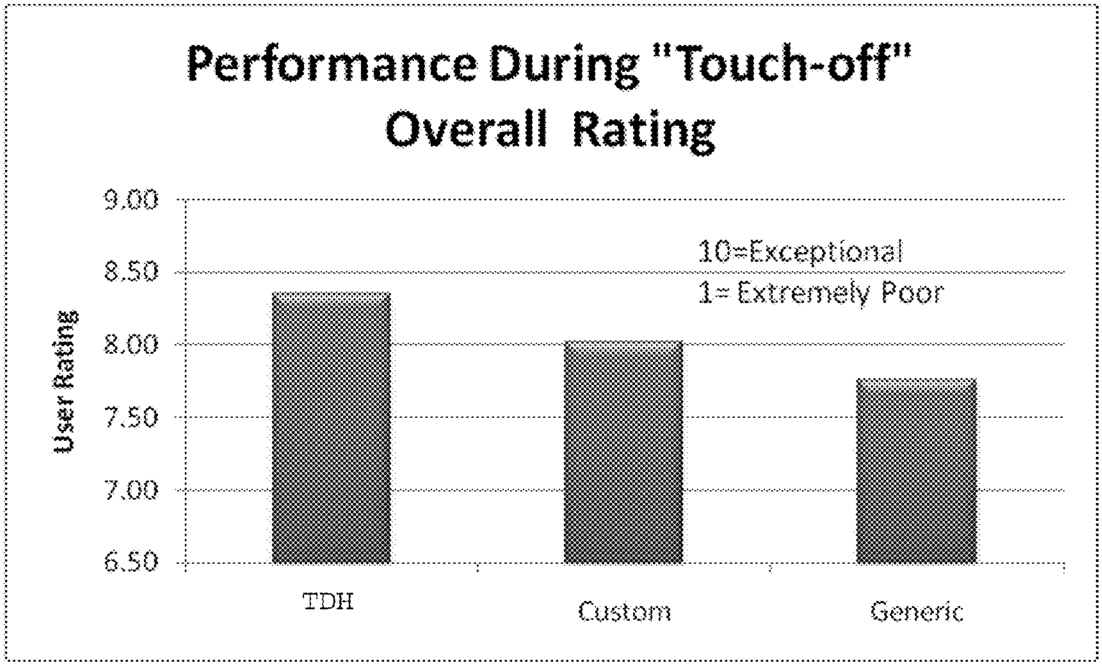
FIG. 27 graphically illustrates the average overall performance rating with respect to "performance during touching off", for each tip.
Figure 28:
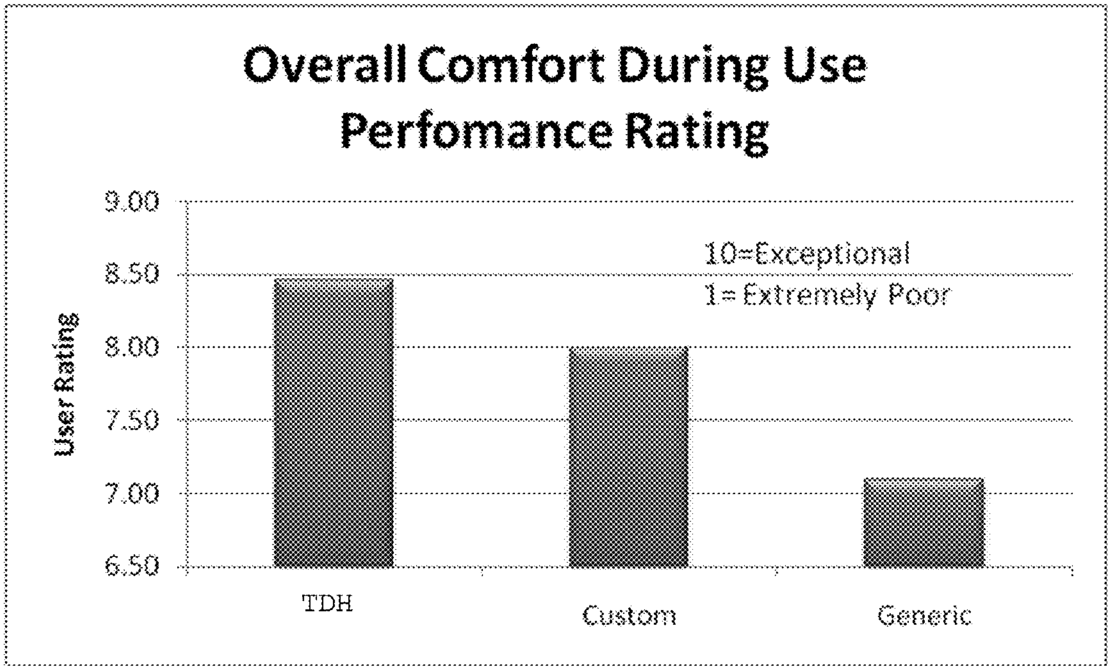
FIG. 28 graphically illustrates the average overall performance rating with respect to "overall comfort of use" for each pipette tip. Experimental details for FIGS. 23-28 are given in Example 2, and results are given in Example 6.

The results of perceived exertion testing are presented graphically in FIGS. 18-22. Generally, the results suggested that testing participants perceived the tips described herein as requiring the lowest, or next to lowest, physical effort among the tips tested. FIG. 18 graphically represents the average overall ratings of perceived exertion for all pipette tips. FIG. 19 graphically illustrated the perceived exertion ratings for all pipette tips tested using pipettor 2. FIG. 20 graphically illustrated the perceived exertion ratings for all pipette tips tested using pipettor 4. FIG. 21 graphically illustrated the perceived exertion ratings for all pipette tips tested using pipettor 5. FIG. 22 graphically illustrated the perceived exertion ratings for all pipette tips tested using pipettor 1. Pipettor 3 was not tested in these experiments due to pipette tip fitment problems as noted herein.

Pipette Tip Performance Ratings

A product performance survey was administered to each participant at the completion of each pipette/tip combination test. The survey included six questions pertaining to the participants' perceptions of tip performance and ease of use and comfort. A 10-point scale was utilized where 10 indicated the best response (e.g., exceptional performance) and 1 indicated the worst response (e.g., extremely poor performance). The survey questions included: (1) effort to apply tip; (2) ease of aligning pipette on tip; (3) confidence that tip is sealed on pipettor; (4) effort to eject tip; (5) performance during "touch off"; and (6) overall comfort during use. "Touching off" is the act of touching the dispensing end of the pipette tip against the bottom or sidewall of the liquid receptacle in order to remove the last drop of liquid that may adhere to the outer surface of the pipette tip.

Generally, the tips described herein received the highest (e.g., best) ratings by participants across each of the survey criteria. The results of the subjective surveys are presented graphically in FIGS. 23-28, and also are summarized in the table below.

| Pipette | Tips | Effort Applying Tip | Ease to Align | Confidence Tip Sealed | Effort Ejecting Tip | "Touch-Off" | Overall Comfort |
|---|---|---|---|---|---|---|---|
| Pipettor 1 | TDH | 9.00 | 9.23 | 8.07 | 8.63 | 8.63 | 8.92 |
| Pipettor 1 | Custom | 8.37 | 8.22 | 7.69 | 8.38 | 8.01 | 8.34 |
| Pipettor 1 | Generic | 7.55 | 8.08 | 8.35 | 7.59 | 8.19 | 7.79 |
| Pipettor 2 | TDH | 8.07 | 8.33 | 8.06 | 7.40 | 7.96 | 8.12 |
| Pipettor 2 | Custom | 7.48 | 7.34 | 7.92 | 6.56 | 7.81 | 7.05 |
| Pipettor 2 | Generic | 6.77 | 6.85 | 7.77 | 6.44 | 7.58 | 6.49 |
| Pipettor 3 | Custom | 8.23 | 7.60 | 9.00 | 8.30 | 8.02 | 8.48 |
| Pipettor 4 | TDH | 8.35 | 7.82 | 7.73 | 8.56 | 8.27 | 8.05 |
| Pipettor 4 | Custom | 8.05 | 7.05 | 7.55 | 7.85 | 7.66 | 7.52 |
| Pipettor 4 | Generic | 7.16 | 6.41 | 7.14 | 7.32 | 7.39 | 6.75 |
| Pipettor 5 | TDH | 8.59 | 8.77 | 8.14 | 8.61 | 8.54 | 8.75 |
| Pipettor 5 | Custom | 8.89 | 8.26 | 7.95 | 8.71 | 8.58 | 8.58 |
| Pipettor 5 | Generic | 7.28 | 6.94 | 7.79 | 6.87 | 7.87 | 7.34 |

Example 7

Pipette Tip Ratings

The participants were asked to rank each of the tips from "most preferred" to "least preferred at the completion of all phases of testing. The ranking categories for the pipette tip ratings were based on the following criteria; (1) effort to apply pipette tip to pipettor; (2) effort to eject pipette tip from pipettor; (3) ease of aligning pipette tip with pipettor barrel; (4) overall comfort of a particular tip; (5) overall speed and efficiency of task completion with a particular pipette tip; and (6) overall preference of use.

Figure 29:
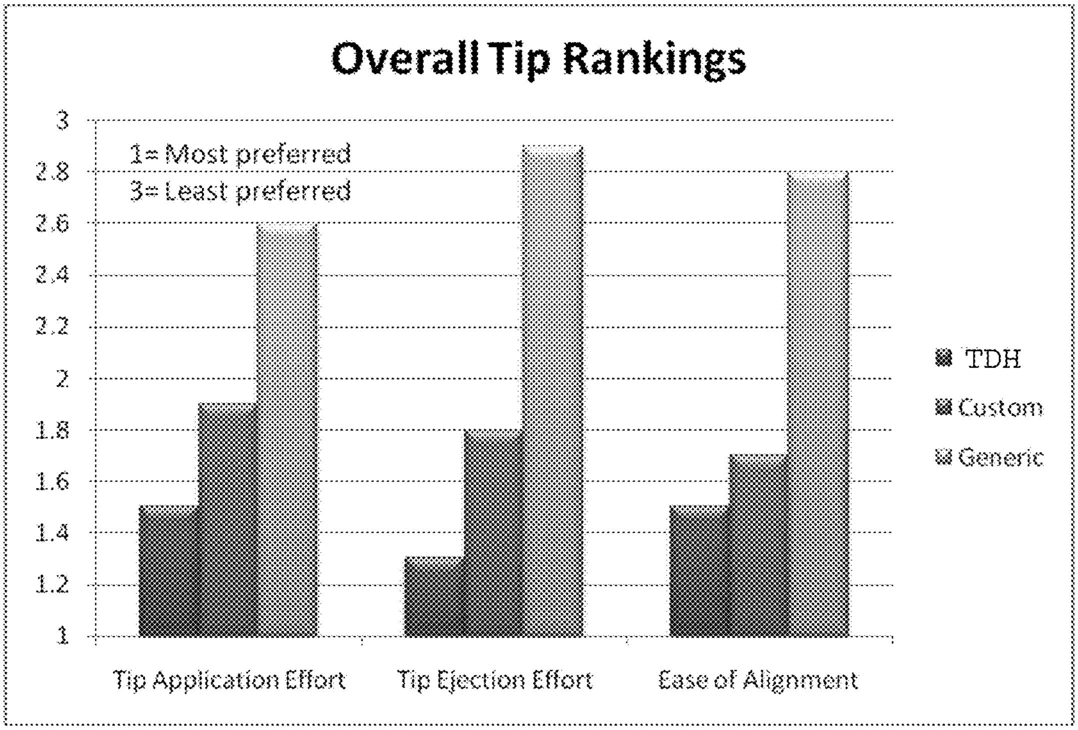
FIG. 29 graphically illustrates the overall tip rankings for; effort to apply pipette tip to pipettor (e.g., "tip application effort" panel), effort to eject pipette tip from pipettor (e.g., "tip ejection effort" panel), and ease of aligning pipette tip with pipettor barrel (e.g., "ease of alignment" panel) for each pipette tip tested.
Figure 30:
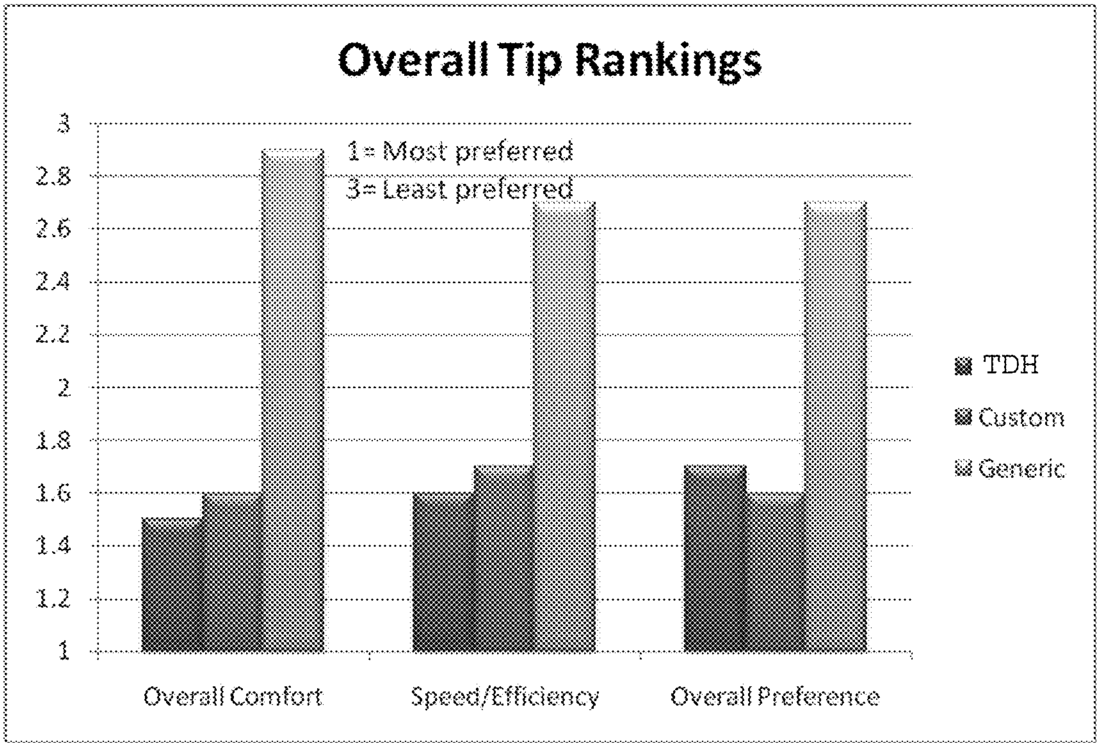
FIG. 30 graphically illustrates the overall tip rankings for; overall comfort of a particular tip (e.g., "overall comfort" panel), overall speed and efficiency of task completion with a particular pipette tip (e.g., "speed/efficiency" panel), and overall preference of use (e.g., "overall preference panel") of a particular tip. Experimental details for FIGS. 29 and 30 are given in Example 2, and results are given in Example 7.

Each pipette tip was awarded points base on the ranking received for each of the criteria. The product ranked as "most preferred" received a ranking value of "1", and the least preferred received a ranked value of "3". The results are presented graphically in FIGS. 29 and 30. FIG. 29 shows the results for effort to apply pipette tip to pipettor (e.g., "tip application effort" panel), effort to eject pipette tip from pipettor (e.g., "tip ejection effort" panel), and ease of aligning pipette tip with pipettor barrel (e.g., "ease of alignment" panel) for each pipette tip tested. FIG. 30 shows the results for overall comfort of a particular tip (e.g., "overall comfort" panel), overall speed and efficiency of task completion with a particular pipette tip (e.g., "speed/efficiency" panel), and overall preference of use (e.g., "overall preference panel") of a particular tip. The results shown in FIGS. 29 and 30 indicate that the tips described herein were ranked as the most preferred in nearly all categories and was ranked similarly to the custom (e.g., brand specific) pipette tips in overall performance. The popular generic tip selected due to is popularity ranked as least preferred in all categories used in pipette tip ranking.

Example 8

Pipette Tip Application and Ejection Forces

Pipette tip application and ejection forces were measured using a digital force gauge. The forces were measured on the 200 microliter and 1000 microliter capacities for each brand of pipette tip tested. The pipette tips tested were (i) the tips described herein, (ii) custom tips (e.g., brand specific), and (ii) the popular generic pipette tip. The test results for pipette tips on each brand of pipettor are shown graphically in FIGS. 31-39. The results shown for pipettor 3 only reflect the brand specific custom tip due to fitment of pipette tips as noted herein.

Figure 31:
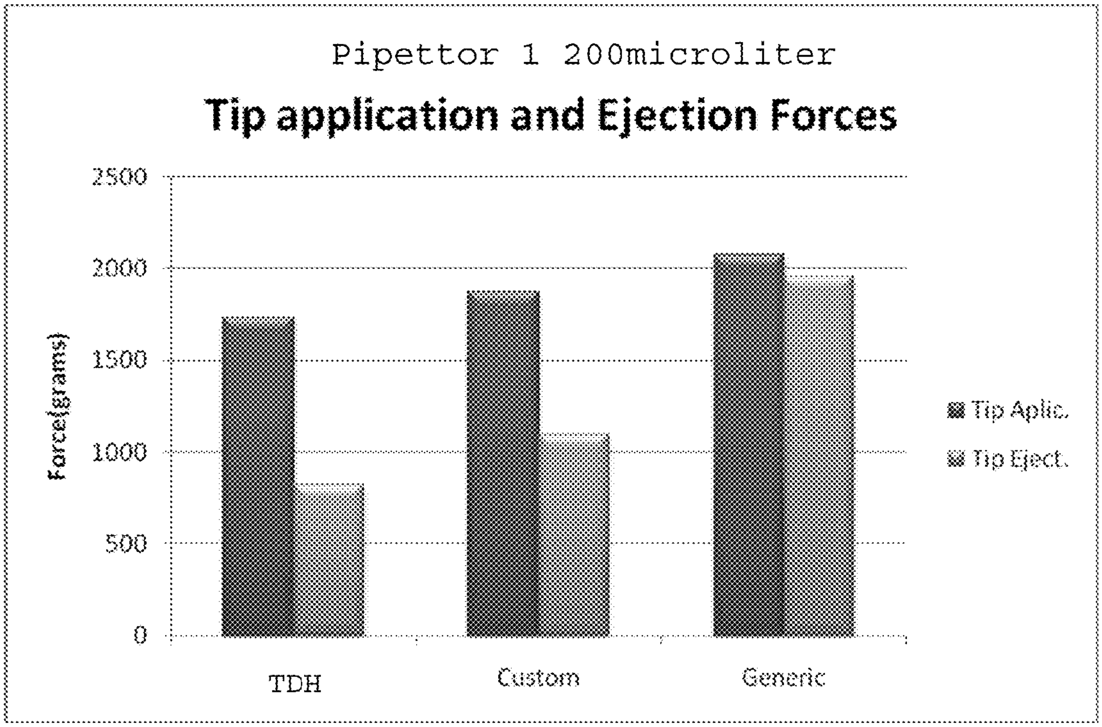
FIGS. 31-39 graphically illustrate pipette tip application and ejection forces or each of the type of pipette tips tested with each pipettor. Pipette tips of the 200 microliter and 1000 microliter capacities were tested for each brand.
Figure 32:
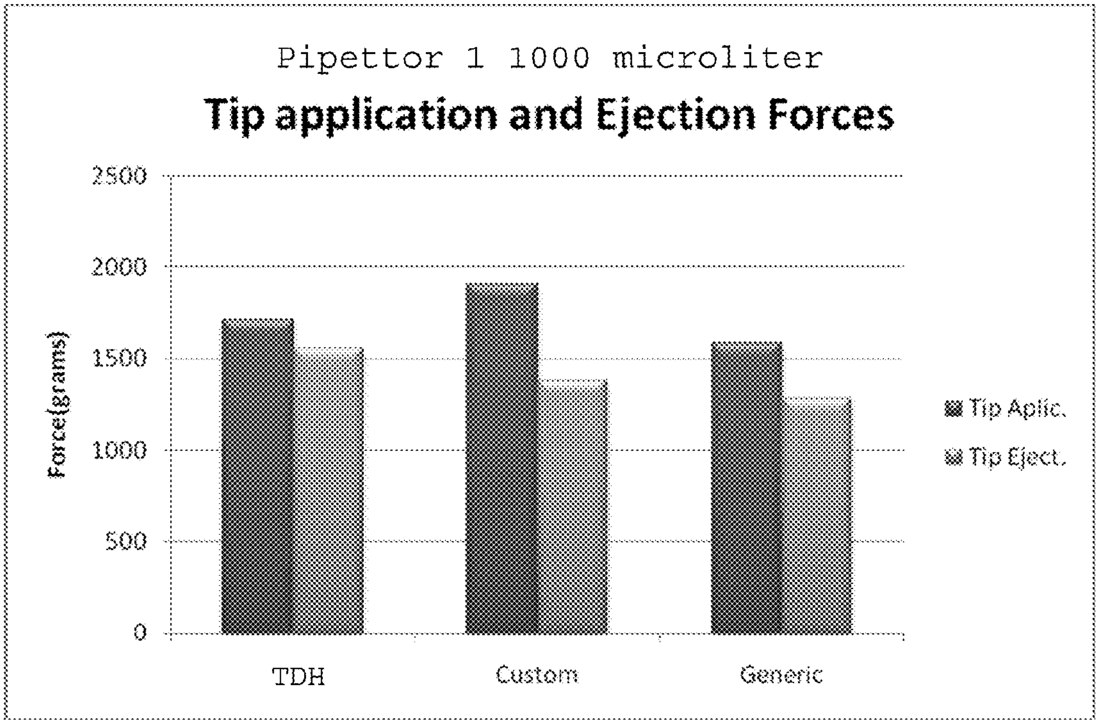
Figure 33:
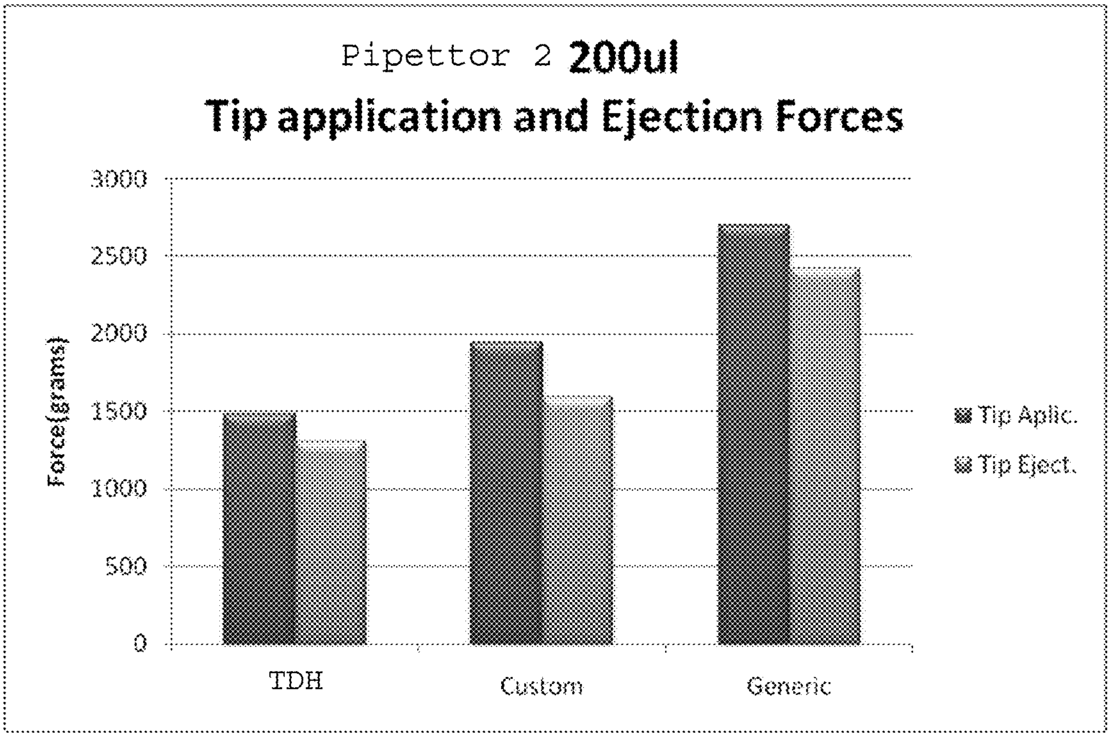
Figure 34:
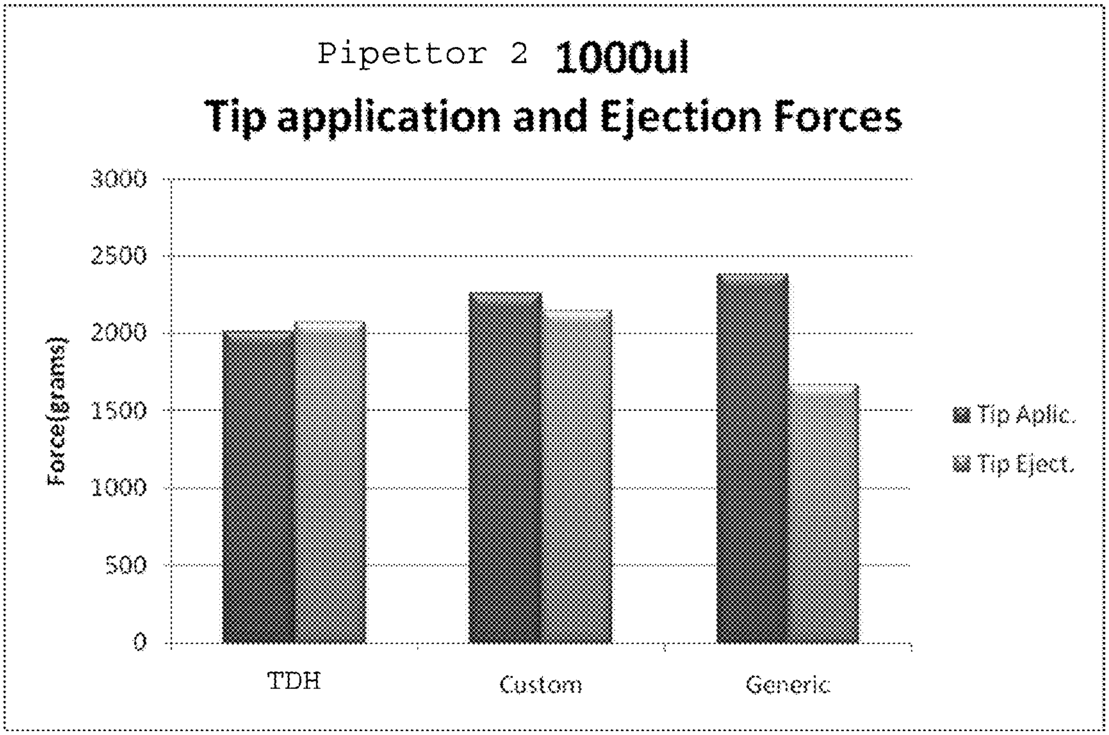
Figure 35:
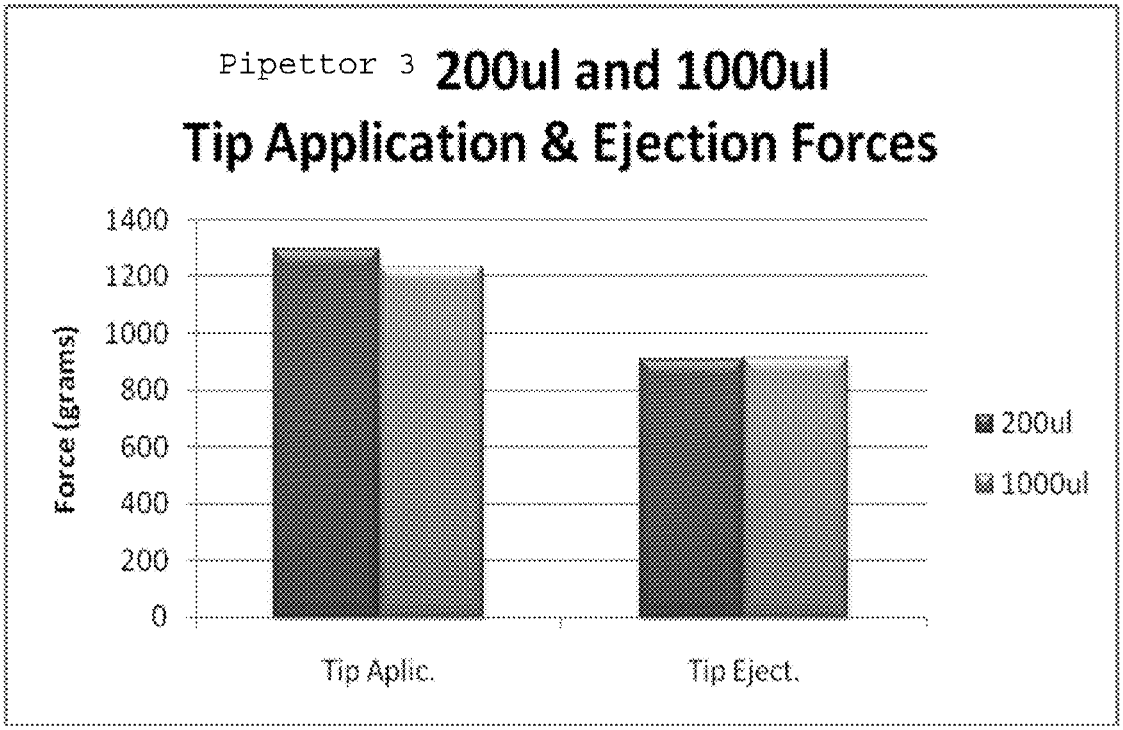
Figure 36:
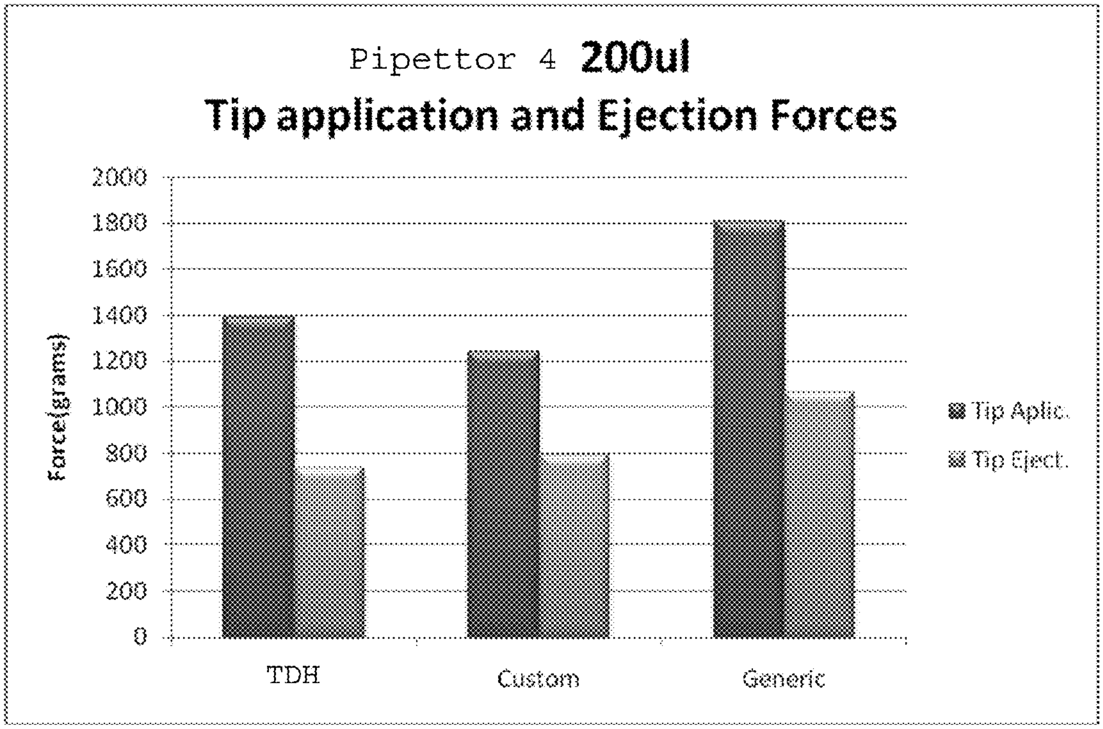
Figure 37:
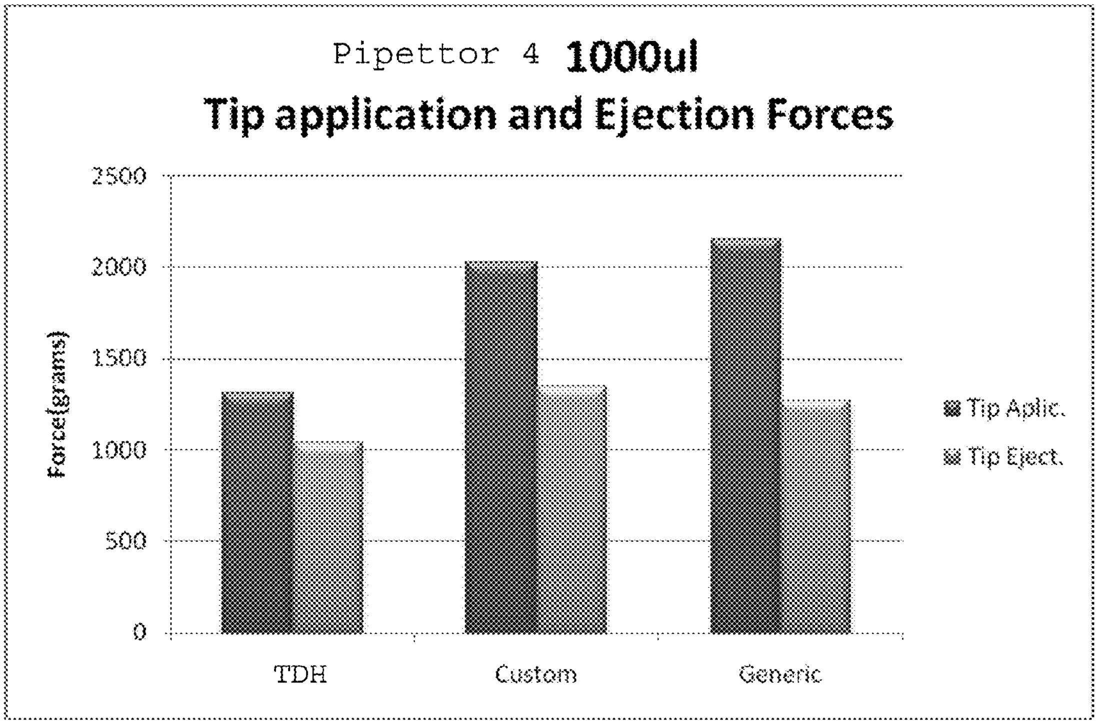
Figure 38:
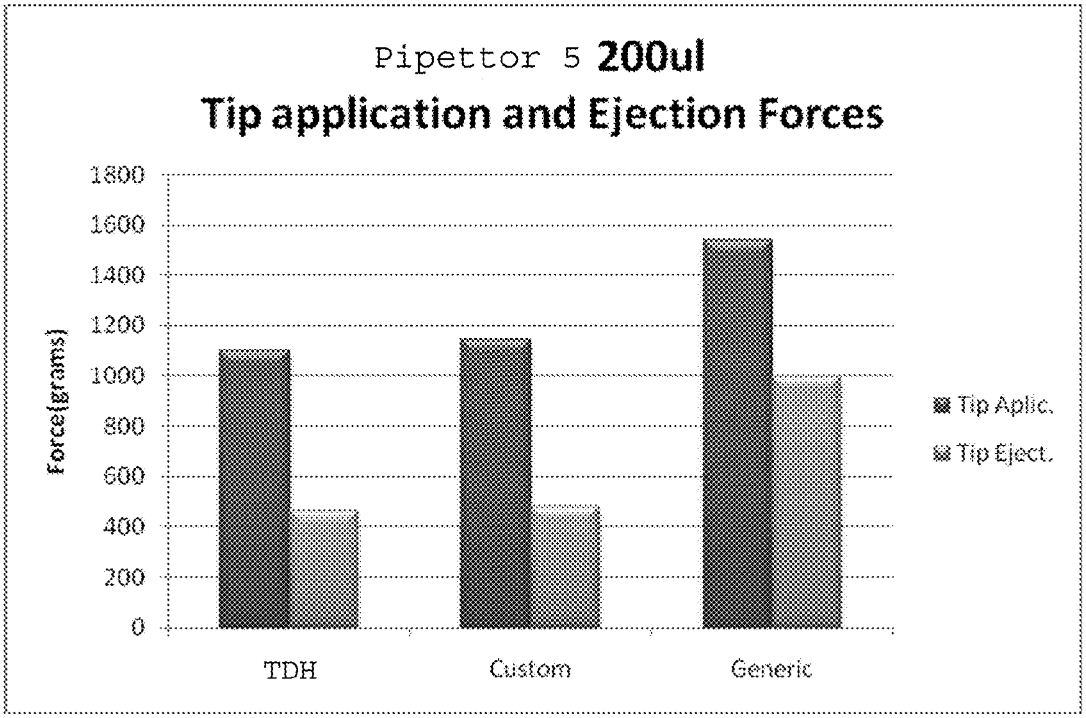
Figure 39:
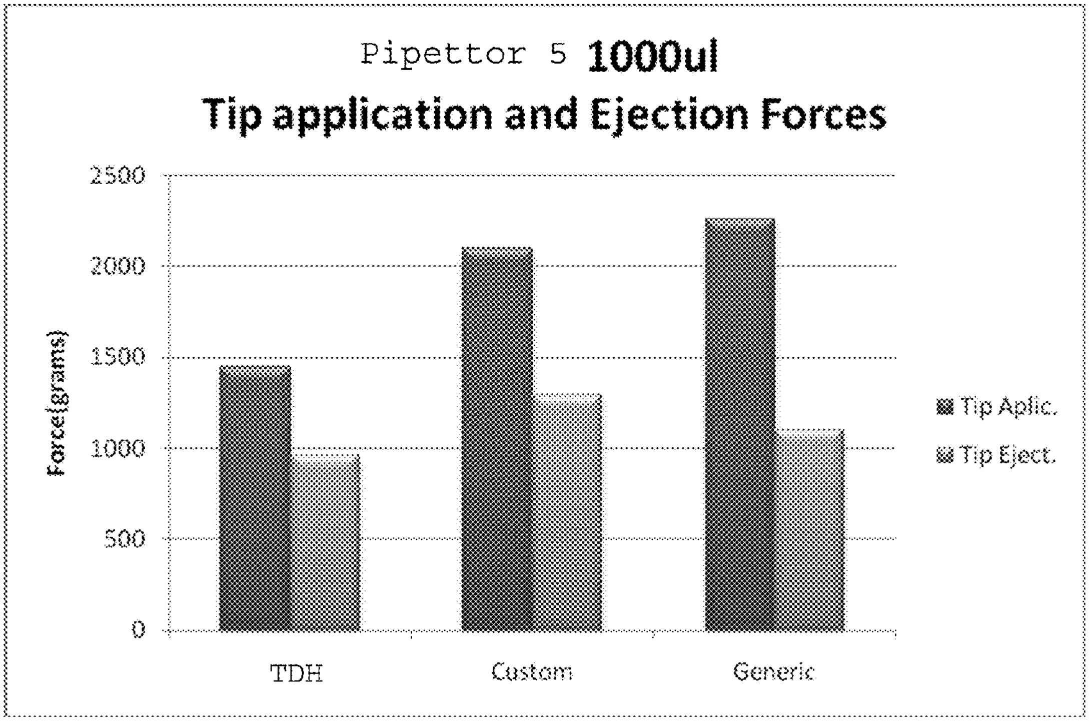

FIG. 31 shows the results of pipettor 1 with tips of the 200 microliter capacity. FIG. 32 shows the results of pipettor 1 with tips of the 1000 microliter capacity. FIG. 33 shows the results of pipettor 2 with tips of the 200 microliter capacity. FIG. 34 shows the results of pipettor 2 with tips of the 1000 microliter capacity. FIG. 35 shows the results of pipettor 3 using only brand specific custom pipette tips in the 200 microliter and 1000 microliter capacities. FIG. 36 shows the results of pipettor 4 with tips of the 200 microliter capacity. FIG. 37 shows the results of pipettor 4 with tips of the 1000 microliter capacity. FIG. 38 shows the results of pipettor 5 with tips of the 200 microliter capacity. FIG. 39 shows the results of pipettor 5 with tips of the 1000 microliter capacity.

The magnitude of the difference between the applied forces for the tips described herein as compared to the generic and customs tips varied with both the size of the tip being tested and the pipettor being used, however, the results presented in FIGS. 31-39 indicate that the tips described herein outperformed the custom and generic tips in a substantial majority of the tests.

Example 9

Conclusions of Independent Ergonomic Testing Facility

Ergonomic testing of pipette tips described herein against other manufacturers pipette tips indicated significant measureable differences in the factors associated with user effort, measured forces, user perceptions, fatigue potential and comfort. The overall ergonomic performance of the tips described herein was equal to or better than the other commercial products tested in substantially all categories. A brief summary of some of the measureable differences is presented below.

Productivity

On average the Custom and Generic tips were 5.25% and 6.83%, respectively, slower during the completion of the pipetting cycle, than the tips described herein. Additionally, the on/off test indicated that the Custom and Generic tips were 7.57% and 10.98%, respectively, slower than the tips described herein.

Reductions in Muscle Effort

On average, the tips described herein consistently resulted in shorter cycle times and often required less total and average muscle work. Tips described herein were significantly faster and/or required less effort than the custom and generic tips in the majority of all full cycle and on/off tests, performed with all 5 pipettors tested, measured at confidence intervals of either ($p<0.05$) and ($p<0.1$).

Lowest Measured Forces

The forces measured during application of the generic 200 microliter and 1000 microliter pipette tips were considerably higher than forces measured for the tips described herein when used in conjunction with pipettor 5 (e.g., 39.6% to 56.4% higher), pipettor 4 (e.g., 30.1% to 63.9% higher), pipettor 2 (e.g., 82.9% to 18.3% higher) and pipettor 1 (e.g., 20% higher, for the 200 microliter tip). The forces measured during application of the 200 microliter and 1000 microliter pipettes were higher than the tips described herein when used in conjunction with pipettor 5 (e.g., 4.0% to 45.4% higher), pipettor 4 (e.g., 54.3% for the 1000 microliter tip), pipettor 2 (e.g., 31.6% to 11.9% higher) and pipettor 1 (e.g., 8.0% to 11.0% higher). Additionally, tip ejection forces associated with the tips described herein were lower than the forces measured for the generic and custom tips for the 200 microliter and 1000 microliter applications, with the exception of the custom (e.g., brand specific) 1000 microliter pipette tip for pipettor 1. For the 200 microliter version of pipettor 1, the generic tip required 138% more effort for tip ejection than tips described herein.

Lowest Perceived Effort for Use

Tips described herein were perceived as requiring the lightest effort when used with pipettors 1, 2 and 4. For pipettor 5, tips described herein were also perceived as requiring a lighter effort than the generic tips and similar level of effort when compared to the custom or brand specific tip for pipettor 5. In general, the overall perceived level of effort associated with tips described herein corresponded to a "Very weak" to "Weak" level of exertion.

Consistently Earned the Highest Ratings or were Ranked Equally with Custom Application Tips by Experienced Users Generally, the over all ratings of product performance for tips described herein were consistently better than the other tips tested, when compared across all pipettor models. Additionally, tips described herein were consistently rated better than the custom and generic tips when used with pipettors 1, 2 and 4. Tips described herein were also rated better than generic tips when used in conjunction with pipettor 5 and were rated similarly to the custom tips for pipettor 5. Experienced pipette and pipette tip users ranked tips described herein as the "most preferred" in 5 of the 6 categories tested (e.g., tip application effort, tip ejection effort, ease of aligning pipette on tip, overall comfort to use and overall speed and efficiency).

Example 10

Comparison of Pipetting Accuracy and Task Productivity as Measured by Liquid Retention and Time Required for Task Completion where Minimizing Sample Loss is a Factor Many types of medical and scientific analysis require handling of samples that are available in limiting quantities and/or often involve reagents that are difficult, and/or expensive, to prepare. In these circumstances, users of the samples or reagents must ensure that samples are accurately and substantially completely dispensed to ensure assay consistency and to minimize waste of reagents. Ensuring that a sample is substantially completely dispensed may add time and therefore costs to the productivity of clinical or laboratory personnel performing analysis that involve limiting or expensive reagents.

To measure the benefits of the advantageous features of the pipette tips described herein (e.g., TDH) against commercially available pipette tips, one 200 microliter pipettor (e.g., the pipettor previously designated as the 200 microliter version of pipettor 2) was used to test the accuracy and time to completion of a specific pipetting cycle. The tests were carried out by the testing facility described herein. The pipettor was chosen due to it's performance in other tests described herein. Pipettor 2 was tested in conjunction with the tips described herein, the custom tips for pipettor 2, and the generic tips also previously tested.

The pipetting cycled used for this analysis included the following steps:

1) aspirate 200 microliters of liquid,
2) dispense the liquid using the pipettor's over-blow feature,
3) visually inspect the tip of the pipette tip to determine if any liquid remained with the tip,
4) collect any liquid remaining on the tip of those pipette tips with liquid, and
5) determine (i) time to completion for the total number of each pipette tip type, (ii) weight of the collected liquid for each pipette tip type, and (iii) total number and % pipetted samples resulting in remaining fluid at the tip.

The term "over-blow feature" as used herein refers to the additional stroke of a pipettor plunger, which allows a user to fully dispense liquid by pushing the plunger past the position normally used for liquid aspiration. Collecting any remaining liquid on the end of the tips by touching the tip to a surface that is subsequently weighed, simulates the action described herein as "touching-off". Touching off is a process often used by pipettor users to ensure pipetting accuracy and substantially complete delivery of samples. A total of 430 pipette tips (e.g., equivalent to about 5 racks) of each type were tested using the pipetting cycle described above. Weight of liquid collected was measured on a Sartorius GD503 precision scale. The scale was calibrated prior to the test (Troemner, Certification number 547366W).

Results

Figure 40:
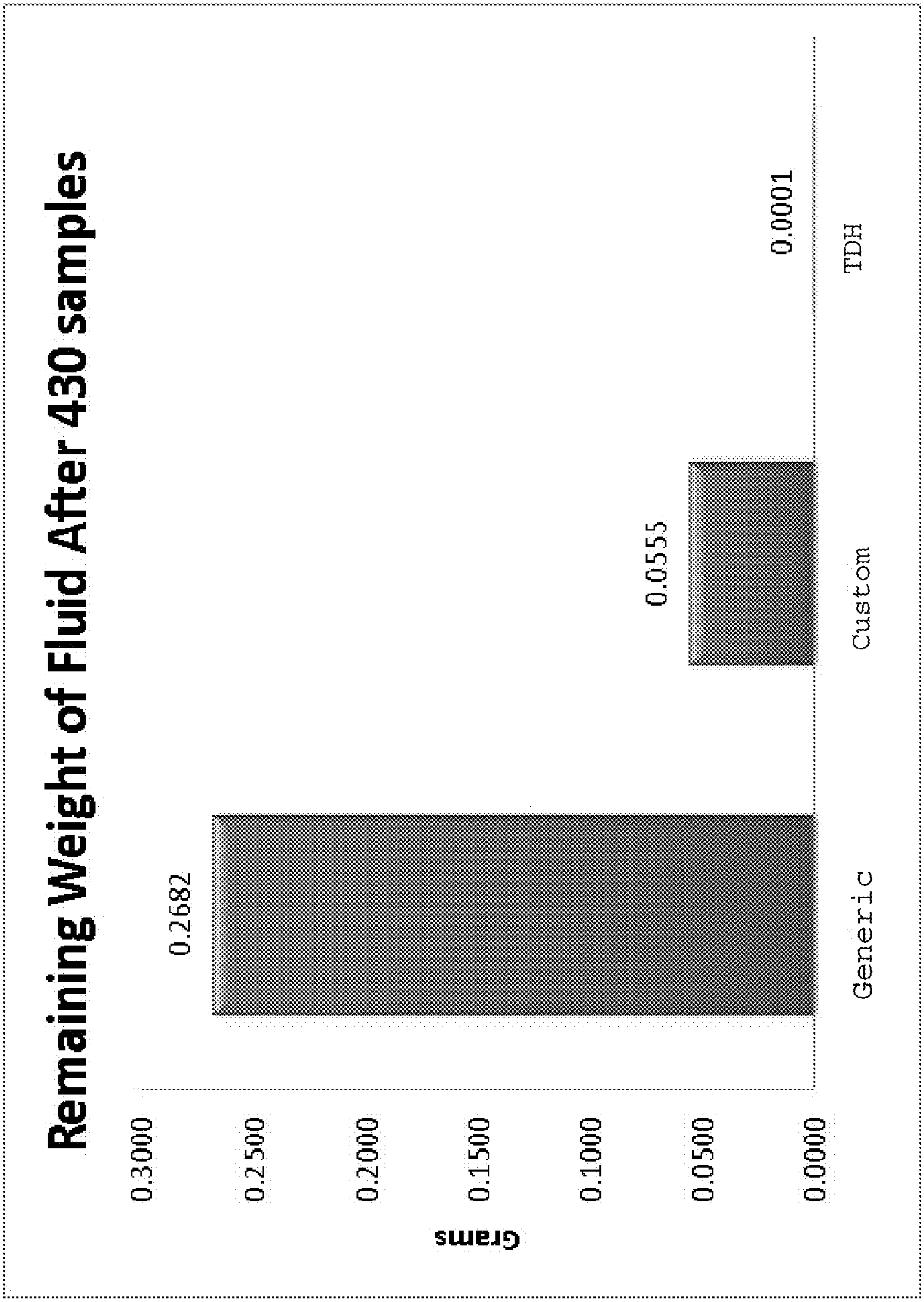
FIG. 40 graphically illustrates differences in amount of liquid collected from the tips (i.e., termini) of each of the pipette tips used in a comparison.

Tips described herein have been designed with features that provide the advantageous benefits of substantially complete sample delivery (e.g., blade feature) and ease of tip engagement and tip ejection (flexible, ribbed proximal region with flange). The experiments presented herein demonstrate the advantageous benefits of the features of tips described herein. The amount of liquid and the number of tips that retained liquid were measurements of the advantages of the blade tip feature, while the time to completion was a measurement of the combined benefits of the blade tip feature (reduced or eliminated the need for touching off) and the ease of pipette tip application and ejection. Generally, the results indicate that the tips described herein (TDH) had the lowest amount of collectable fluid (e.g., fluid retained on the tip), were the tips least likely to retain fluid on the tip, and showed lowest time to completion due to the lack of fluid retained and ease of pipette tip engagement and disengagement. The results and further analysis are presented in the tables below and in FIGS. 40-41.

Fluid Remaining with the Tip after Dispensing

As noted previously, samples and/or reagents frequently are hard to prepare, expensive, limiting, or any combination thereof. Therefore, ensuring substantially complete delivery of a sample is advantageous to overall sample processing costs. Increasing the time to allow substantially complete delivery of a sample may offset any cost benefits realized by substantially complete sample/reagent delivery. Tips described herein were compared to generic and pipettor 2 custom tips for fluid retained at the tip of the pipette tip. Tips described herein feature the "blade tip" design, whereas the tips of the generic and pipettor 2 custom tips do not feature the same distal terminal end. The weights of collected liquid, after completing the pipetting cycle for 430 of each pipette tip type, is presented in the table below and graphically in FIG. 40.

| | Generic | Custom | TDH |
|---|---|---|---|
| Total Wt. (g) | 0.2682 | 0.0555 | 0.0001 |
| % Error | 0.31186 | 0.064535 | 0.000116 |

The total weight of the liquid collected was converted to the % error (e.g., equivalent to percent pipetting error) using the following formula;

$$[W/(X)(N)]*100=\%\ \text{pipetting error} \qquad \text{(Equation 1)},$$

where W=the weight of liquid collected in grams, X=the total weight of liquid pipetted (e.g., a constant for this experiment set at 200 microliters which is equivalent to 200 micrograms), and N=the number of pipette tips sampled (e.g., a constant number for this experiment, a total of 430 tips of each type were tested). Using the custom tips as an example, [0.0555/(0.2 g)(430)]*100=0.06453% or 0.065%.

The total percent of fluid that remained undelivered to the test samples (e.g., % error) gives an indication of pipetting accuracy, and tips described herein resulted in the least error (e.g., 0.00012% liquid retained). The generic tips resulted in the greatest error (e.g., 0.312% liquid retained). The custom tips performed better than the generic tips, (e.g., 0.065% liquid retained), however the custom tips showed a substantially larger liquid retention than tips described herein. These results indicate that tips described herein have a higher pipetting accuracy, with respect to sample delivery, than other tips described herein.

Number of Tips of Each Type Retaining Liquid

In addition to determining the weight of the liquid retained for each tip type, the total number and percentage of tips of each type, utilized in a pipetting cycle, that retained liquid also was determined. The results are presented in the table below and graphically in FIG. 41.

| | Generic | Custom | TDH |
|---|---|---|---|
| # of tips that retained fluid | 121 | 16 | 1 |
| % Error | 28.14 | 3.72 | 0.23 |

Figure 41:
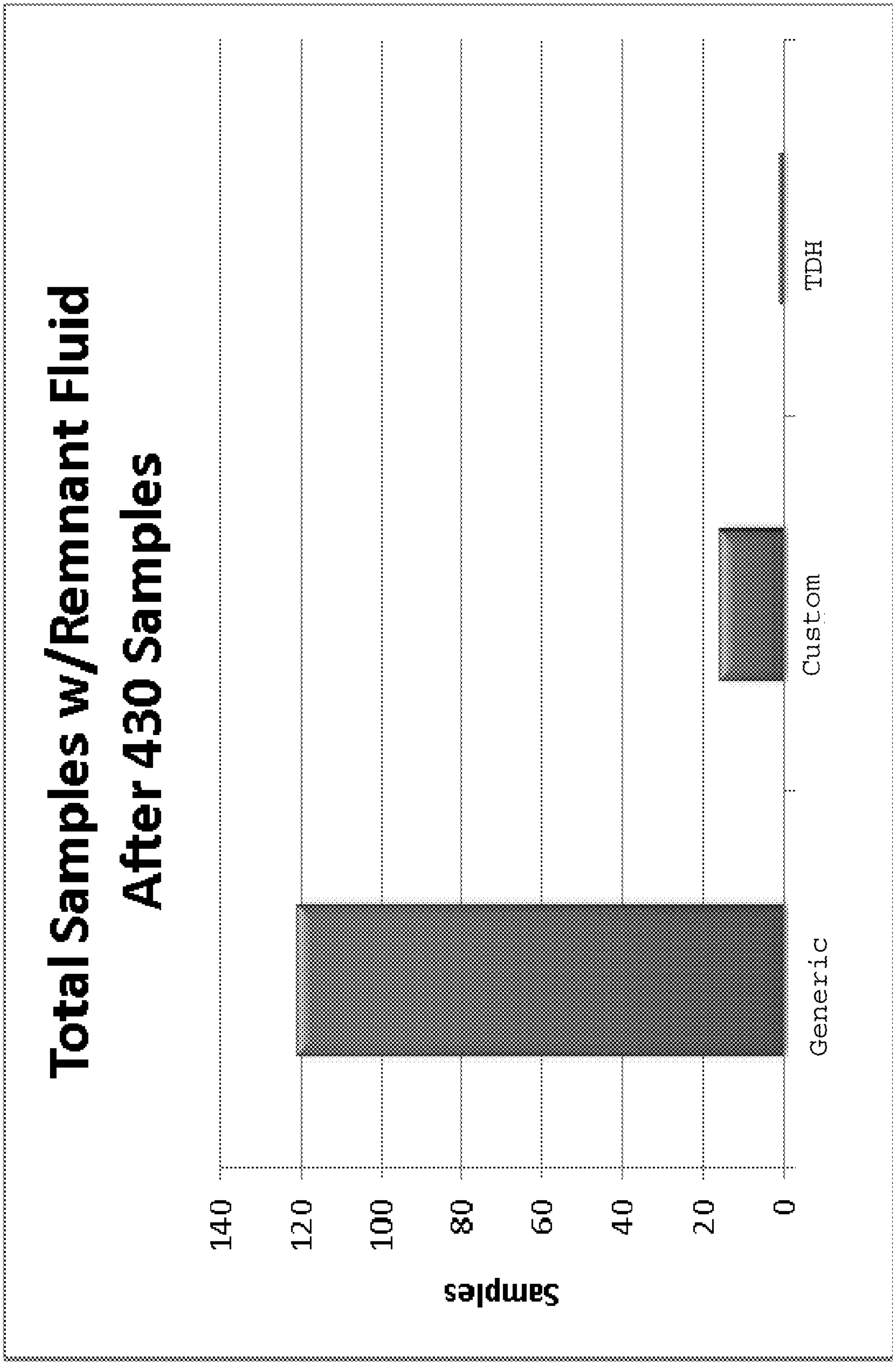
FIG. 41 graphically illustrates the total number of pipette tips of each type that retained fluid.

The results shown in the table above and in FIG. 41 indicate that the generic tips had the largest total number and percentage of tips that retained liquid by significant margin. Only 1 of the tips described herein retained any liquid, demonstrating the surprising advantageous benefit of the blade tip feature. The percent error value presented in the table above is calculated by dividing the number of tips that retained liquid by the number of total samples (e.g., 430 tips), multiplied by 100.

Productivity

In addition to the benefits of substantially complete delivery of sample as a benefit of the blade tip feature, additional design features of pipette tips described herein may contribute to a general increase in productivity seen by users of tips described herein, when compared to identical tasks performed using other pipette tips (e.g., the generic and/or pipettor specific custom designed, pipette tips). Increases in productivity can lead to cost benefits.

Figure 42:
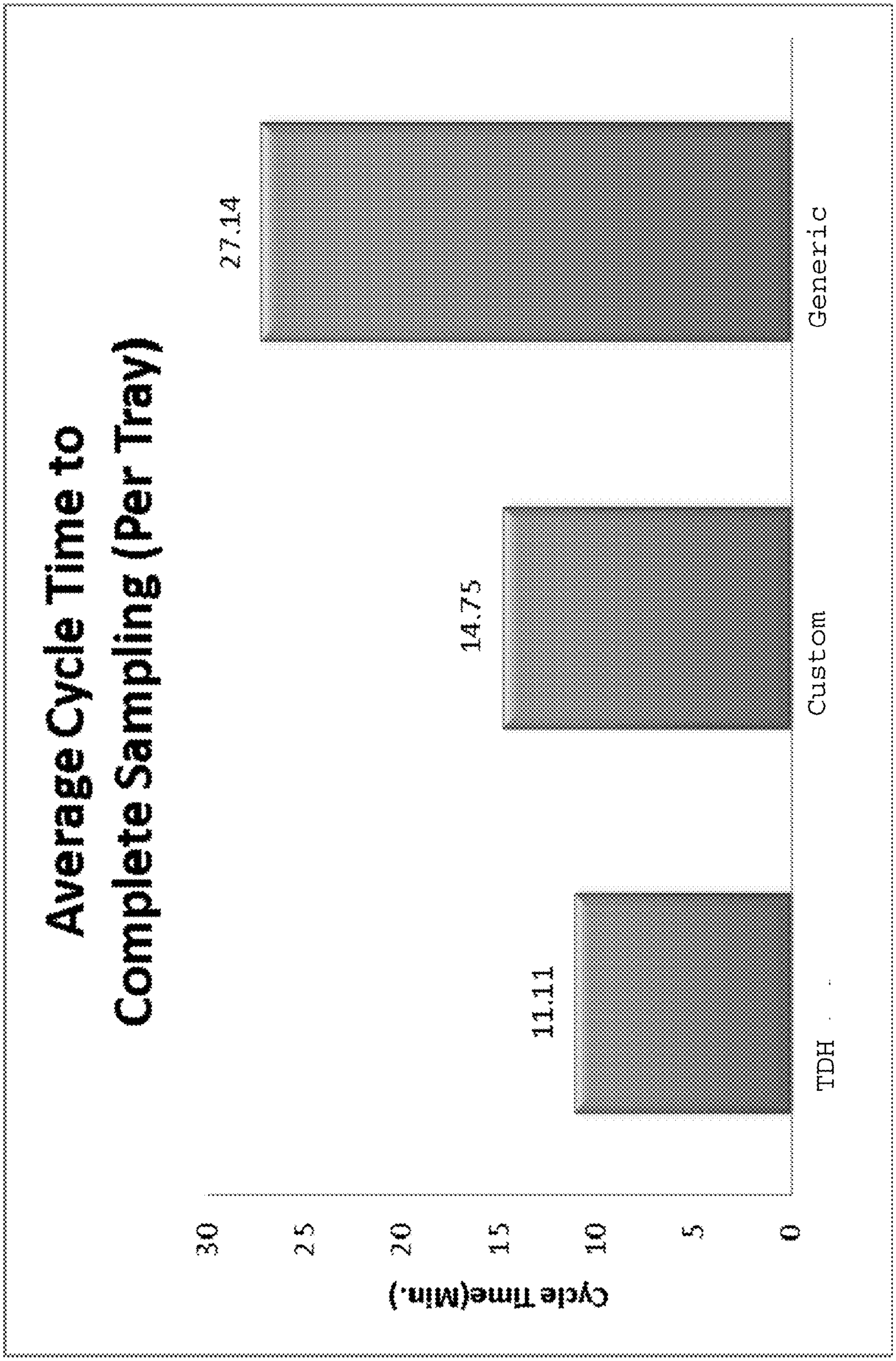
FIG. 42 graphically illustrates the time to complete a defined pipette cycle for 430 pipette tips of each type. Experimental protocol and results are described in Example 10.

The time required to complete the sampling (e.g., utilizing 430 pipette tips) for each type of tip was measured during the accuracy test. Each tip was visually inspected following the dispensing step to determine if fluid remained on the tip. Samples that had fluid remaining were subjected to sample collection and weighing, including data entry at time of measurement, into a computer placed adjacent to the scale. The additional time for sample collection, weighing and data entry are reflected in the time to complete each pipette tip cycle. The results are presented graphically in FIG. 42. Consistent with the other results presented in this example, tips described herein substantially outperformed the generic and pipettor specific pipette tips. The results indicate the time savings benefit is between about 20% and about 90%, for the pipetting cycle described. Different pipetting cycles may yield different time savings benefits, in some embodiments. The percent reduction in time was calculated as follows;

[(Time to complete cycle with 430 samples of pipette tip *X*)−(Time to complete cycle with 430 samples of pipette tips described herein)/(Time to complete cycle with 430 samples of pipette tip *X*)]*100=Percent reduction in time to complete pipetting cycle (Equation 2).

Using the custom pipette tips as an example, [14.75 minutes−11.11 minutes/14.75 minutes]*100=24.67%, or about a 24.7% reduction in time to complete the pipetting cycle as described.

The advantageous benefits of the proximal flexible region and blade tip distal region features provide significant reduction in (i) effort of use, (ii) time of pipetting task completion, and (iii) liquid retained with tip, all of which can contribute to operational cost savings, including claims for repetitive type injuries.

Example 11

Examples of Embodiments

Provided hereafter are certain non-limiting examples of embodiments of the technology.

1. A pipette tip comprising a proximal region and a distal region, wherein:
   - the proximal region comprises an exterior surface and an annular flange at the proximal terminus of the proximal region;
   - the proximal region comprises a first set of axially oriented ribs and a second set of axially oriented ribs;
   - the ribs of the first set and the second set are circumferentially spaced and alternately spaced around the exterior surface of the proximal region; and
   - ribs of the first set have a maximum thickness greater than the maximum thickness of ribs of the second set.
2. The pipette tip of embodiment 1, wherein the proximal region comprises an annular flange at the proximal terminus of the proximal region.
3. The pipette tip of embodiment 1, wherein one end of ribs in the first set, of ribs in the second set, or of ribs in the first set and the second set is co-extensive with, or terminates at, the flange.
4. The pipette tip of embodiment 1, wherein one end of ribs in the first set, of ribs in the second set, or of ribs in the first set and the second set is co-extensive with, or terminates at, the junction between the flange and the proximal region.
5. The pipette tip of embodiment 1, wherein one end of ribs in the first set, of ribs in the second set, or of ribs in the first set and the second set is co-extensive with, or terminates at, the junction between the proximal region and the distal region.
6. The pipette tip of embodiment 1, wherein of ribs in the first set, of ribs in the second set, or of ribs in the first set and the second set extend from the junction of the flange and proximal region to the junction of the proximal and distal regions.
7. The pipette tip of embodiment 1, wherein:
   - the distal region wall thickness tapers from (a) a point at or between (i) about the junction of the proximal region and distal region to (ii) about one-quarter of the axial distance from the terminus of the distal region to the junction, to (b) the distal region terminus, and
   - the wall thickness at the distal region terminus is about 0.0040 inches to about 0.0055 inches.
8. The pipette tip of embodiment 7, wherein the wall thickness at the distal region terminus is about 0.0043 inches to about 0.0050 inches.
9. The pipette tip of embodiment 8, wherein the wall thickness at the distal region terminus is about 0.0044 inches to about 0.0049 inches.
10. The pipette tip of embodiment 1, wherein the interior surface of the distal region is substantially smooth.
11. The pipette tip of embodiment 1, wherein the exterior surface of the distal region comprises a step.
12. The pipette tip of embodiment 1, wherein the proximal region comprises a frustum-shaped cavity within the interior of the proximal region.
13. The pipette tip of embodiment 12, wherein the frustum-shaped cavity is substantially smooth.

14. The pipette tip of embodiment 12, wherein the frustum-shaped cavity comprises an annular groove.

15. The pipette tip of embodiment 1, wherein each rib of the first set alternates with each rib of the second set.

16. The pipette tip of embodiment 1, wherein the thickness at or near the proximal terminus of the distal region is substantially similar to the thickness at or near the distal terminus of the proximal region.

17. A pipette tip comprising a proximal region and a distal region, wherein:

the proximal region comprises an exterior surface and an annular flange at the proximal terminus of the proximal region;

the distal region wall thickness tapers from (a) a point at or between (i) about the junction of the proximal region and distal region to (ii) about one-quarter of the axial distance from the terminus of the distal region to the junction, to (b) the distal region terminus, and the wall thickness at the distal region terminus is about 0.0040 inches to about 0.0055 inches.

18. The pipette tip of embodiment 17, wherein the proximal region comprises an annular flange at the proximal terminus of the proximal region.

19. The pipette tip of embodiment 17, wherein the proximal region comprises a first set of axially oriented ribs and a second set of axially oriented ribs.

20. The pipette tip of embodiment 19, wherein the ribs of the first set and the second set are circumferentially spaced and alternately spaced around the proximal region.

21. The pipette tip of embodiment 19, wherein ribs of the first set have a maximum thickness greater than the maximum thickness of ribs of the second set.

22. The pipette tip of embodiment 19, wherein one end of ribs in the first set, of ribs in the second set, or of ribs in the first set and the second set is co-extensive with, or terminates at, the flange.

23. The pipette tip of embodiment 19, wherein one end of ribs in the first set, of ribs in the second set, or of ribs in the first set and the second set is co-extensive with, or terminates at, the junction between the flange and the proximal region.

24. The pipette tip of embodiment 19, wherein one end of ribs in the first set, of ribs in the second set, or of ribs in the first set and the second set is co-extensive with, or terminates at, the junction between the proximal region and the distal region.

25. The pipette tip of embodiment 19, wherein one end of ribs in the first set, of ribs in the second set, or of ribs in the first set and the second set extend from the junction of the flange and proximal region to the junction of the proximal and distal regions.

26. The pipette tip of embodiment 19, wherein each rib of the first set alternates with each rib of the second set.

27. The pipette tip of embodiment 19, wherein the thickness at or near the proximal terminus of the distal region is substantially similar to the thickness at or near the distal terminus of the proximal region.

28. The pipette tip of embodiment 17, wherein the wall thickness at the distal region terminus is about 0.0043 inches to about 0.0050 inches.

29. The pipette tip of embodiment 28, wherein the wall thickness at the distal region terminus is about 0.0044 inches to about 0.0049 inches.

30. The pipette tip of embodiment 17, wherein the interior surface of the distal region is substantially smooth.

31. The pipette tip of embodiment 17, wherein the exterior surface of the distal region comprises a step.

32. The pipette tip of embodiment 17, wherein the proximal region comprises a frustum-shaped cavity within the interior of the proximal region.

33. The pipette tip of embodiment 32, wherein the frustum-shaped cavity is substantially smooth.

34. The pipette tip of embodiment 32, wherein the frustum-shaped cavity comprises an annular groove.

35. A method of using a pipette tip comprising;

(a) inserting a pipettor into a pipette tip; and (b) contacting the pipette tip with a fluid;

wherein the pipette tip comprises a proximal region and a distal region, and further wherein:

the proximal region comprises an exterior surface and an annular flange at the proximal terminus of the proximal region;

the proximal region comprises a first set of axially oriented ribs and a second set of axially oriented ribs;

the ribs of the first set and the second set are circumferentially spaced and alternately spaced around the exterior surface of the proximal region; and ribs of the first set have a maximum thickness greater than the maximum thickness of ribs of the second set.

36. A method of using a pipette tip comprising;

(a) inserting a pipettor into a pipette tip; and (b) contacting the pipette tip with a fluid;

wherein the pipette tip comprises a proximal region and a distal region, and further wherein: the proximal region comprises an exterior surface and an annular flange at the proximal terminus of the proximal region, the distal region wall thickness tapers from (a) a point at or between (i) about the junction of the proximal region and distal region to (ii) about one-quarter of the axial distance from the terminus of the distal region to the junction, to (b) the distal region terminus, and the wall thickness at the distal region terminus is about 0.0040 inches to about 0.0055 inches.

37. A method of manufacturing a pipette tip comprising;

(a) contacting a pipette tip mold with molten polymer; and (b) releasing the formed pipette tip from the mold after cooling; wherein the pipette tip has features imparted by the mold comprising; a proximal region and a distal region, and further wherein: the proximal region comprises an exterior surface and an annular flange at the proximal terminus of the proximal region;

the proximal region comprises a first set of axially oriented ribs and a second set of axially oriented ribs;

the ribs of the first set and the second set are circumferentially spaced and alternately spaced around the exterior surface of the proximal region; and ribs of the first set have a maximum thickness greater than the maximum thickness of ribs of the second set.

38. A method of manufacturing a pipette tip comprising;

(a) contacting a pipette tip mold with molten polymer; and (b) releasing the formed pipette tip from the mold after cooling; wherein the pipette tip has features imparted by the mold comprising; a proximal region and a distal region, and further wherein: the proximal region comprises an exterior surface and an annular flange at the proximal terminus of the proximal region, the distal region wall thickness tapers from (a) a point at or between (i) about the junction of the proximal region and distal region to (ii) about one-quarter of the axial distance from the terminus of the distal region to the junction, to (b) the distal region terminus, and the wall thickness at the distal region terminus is about 0.0040 inches to about 0.0055 inches.

39. A pipette tip comprising a proximal region and a distal region, wherein:
 the proximal region comprises an exterior surface and an annular flange at the proximal terminus of the proximal region,
 the proximal region comprises a plurality of axially oriented ribs;
 a thickness of the proximal region is about 0.005 inches to about 0.015 inches;
 the thickness is (i) at or near a sealing zone for a dispensing device, and (ii) at a portion between the ribs;
 the ribs or portion thereof extend over the sealing zone.

40. The pipette tip of embodiment 39, wherein the proximal region comprises an annular flange at the proximal terminus of the proximal region.

41. The pipette tip of any one of embodiments 39-40, wherein one end of ribs is co-extensive with, or terminates at, the flange.

42. The pipette tip of any one of embodiments 39-40, wherein one end of ribs is co-extensive with, or terminates at, the junction between the flange and the proximal region.

43. The pipette tip of any one of embodiments 39-40, wherein one end of ribs is co-extensive with, or terminates at, the junction between the proximal region and the distal region.

44. The pipette tip of any one of embodiments 39-40, wherein the ribs extend from the junction of the flange and proximal region to the junction of the proximal and distal regions.

45. The pipette tip of any one of embodiments 39-44, wherein:
 the distal region wall thickness tapers from (a) a point at or between (i) about the junction of the proximal region and distal region to (ii) about one-quarter of the axial distance from the terminus of the distal region to the junction, to (b) the distal region terminus, and
 the wall thickness at the distal region terminus is about 0.0040 inches to about 0.0055 inches.

46. The pipette tip of embodiment 45, wherein the wall thickness at the distal region terminus is about 0.0043 inches to about 0.0050 inches.

47. The pipette tip of embodiment 46, wherein the wall thickness at the distal region terminus is about 0.0044 inches to about 0.0049 inches.

48. The pipette tip of any one of embodiments 39-47, wherein the interior surface of the distal region is substantially smooth.

49. The pipette tip of any one of embodiments 39-48, wherein the exterior surface of the distal region comprises a step.

50. The pipette tip of any one of embodiments 39-49, wherein the proximal region comprises a frustum-shaped cavity within the interior of the proximal region.

51. The pipette tip of embodiment 50, wherein the frustum-shaped cavity is substantially smooth.

52. The pipette tip of embodiment 51, wherein the frustum-shaped cavity comprises an annular groove.

53. The pipette tip of any one of embodiments 39-52, wherein the thickness of the proximal region is about 0.007 inches to about 0.0013 inches.

54. The pipette tip of any one of embodiments 39-52, wherein the thickness of the proximal region is about 0.008 inches to about 0.0012 inches.

55. The pipette tip of any one of embodiments 39-52, wherein the thickness of the proximal region is about 0.009 inches to about 0.011 inches.

56. The pipette tip of any one of embodiments 39-52, wherein the thickness of the proximal region is about 0.010 inches.

57. The pipette tip of any one of embodiments 39-56, wherein the maximum thickness of the ribs is about 0.037 inches to about 0.060 inches.

58. The pipette tip of any one of embodiments 39-56, wherein the maximum thickness of the ribs is about 0.016 inches to about 0.027 inches.

59. The pipette tip of any one of embodiments 39-56, wherein the maximum thickness of the ribs is about 0.015 inches to about 0.025 inches.

60. The pipette tip of any one of embodiments 39-56, wherein the maximum thickness of the ribs is about 0.011 to about 0.021 inches.

61. The pipette tip of any one of embodiments 39-56, wherein the maximum thickness of the ribs is about 0.003 inches to about 0.009 inches.

62. The pipette tip of any one of embodiments 1-34 and 39-61, wherein the proximal region can be deflected a defined distance from a resting position by a deflection force of less than 1.75 pounds.

63. The pipette tip of any one of embodiments 1-34 and 39-61, wherein the proximal region can be deflected a defined distance from a resting position by a deflection force between about 1.07 pounds and about 1.26 pounds.

64. A pipette tip comprising a flexible proximal region and a distal region, wherein the proximal region can be deflected a defined distance from a resting position by a deflection force of less than 1.75 pounds.

65. The pipette tip of embodiment 64, wherein the proximal region is deflected a defined distance from the resting position by a deflection force between about 1.07 pounds and about 1.26 pounds.

66. A pipette tip comprising a proximal region and a distal region, wherein:
 the proximal region comprises an exterior surface and an annular flange at the proximal terminus of the proximal region;
 the proximal region comprises a first set of axially oriented ribs and a second set of axially oriented ribs;
 the ribs of the first set and the second set are circumferentially spaced and alternately spaced around the exterior surface of the proximal region;
 ribs of the first set have a maximum thickness greater than the maximum thickness of ribs of the second set; and
 the proximal region is deflected a defined distance from a resting position by a deflection force of less than 1.75 pounds.

67. The pipette tip of embodiment 66, wherein the proximal region is deflected a defined distance from the resting position by a deflection force between about 1.07 pounds and about 1.26 pounds.

68. The pipette tip of embodiments 66 or 67, wherein:
 the distal region wall thickness tapers from (a) a point at or between (i) about the junction of the proximal region and distal region to (ii) about one-quarter of the axial distance from the terminus of the distal region to the junction, to (b) the distal region terminus, and
 the wall thickness at the distal region terminus is about 0.0040 inches to about 0.0055 inches.

69. A pipette tip comprising a proximal region and a distal region, wherein:
 the proximal region comprises an exterior surface and an annular flange at the proximal terminus of the proximal region;

the distal region wall thickness tapers from (a) a point at or between (i) about the junction of the proximal region and distal region to (ii) about one-quarter of the axial distance from the terminus of the distal region to the junction, to (b) the distal region terminus, the wall thickness at the distal region terminus is about 0.0040 inches to about 0.0055 inches; and the proximal region is deflected a defined distance from a resting position by a deflection force of less than 1.75 pounds.

70. The pipette tip of embodiment 69, wherein the proximal region is deflected by the known distance from the resting position by a deflection force between about 1.07 pounds and about 1.26 pounds.

71. A pipette tip comprising a proximal region and a distal region, wherein:

the proximal region comprises an exterior surface and an annular flange at the proximal terminus of the proximal region, the proximal region comprises a plurality of axially oriented ribs;

a thickness of the proximal region is about 0.005 inches to about 0.015 inches;

the thickness is (i) at or near a sealing zone for a dispensing device, and (ii) at a portion between the ribs;

the ribs or portion thereof extend over the sealing zone; and the proximal region is deflected a defined distance from a resting position by a deflection force of less than 1.75 pounds.

72. The pipette tip of embodiment 71, wherein the proximal region is deflected by the defined distance from the resting position by a deflection force between about 1.07 pounds and about 1.26 pounds.

73. The pipette tip of any one of embodiments 62 to 72, wherein a surface of the proximal region is deflected in a direction substantially perpendicular to the axis extending from the distal portion terminus to the proximal region terminus.

74. The pipette tip of any one of embodiments 62 to 73, wherein the pipette tip retains less than 0.065% of the fluid drawn into the pipette tip after the liquid is dispensed.

75. The pipette tip of any one of embodiments 62 to 73, wherein the pipette tip retains no more than 0.00012% of the fluid drawn into the pipette tip after the liquid is dispensed.

76. The pipette tip of any one of embodiments 62 to 75, wherein less than 3.72% of the pipette tips utilized in a pipette cycle retain a portion of the fluid drawn into the pipette tips after the liquid is dispensed.

77. The pipette tip of any one of embodiments 62 to 75, wherein between 0.05% to 1.0% of the pipette tips utilized in a pipette cycle retain a portion of the fluid drawn into the pipette tips after the liquid is dispensed.

78. The pipette tip of any one of embodiments 62 to 75, wherein between 0.15% to 0.3% of the pipette tips utilized in a pipette cycle retain a portion of the fluid drawn into the pipette tips after the liquid is dispensed.

79. The pipette tip of any one of embodiments 62 to 75, wherein between 0.2% to 0.26% of the pipette tips utilized in a pipette cycle retain a portion of the fluid drawn into the pipette tips after the liquid is dispensed.

80. The pipette tip of any one of embodiments 62 to 79, wherein less than 3.72% of the pipette tips utilized in a pipette cycle retains less than 0.065% of the fluid drawn into the pipette tips after the liquid is dispensed.

81. The pipette tip of embodiment 80, wherein less than 3.72% of the pipette tips utilized in a pipette cycle retain no more than 0.00012% of the fluid drawn into the pipette tips after the liquid is dispensed.

82. The pipette tip of any one of embodiments 62 to 79, wherein between 0.2% to 0.26% of the pipette tips utilized in a pipette cycle retain less than 0.065% of the fluid drawn into the pipette tips after the liquid is dispensed.

83. The pipette tip of embodiment 82, wherein between 0.2% to 0.26% of the pipette tips utilized in a pipette cycle retain no more than 0.00012% of the fluid drawn into the pipette tips after the liquid is dispensed.

84. The pipette tip of any one of embodiments 62 to 83, wherein the pipette tip contributes to a reduction of between 20% and 90% in the average time to complete a cycle of steps in a method for manipulating a solution.

85. A method for manipulating a solution using a pipette tip, comprising (a) applying a pipette tip to a pipettor;

(b) aspirating a solution;

(c) dispensing the solution into a receptacle; and (d) ejecting the pipette tip from the pipettor, wherein the average time to complete 3 cycles of steps (a) to (d) is 20.88 seconds or less.

86. The method of embodiment 85, wherein step (c) further comprises touching the distal terminus of the pipette tip to a wall of the receptacle after the fluid is dispensed from the interior of the tip.

87. The method of embodiment 85, wherein step (c) further comprises visually inspecting the distal terminus of the pipette tip to determine if any fluid remains associated with the pipette tip after the fluid is dispensed.

88. The method of embodiment 85, wherein step (c) further comprises touching the distal terminus of the pipette tip to a wall of the receptacle after the fluid is dispensed from the interior of the tip, and also further comprises visually inspecting the distal terminus of the pipette tip to determine if any fluid remains associated with the pipette tip after the fluid is dispensed.

89. The method of embodiment 85, wherein the thickness of the tip wall at the distal terminus is 0.0055 or less.

90. The method of any one of embodiments 85 to 89, wherein the pipette tip retains less than 0.065% of the fluid drawn into the pipette tip after the liquid is dispensed.

91. The method of any one of embodiments 85 to 89, wherein the pipette tip retains no more than 0.00012% of the fluid drawn into the pipette tip after the liquid is dispensed.

92. The method of any one of embodiments 85, 74 to 91, wherein less than 3.72% of the pipette tips utilized in a pipette cycle retain a portion of the fluid drawn into the pipette tips after the liquid is dispensed.

93. The method of any one of embodiments 85 to 91, wherein between 0.05% to 1.0% of the pipette tips utilized in a pipette cycle retain a portion of the fluid drawn into the pipette tips after the liquid is dispensed.

94. The method of any one of embodiments 85 to 91, wherein between 0.15% to 0.3% of the pipette tips utilized in a pipette cycle retain a portion of the fluid drawn into the pipette tips after the liquid is dispensed.

95. The method of any one of embodiments 85 to 91, wherein between 0.2% to 0.26% of the pipette tips utilized in a pipette cycle retain a portion of the fluid drawn into the pipette tips after the liquid is dispensed.

96. The method of any one of embodiments 85 to 95, wherein less than 3.72% of the pipette tips utilized in a pipette cycle retain less than 0.065% of the fluid drawn into the pipette tips after the liquid is dispensed.

97. The pipette tip of embodiment 96, wherein less than 3.72% of the pipette tips utilized in a pipette cycle retain no more than 0.00012% of the fluid drawn into the pipette tips after the liquid is dispensed.

98. The pipette tip of any one of embodiments 85 to 95, wherein between 0.2% to 0.26% of the pipette tips utilized in a pipette cycle retain less than 0.065% of the fluid drawn into the pipette tips after the liquid is dispensed.

99. The pipette tip of embodiment 98, wherein between 0.2% to 0.26% of the pipette tips utilized in a pipette cycle retain no more than 0.00012% of the fluid drawn into the pipette tips after the liquid is dispensed.

100. The method of any one of embodiments 85 to 99, wherein the pipette tip contributes to a reduction of between about 20% and about 90% in the average time to complete a cycle of steps in a method for manipulating a solution.

101. A method for dispensing fluid from a pipette tip, comprising, (a) drawing a volume of fluid into a pipette tip having a wall thickness at the distal region terminus of about 0.0040 inches to about 0.0055 inches, and (b) dispensing the fluid from the pipette tip, wherein the fluid is substantially completely dispensed.

102. The method of claim 101, wherein the method comprises (i) applying a pipette tip to a pipettor prior to step (a), (ii) visually inspecting the pipette tip after step (b), (iii) ejecting the pipette tip from the pipettor after step (b), or (iv) combinations thereof.

103. The method of claim 101, wherein the pipette tip retains less than 0.065% of a fluid drawn into the pipette tip after the liquid is dispensed.

104. The method of claim 103, wherein the pipette tip retains no more than 0.00012% of a fluid drawn into the pipette tip after the liquid is dispensed.

105. The method of claim 101, wherein the method is performed for a plurality of pipette tips and less than 3.72% of the pipette tips retain a portion of the fluid drawn into the pipette tips after the liquid is dispensed.

106. The method of claim 105, wherein between 0.2% to 0.26% of the pipette tips retain a portion of the fluid drawn into the pipette tips after the liquid is dispensed.

107. The method of claim 101, wherein the pipette tip contributes to a reduction of between 20% and 90% in the average time to complete a cycle of steps in a fluid dispensing procedure.

SELECTED FEATURES OF FIG. 1A-1D, FIG. 2, FIG. 3 AND FIG. 4A-4D

15 proximal region
20 distal region
30 junction between distal region and proximal region
40 about one-quarter of the distance from the distal region terminus to the junction 30
50 distal region terminus
53 wall thickness at distal region terminus
55 step
57 region where wall taper ends
60 flange
65 flange rim
67 flange lead-in surface
70 proximal region flexible thickness
72 proximal region flexible thickness terminus
75 junction of flange and proximal region flexible thickness
80 rib (first rib thickness)
82 rib terminus
83 rib terminus
85 rib (second rib thickness)
90 rib terminus
100 inner surface of proximal region
110 flange taper inner surface
120 annular groove
130 inner surface of distal region The entirety of each patent, patent application, publication and document referenced herein hereby is incorporated by reference. Citation of the above patents, patent applications, publications and documents is not an admission that any of the foregoing is pertinent prior art, nor does it constitute any admission as to the contents or date of these publications or documents.

Modifications may be made to the foregoing without departing from the basic aspects of the invention. Although the invention has been described in substantial detail with reference to one or more specific embodiments, those of ordinary skill in the art will recognize that changes may be made to the embodiments specifically disclosed in this application, yet these modifications and improvements are within the scope and spirit of the invention.

The invention illustratively described herein suitably may be practiced in the absence of any element(s) not specifically disclosed herein. Thus, for example, in each instance herein any of the terms "comprising," "consisting essentially of," and "consisting of" may be replaced with either of the other two terms. The terms and expressions which have been employed are used as terms of description and not of limitation, and use of such terms and expressions do not exclude any equivalents of the features shown and described or portions thereof, and various modifications are possible within the scope of the invention claimed. The term "a" or "an" can refer to one of or a plurality of the elements it modifies (e.g., "a pipette tip" can mean one or more pipette tips) unless it is contextually clear either one of the elements or more than one of the elements is described. The term "about" as used herein refers to a value within 10% of the underlying parameter (i.e., plus or minus 10%), and use of the term "about" at the beginning of a string of values modifies each of the values (i.e., "about 1, 2 and 3" refers to about 1, about 2 and about 3). For example, a weight of "about 100 grams" can include weights between 90 grams and 110 grams. Further, when a listing of values is described herein (e.g., about 50%, 60%, 70%, 80%, 85% or 86%) the listing includes all intermediate and fractional values thereof (e.g., 54%, 85.4%). Thus, it should be understood that although the present invention has been specifically disclosed by representative embodiments and optional features, modification and variation of the concepts herein disclosed may be resorted to by those skilled in the art, and such modifications and variations are considered within the scope of this invention.

Certain embodiments of the invention are set forth in the claims that follow.

What is claimed is:

1. A pipette tip comprising a proximal region and a distal region, wherein:

the proximal region comprises an exterior surface and an annular flange at the proximal terminus of the proximal region;

the distal region wall thickness tapers smoothly from (i) about one-quarter of the axial distance from the terminus of the distal region to (ii) the distal region terminus, and the wall thickness at the distal region terminus is about 0.0040 inches to about 0.0055 inches.

2. The pipette tip of claim 1, wherein the annular flange at the proximal terminus of the proximal region is a flared annular flange.

3. The pipette tip of claim 1, wherein the proximal region comprises a first set of axially oriented ribs and a second set of axially oriented ribs.

4. The pipette tip of claim 3, wherein the ribs of the first set and the second set are alternately spaced around a circumference of the exterior surface of the proximal region.

5. The pipette tip of claim 1, wherein the proximal region is deflected a defined distance from a resting position by a deflection force of less than 1.75 pounds.

6. The pipette tip of claim 5, wherein the proximal region is deflected a defined distance from the resting position by a deflection force between about 1.07 pounds and about 1.26 pounds.

7. The pipette tip of claim 1, wherein the pipette tip retains less than 0.065% of a fluid drawn into the pipette tip upon delivery of the fluid from the pipette tip.

8. The pipette tip of claim 7, wherein the pipette tip retains no more than 0.00012% of a fluid drawn into the pipette tip upon delivery of the fluid from the pipette tip.

9. The pipette tip of claim 1, wherein less than 3.72% of the pipette tips retain a portion of the fluid drawn into the pipette tips upon delivery of the fluid from the pipette tip.

10. The pipette tip of claim 9, wherein between 0.2% to 0.26% of the pipette tips retain a portion of the fluid drawn into the pipette tips upon delivery of the fluid from the pipette tip.

11. The pipette tip of claim 1, wherein the pipette tip is configured to reduce the average time to complete a cycle of steps by a reduction of between 20% and 90%, as compared to a pipette tip not having features of claim 1, wherein the cycle of steps comprises (i) applying a pipette tip to a pipettor, (ii) aspirating a solution, (iii) dispensing the solution into a receptacle and (iv) ejecting the pipette tip from the pipettor, wherein the same pipettor is used for steps (i), (ii), (iii) and (iv).

12. The pipette tip of claim 1, wherein the wall thickness at the distal region terminus is about 0.0044 inches to about 0.0049 inches.

13. The pipette tip of claim 1, wherein the wall thickness of the proximal region is constant over the length of the region.

14. The pipette tip of claim 1, wherein the wall thickness taper from about the junction of the proximal region and distal region to the distal region terminus is smooth.

* * * * *